United States Patent
Oda et al.

(10) Patent No.: US 9,158,418 B2
(45) Date of Patent: Oct. 13, 2015

(54) POINTER DETECTION APPARATUS AND POINTER DETECTION METHOD

(75) Inventors: Yasuo Oda, Kazo (JP); Yoshihisa Sugiyama, Kazo (JP)

(73) Assignee: Wacom Co., Ltd., Saitama (JP)

( * ) Notice: Subject to any disclaimer, the term of this patent is extended or adjusted under 35 U.S.C. 154(b) by 390 days.

(21) Appl. No.: 12/750,510

(22) Filed: Mar. 30, 2010

(65) Prior Publication Data

US 2010/0321314 A1    Dec. 23, 2010

(30) Foreign Application Priority Data

Jun. 18, 2009    (JP) .................................. 2009-145879

(51) Int. Cl.
*G06F 3/044*    (2006.01)
*G06F 3/046*    (2006.01)

(52) U.S. Cl.
CPC ................ *G06F 3/044* (2013.01); *G06F 3/046* (2013.01); *G06F 2203/04111* (2013.01)

(58) Field of Classification Search
CPC ............................................. G06F 2203/04111
See application file for complete search history.

(56) References Cited

U.S. PATENT DOCUMENTS

| 5,625,382 | A | 4/1997 | Ebihara et al. | |
| 5,841,427 | A * | 11/1998 | Teterwak ...................... | 345/173 |
| 5,896,127 | A | 4/1999 | Matsufusa et al. | |
| 6,522,320 | B1 | 2/2003 | Chou | |
| 7,075,316 | B2 | 7/2006 | Umeda et al. ................. | 324/658 |
| 7,078,918 | B2 | 7/2006 | Umeda et al. ................. | 324/679 |
| 7,084,645 | B1 | 8/2006 | Umeda et al. ................. | 324/686 |
| 7,084,860 | B1 | 8/2006 | Jaeger et al. | |

(Continued)

FOREIGN PATENT DOCUMENTS

| CA | 2 316 067 A1 | 2/2002 |
| CN | 1749819 A | 3/2006 |

(Continued)

OTHER PUBLICATIONS

Extended European Search Report for corresponding European Application No. 10158389.6, dated Dec. 30, 2010, 2 pages.

(Continued)

*Primary Examiner* — Grant Sitta
*Assistant Examiner* — Mihir Rayan
(74) *Attorney, Agent, or Firm* — Seed IP Law Group PLLC

(57) ABSTRACT

Disclosed herein is a pointer detection apparatus, including: a conductor pattern including a plurality of first conductors disposed in a first direction and a plurality of second conductors disposed in a second direction; a multi-frequency signal production circuit configured to produce a plurality of signals of different frequencies; a first conductor selection circuit configured to selectively supply the signals of different frequencies to those first conductors, between which N ones of the first conductors are interposed, N being a predetermined integer equal to or greater than 0; a second conductor selection circuit configured to selectively receive detection signals from the second conductors; and a signal detection circuit configured to obtain signals of individual frequencies, corresponding to the signals of different frequencies produced by the multi-frequency signal production circuit, which are representative of coupling states at cross points between the first conductors and the second conductors and are received from said second conductor selection circuit.

34 Claims, 48 Drawing Sheets

(56) References Cited

U.S. PATENT DOCUMENTS

| | | | |
|---|---|---|---|
| 7,742,041 B2 | 6/2010 | Lee et al. | |
| 7,773,078 B2 | 8/2010 | Lee et al. | |
| 7,868,874 B2 | 1/2011 | Reynolds | |
| 8,552,998 B2 | 10/2013 | Hotelling et al. | |
| 2001/0008523 A1 | 7/2001 | Song | |
| 2004/0113895 A1* | 6/2004 | Lubarsky et al. | 345/174 |
| 2005/0001665 A1 | 1/2005 | Lin | |
| 2005/0073324 A1 | 4/2005 | Umeda et al. | |
| 2005/0146513 A1 | 7/2005 | Hill et al. | |
| 2006/0007181 A1 | 1/2006 | Jung et al. | |
| 2006/0017710 A1 | 1/2006 | Lee et al. | |
| 2006/0060752 A1 | 3/2006 | Lee et al. | |
| 2006/0097991 A1* | 5/2006 | Hotelling et al. | 345/173 |
| 2006/0146038 A1 | 7/2006 | Park et al. | |
| 2007/0062852 A1 | 3/2007 | Zachut et al. | |
| 2007/0074914 A1* | 4/2007 | Geaghan et al. | 178/18.06 |
| 2007/0109274 A1 | 5/2007 | Reynolds | |
| 2007/0229464 A1 | 10/2007 | Hotelling et al. | |
| 2007/0229468 A1* | 10/2007 | Peng et al. | 345/173 |
| 2007/0257890 A1* | 11/2007 | Hotelling et al. | 345/173 |
| 2008/0012835 A1* | 1/2008 | Rimon et al. | 345/173 |
| 2008/0062139 A1 | 3/2008 | Hotelling et al. | 345/173 |
| 2008/0122798 A1 | 5/2008 | Koshiyama et al. | |
| 2008/0158167 A1* | 7/2008 | Hotelling et al. | 345/173 |
| 2008/0158175 A1 | 7/2008 | Hotelling et al. | 345/173 |
| 2008/0158180 A1* | 7/2008 | Krah et al. | 345/173 |
| 2008/0162996 A1 | 7/2008 | Krah et al. | |
| 2008/0225015 A1 | 9/2008 | Hashida | |
| 2008/0277259 A1* | 11/2008 | Chang | 200/600 |
| 2008/0309625 A1 | 12/2008 | Krah et al. | 345/173 |
| 2009/0002337 A1 | 1/2009 | Chang | |
| 2009/0009483 A1 | 1/2009 | Hotelling et al. | 345/173 |
| 2009/0127005 A1* | 5/2009 | Zachut et al. | 178/18.03 |
| 2009/0135148 A1 | 5/2009 | Bytheway | |
| 2009/0167720 A1* | 7/2009 | Geaghan | 345/174 |
| 2009/0309851 A1* | 12/2009 | Bernstein | 345/174 |
| 2010/0059295 A1 | 3/2010 | Hotelling et al. | |
| 2010/0060591 A1* | 3/2010 | Yousefpor et al. | 345/173 |
| 2010/0060593 A1* | 3/2010 | Krah | 345/173 |
| 2010/0060596 A1* | 3/2010 | Whight | 345/173 |
| 2010/0073301 A1 | 3/2010 | Yousefpor et al. | |
| 2010/0085324 A1 | 4/2010 | Noguchi et al. | |
| 2010/0321313 A1 | 12/2010 | Oda et al. | |
| 2010/0321315 A1* | 12/2010 | Oda et al. | 345/173 |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2010/0328265 A1 | 12/2010 | Hotelling et al. | |
| 2011/0042152 A1 | 2/2011 | Wu | |
| 2011/0148785 A1 | 6/2011 | Oda et al. | 345/173 |
| 2011/0148806 A1 | 6/2011 | Oda et al. | 345/174 |
| 2011/0153263 A1 | 6/2011 | Oda et al. | 702/150 |
| 2012/0075239 A1* | 3/2012 | Azumi et al. | 345/174 |
| 2012/0212441 A1 | 8/2012 | Christiansson et al. | |

FOREIGN PATENT DOCUMENTS

| | | |
|---|---|---|
| CN | 1753447 A | 3/2006 |
| CN | 1771430 A | 5/2006 |
| CN | 101046720 A | 10/2007 |
| CN | 101266531 A | 9/2008 |
| CN | 101310246 A | 11/2008 |
| CN | 201293982 Y | 8/2009 |
| EP | 2113828 A2 | 11/2009 |
| EP | 2133776 A1 | 12/2009 |
| JP | 5-224818 | 9/1993 |
| JP | 6-4213 | 1/1994 |
| JP | 7-141088 | 6/1995 |
| JP | 8-87369 | 4/1996 |
| JP | 8-179871 | 7/1996 |
| JP | 8-190453 | 7/1996 |
| JP | 8-241161 | 9/1996 |
| JP | 9-45184 | 2/1997 |
| JP | 9-222947 | 8/1997 |
| JP | 09292950 A | 11/1997 |
| JP | 10-161795 | 6/1998 |
| JP | 2000-76014 | 3/2000 |
| JP | 2000-105645 | 4/2000 |
| JP | 2000-112642 | 4/2000 |
| JP | 2002076984 A | 3/2002 |
| JP | 2003-22158 | 1/2003 |
| JP | 2005-114361 | 4/2005 |
| JP | 2005122814 A | 5/2005 |
| JP | 2005-152223 | 6/2005 |
| JP | 2005-157643 | 6/2005 |
| JP | 3144241 U | 8/2008 |
| JP | 2008-257374 A | 10/2008 |
| JP | 2009054141 A | 3/2009 |
| JP | 2009516295 A | 4/2009 |
| WO | 2007017848 A2 | 2/2007 |
| WO | 2008007372 A2 | 1/2008 |
| WO | 2008/085719 | 7/2008 |

OTHER PUBLICATIONS

Japanese Office Action dated Mar. 12, 2013, for corresponding JP Application No. 2009-288273, 2 pages.
Japanese Office Action dated Apr. 16, 2013, for corresponding JP Application No. 2009-145880, 2 pages.
Chinese Office Action dated Apr. 1, 2014, for corresponding CN Application No. 201010583240.0, 19 pages.
Chinese Office Action dated Jan. 6, 2014, for corresponding CN Application No. 2014010100238580, 6 pages.
Partial European Search report dated Jan. 3, 2014, for corresponding EP Application No. 10194073.2, 6 pages.
Extended European Search Report dated Jan. 7, 2014, for corresponding EP Application No. 10194074.0, 8 pages.
Office Action, dated Nov. 22, 2013, for corresponding Chinese Application No. 201010208533.0, 15 pages.
Communiation pursuant to Article 94(3) EPC, dated Apr. 21, 2015, for corresponding EP 10 194 073.2-1959, 8 pages.

* cited by examiner

F I G . 5
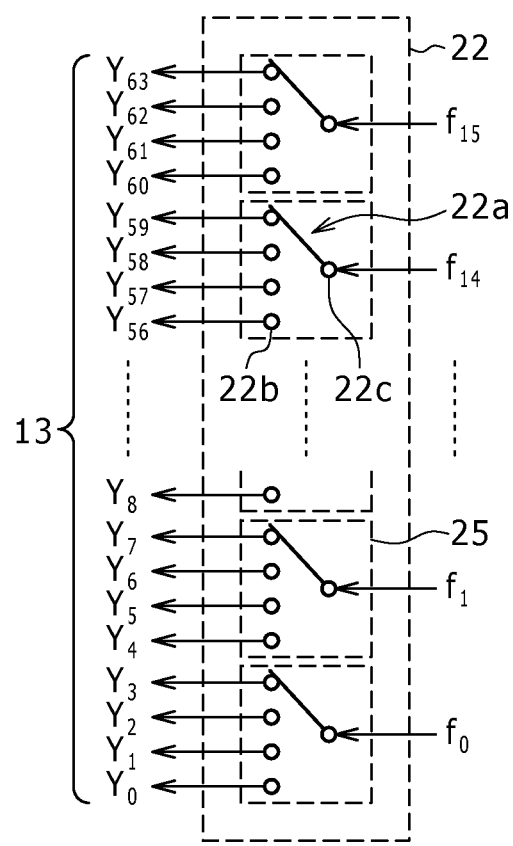

FIG.25A $Y_3 \longleftarrow f_0$
$Y_2 \longleftarrow f_0$
$Y_1$
$Y_0$

FIG.25B $Y_3$
$Y_2$
$Y_1 \longleftarrow f_0$
$Y_0 \longleftarrow f_0$

FIG.26A $Y_3 \longleftarrow f_0$
$Y_2 \longleftarrow f_0$
$Y_1$
$Y_0$

FIG.26B $Y_3$
$Y_2 \longleftarrow f_0$
$Y_1 \longleftarrow f_0$
$Y_0$

FIG.26C $Y_3$
$Y_2$
$Y_1 \longleftarrow f_0$
$Y_0 \longleftarrow f_0$

FIG.28
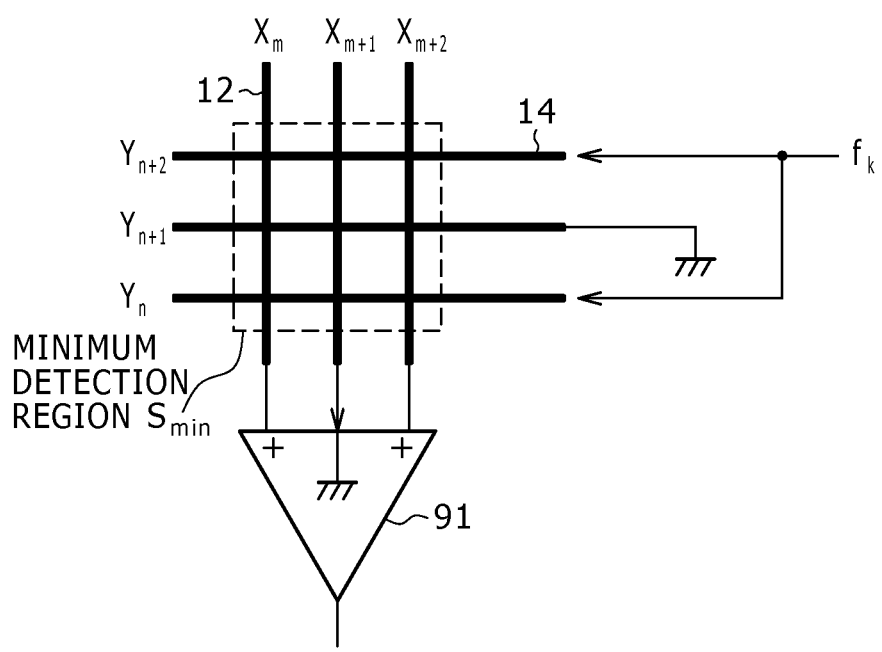
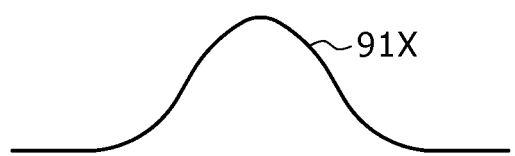

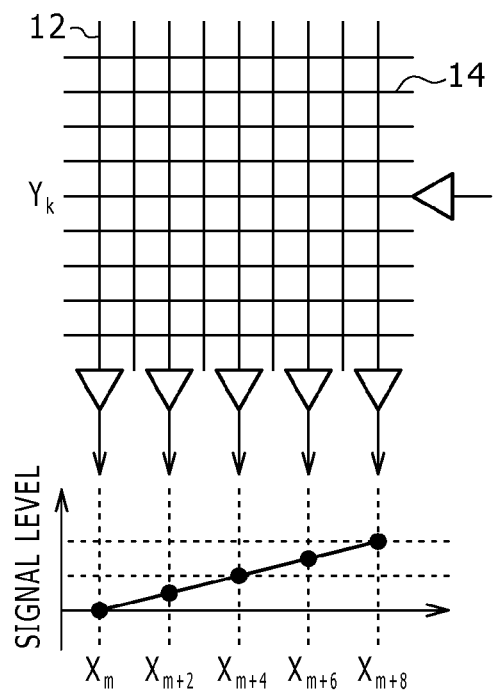
FIG.43A
FIG.43B
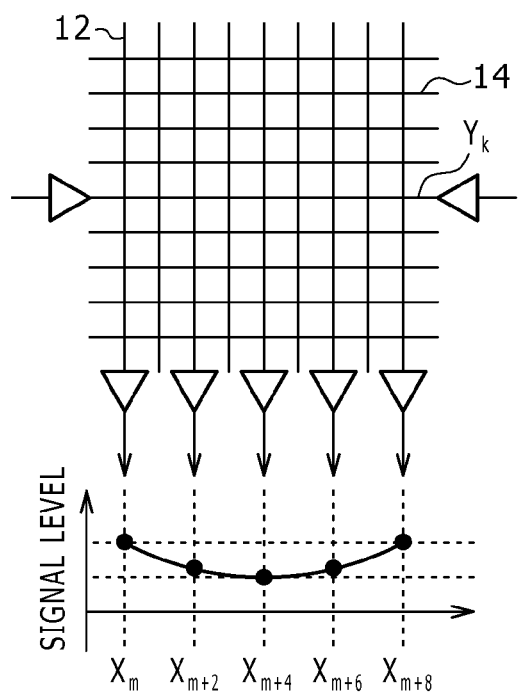
FIG.44A
FIG.44B

POINTER DETECTION APPARATUS AND POINTER DETECTION METHOD

CROSS-REFERENCE(S) TO RELATED APPLICATION(S)

The present application claims priority under 35 U.S.C. §119 from Japanese Patent Application JP 2009-145879 filed in the Japanese Patent Office on Jun. 18, 2009, the entire content of which is incorporated herein by reference.

BACKGROUND

1. Field of the Invention

This invention relates to a pointer detection apparatus and a pointer detection method, and more particularly to a pointer detection apparatus and a pointer detection method wherein the position of a pointer is detected by an electrostatic coupling system.

2. Description of the Related Art

Conventionally, for the detection of the position of a pointer such as a finger or a pen for use with a touch panel or a like apparatus, various systems have been proposed such as, for example, a resistive film system, an electrostatic coupling system, and an electrostatic capacity system. In recent years, a pointer detection apparatus including the electrostatic coupling system, from among the various systems mentioned above, has been vigorously developed.

Electrostatic coupling systems are roughly divided into two types including a surface capacitive type and a projected capacitive type. An electrostatic coupling system of the surface capacitive type is applied, for example, in an ATM (Automated Teller Machine), and that of the projected capacitive type is applied, for example, in a portable telephone set. It is to be noted that, in both types, a variation of the electrostatic coupling state between a conductive film and a pointer such as a finger or an electrostatic pen is detected to detect the position of the pointer.

A pointer detection apparatus of the projected capacitive type electrostatic coupling system includes an electrode formed in a predetermined pattern, for example, on a transparent substrate or a transparent film and detects a variation of the electrostatic coupling state between a pointer and the electrode when the pointer approaches the electrode. For a pointer detection apparatus of the type described, various techniques for optimizing the configuration have been proposed and are disclosed, for example, in Japanese Patent Laid-Open Nos. HEI 5-224818, HEI 6-4213, HEI 7-141088, HEI 8-87369, HEI 8-179871, HEI 8-190453, HEI 8-241161, HEI 9-45184, 2000-76014, 2000-105645, 2000-112642, and HEI 10-161795.

Here, operation of a pointer detection apparatus of the cross point type electrostatic coupling system developed from the projected capacitive type electrostatic coupling system is described briefly with reference to the accompanying drawings. FIGS. 62A and 62B illustrate a general configuration of a sensor section and a position detection principle of a pointer detection apparatus of the cross point type electrostatic coupling system.

Referring to FIGS. 62A and 62B, a sensor section 300 includes a transmission conductor group 303 formed from a plurality of transmission conductors 304, and a reception conductor group 301 formed from a plurality of reception conductors 302. An insulating film is formed between the transmission conductor group 303 and the reception conductor group 301. The transmission conductors 304 extend in a predetermined direction indicated by an arrow mark X and are disposed in parallel to each other and in a spaced relationship by a predetermined distance from each other. The reception conductors 302 are in the form of a wire extending in a direction crossing the extension direction of the transmission conductors 304, that is, in the direction indicated by an arrow mark Y in FIG. 62A and are disposed in parallel to each other and in a spaced relationship at a predetermined distance from each other.

In the sensor section 300 having the configuration described above, a predetermined signal is supplied to a predetermined one of the transmission conductors 304 and a variation of current flowing to a cross point between the predetermined transmission conductors 304 and a reception conductor 302 is detected at each of the cross points of the predetermined transmission conductors 304 and the reception conductors 302. A system of detection just described is generally called cross point type electrostatic coupling system. At a position of the sensor section 300 at which a pointer 310 such as a finger is placed, current is shunted through the pointer 310 and varies. Therefore, the position of the pointer 310 can be detected by detecting a cross point at which current exhibits a variation. Further, in a pointer detection apparatus of the cross point type electrostatic coupling system, multipoint detection is possible because a plurality of cross points are provided on the sensor section 300 as seen in FIGS. 62A and 62B.

A principle of position detection of the cross point type electrostatic coupling system will now be described more particularly. Assume for example that a predetermined signal is supplied to the transmission conductor $Y_6$ and a pointing position of the pointer 310 on the transmission conductor $Y_6$ is detected as seen in FIG. 62A. When a signal is supplied to the transmission conductor $Y_6$, the difference between currents flowing to the reception conductors $X_0$ and $X_1$ is detected through a differential amplifier 305. Then, after a predetermined interval of time, the reception conductors to be used for current difference detection are changed over from the reception conductors $X_0$ and $X_1$ to the reception conductors $X_1$ and $X_2$, and the current difference between the reception conductors $X_1$ and $X_2$ is detected. This operation is repeated up to the reception conductor $X_M$.

Thereupon, a level variation of an output signal of the differential amplifier 305 at the position of each cross point on the transmission conductor $Y_6$ is determined FIG. 62B illustrates a characteristic of the level variation. In FIG. 62B, the axis of abscissa indicates the distance from the reception conductor $X_0$ to each reception conductor, that is, the position of each reception conductor, and the axis of ordinate indicates the level of an output signal of the differential amplifier 305, that is, an output value of the differential amplifier 305. In FIG. 62B, a broken line curve represents a characteristic of the level variation of the output signal of the differential amplifier 305 and a solid line curve represents a characteristic of the integration value of the output signal of the differential amplifier 305.

In the example illustrated in FIGS. 62A and 62B, since the pointer 310 is placed in proximity to cross points of the reception conductors $X_4$ and $X_{M-5}$ on the transmission conductor $Y_6$, current flowing in proximity to the cross points varies. Therefore, in the example illustrated in FIG. 62B, the output signal of the differential amplifier 305 varies at corresponding positions in proximity to the cross points of the reception conductors $X_4$ and $X_{M-5}$ on the transmission conductor $Y_6$, and the integration value of the output signal exhibits a low value, that is, a negative value. The position of the pointer 310 can be detected based on the variation of the integration value. In the conventional pointer detection apparatus, the detection described above is carried out while successively changing over between the transmission conductors, to be used for the detection, one by one.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Since such a pointer detection apparatus of the cross point type electrostatic coupling system as described above carries out a position detection process of cross points one by one per every predetermined period of time, a long period of time is required for detection at all cross points. For example, if the sensor section includes 64 transmission conductors and 128 reception conductors and the detection processing time at each of the cross points is, for example, 256 msec, then a period of time of approximately 2 seconds is required for detection at all cross points, that is, at 8,192 cross points in total. Therefore, the pointer detection apparatus as described above is not suitable for practical use.

Therefore, it is an object of the present invention to provide a pointer detection apparatus and a pointer detection method by which detection of the position of a pointer by an electrostatic coupling system can be carried out at a higher speed.

To that end, a pointer detection apparatus is described that includes a conductor pattern with a plurality of conductors disposed in a first direction and a plurality of conductors disposed in a second direction which crosses the first direction. The apparatus further includes a multi-frequency signal production circuit configured to produce a plurality of signals of different frequencies, and a first conductor selection circuit configured to selectively supply said signals of different frequencies produced by the multi-frequency signal production circuit to those first conductors, between which N number of the first conductors are interposed, N being a predetermined integer equal to or greater than 0. The apparatus still further includes a second conductor selection circuit configured to selectively receive detection signals from the plurality of second conductors, and a signal detection circuit configured to detect signals of individual frequencies, corresponding to the signals of different frequencies produced by the multi-frequency signal production circuit, which are representative of coupling states at cross points between the first conductors and the second conductors and are received from said second conductor selection circuit.

According to another aspect of the present invention, a pointer detection method is described that includes: a first step of producing a plurality of signals of different frequencies; and a second step of selectively supplying the signals of different frequencies to a conductor pattern including a plurality of first conductors disposed in a first direction and a plurality of second conductors disposed in a second direction crossing the first direction. Specifically, the second step selectively supplies the signals of different frequencies to those first conductors, between which N number of the first conductors are interposed, N being a predetermined integer equal to or greater than 0. The method further includes a third step of selectively switching those second conductors from which detection signals are to be received; and a fourth step of obtaining signals of individual frequencies, corresponding to the signals of different frequencies produced at the first step, based on the detection signals supplied from the second conductors selected at the third step. The obtained signals of individual frequencies are representative of coupling states at cross points between the first conductors and the second conductors.

In the pointer detection apparatus and the pointer detection method, a plurality of signals having frequencies different from each other are supplied at the same time to the plurality of conductors on the transmission side. Meanwhile, on the reception side, signals of individual frequencies corresponding to the plurality of signals having different frequencies are detected to determine the position of a pointer on the conductor pattern. In other words, signal processing is executed in parallel between (among) the conductors on both of the transmission side and the reception side.

A plurality of signals of different frequencies are supplied at the same time to the plurality of conductors on the transmission side to detect the position of a pointer on the conductor pattern. In other words, the position detection process can be carried out at the same time for a plurality of cross points. Therefore, the present invention makes it possible for a pointer detection apparatus of the electrostatic coupling system to carry out position detection of a pointer at a higher speed.

Furthermore, the present invention makes it possible for a pointer detection apparatus of the electrostatic coupling system to carry out position detection of multiple positions (i.e., multiple positions of multiple pointers, or of multiple fingers of one or more users) at the same time.

The above and other objects, features, and advantages of the present invention will become apparent from the following description and the appended claims, taken in conjunction with the accompanying drawings.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a diagrammatic view of a transmission conductor selection circuit of the pointer detection apparatus of FIG. 1;

FIGS. 25A and 25B are diagrammatic views illustrating an example of rotation of the frequencies of periodic signals according to modification 9 to the pointer detection apparatus of FIG. 1;

FIGS. 26A to 26C are diagrammatic views illustrating another example of rotation of the frequencies of periodic signals according to modification 9 to the pointer detection apparatus of FIG. 1;

FIG. 28 is a similar view but illustrating an example of a supplying form of periodic signals and a detection form of an output signal according to modification 10 to the pointer detection apparatus of FIG. 1;

FIG. 43A is a diagrammatic view illustrating a supplying state of periodic signals upon one-sided transmission and FIG. 43B is a diagrammatic view illustrating the level of output signals;

FIG. 44A is a diagrammatic view illustrating a supplying form of periodic signals upon double-sided transmission according to modification 19 to the pointer detection apparatus of FIG. 1 and FIG. 44B is a diagrammatic view illustrating the level of output signals;

DETAILED DESCRIPTION

Several embodiments of the present invention will be described with reference to the accompanying drawings. One skilled in the art will appreciate that the present invention is not limited to the described embodiments; the descriptions are provided for illustrative purposes only. The description is given in the following order.

1. First Embodiment (example of scanning within a group in the frequency multiplexing system);

2. Second Embodiment (example of scanning while switching between block units in the frequency multiplexing system);

3. Third Embodiment (example of scanning of all conductors in the frequency multiplexing system); and 4. Fourth Embodiment (example wherein initial phases of multi-frequency signals are dispersed in the frequency multiplexing system).

1. First Embodiment

A first embodiment of the present invention relates to a basic configuration of a pointer detection apparatus and a pointer detection method of the present invention.

In the present embodiment, each of a transmission conductor group and a reception conductor group of a sensor section is divided into a plurality of groups, and signals in the form of periodic signals having frequencies different from each other among the different groups are supplied simultaneously, that is, multiplex transmitted. In the following description, the supplying form of signals in the present embodiment is referred to as "frequency multiplex system" or "frequency multiplex type," and a plurality of periodic signals supplied are generally referred to as "multi-frequency signal." The position detection system in the present invention is an electrostatic coupling system wherein the position of a pointer is detected based on a variation of the electrostatic coupling state between a transmission conductor and a reception conductor of the sensor section.

[Configuration of the Pointer (i.e., Position Indicator) Detection Apparatus]

Figure 1:
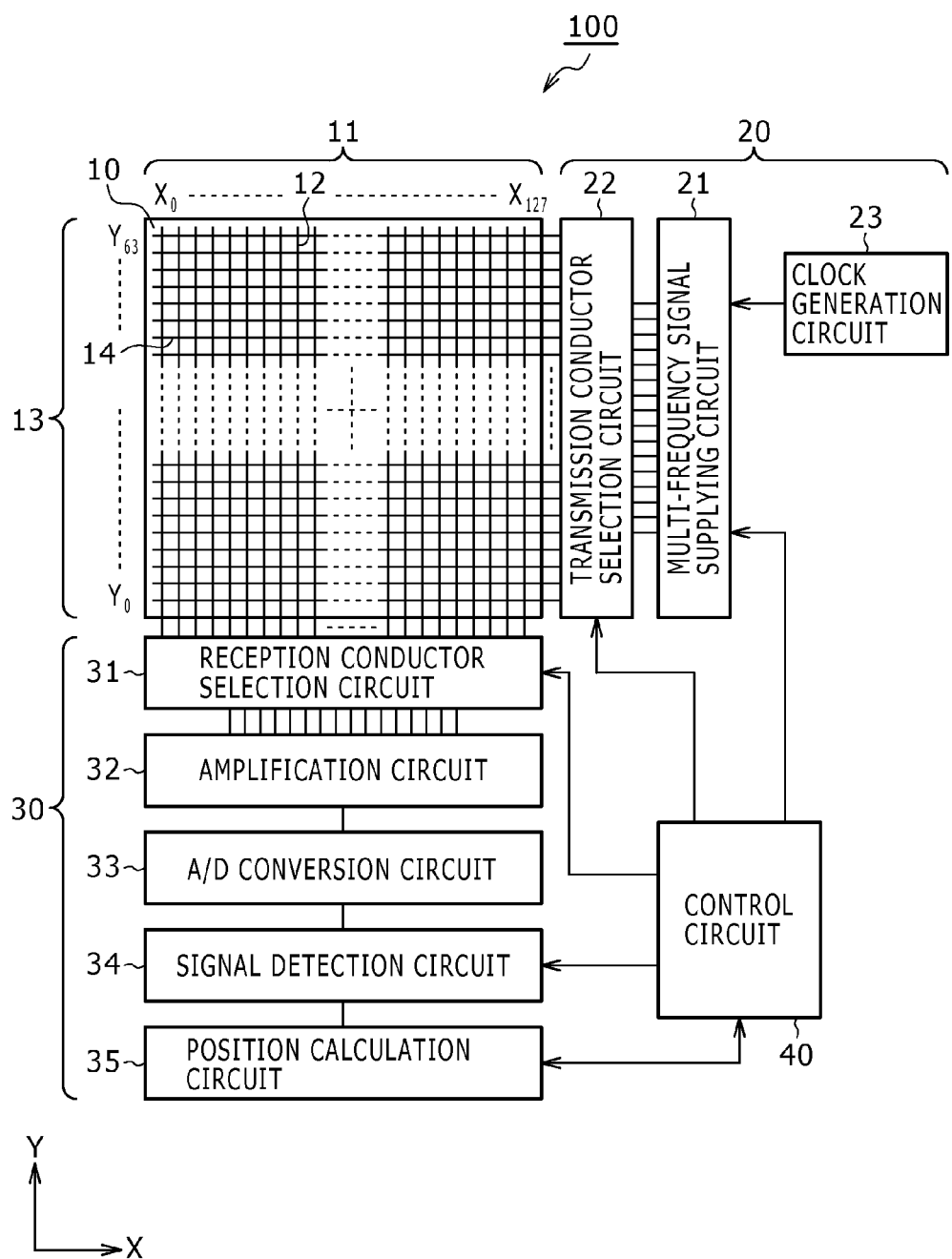
FIG. 1 is a schematic block diagram of a pointer detection apparatus according to a first embodiment of the present invention.

FIG. 1 shows a general configuration of the pointer detection apparatus according to the first embodiment of the present invention.

Referring to FIG. 1, a pointer detection apparatus 100 shown includes, as principal components thereof, a sensor section 10, a transmission section 20, a reception section 30, and a control circuit 40 for controlling operation of the transmission section 20 and the reception section 30. In the following, the components are described individually.

Figure 2:
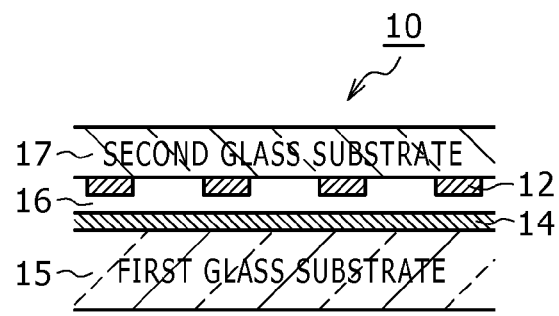
FIG. 2 is a schematic sectional view of a sensor section of the pointer detection apparatus of FIG. 1.

First, the configuration of the sensor section 10 is described with reference to FIGS. 1 and 2. FIG. 2 is a cross sectional view as viewed from along the direction indicated by an arrow marked X in FIG. 1. Referring first to FIG. 2, the sensor section 10 includes a first glass substrate 15, a reception conductor group 11 including a plurality of reception conductors 12, a spacer 16, a transmission conductor group 13 including a plurality of transmission conductors 14, and a second glass substrate 17. The transmission conductor group 13, spacer 16, reception conductor group 11 and second glass substrate 17 are formed in this order on the first glass substrate 15.

In the first embodiment, a pointer such as a finger or an electrostatic pen is used on the second glass substrate 17 side, that is, on the side opposite the face of the second glass substrate 17 that opposes the first glass substrate 15. Further, in the first embodiment, a substrate in the form of a sheet or film made of a synthetic resin or the like may be used in place of the first glass substrate 15 or the second glass substrate 17.

Each of the transmission conductors 14 and the reception conductors 12 is formed from a transparent electrode film, for example, of an ITO (Indium Tin Oxide), a copper foil, or the like. The electrode patterns of the transmission conductors 14 can be formed, for example, in the following manner. First, an electrode film formed from any of the materials described above is formed on the first glass substrate 15, for example, by sputtering, vapor deposition or application. Then, the electrode film is etched to form predetermined electrode patterns. Electrode patterns of the reception conductors 12 can be formed on the second glass substrate 17 in a similar manner. Where the transmission conductors 14 and the reception conductors 12 are formed from a copper foil, it is possible to use an ink jet printer to spray ink including copper particles in predetermined electrode patterns to a glass plate or the like to produce the conductors.

The spacer 16 may be formed from a synthetic resin material such as, for example, PVB (Polyvinyl Butyral), EVA (Ethylene Vinyl Acetate), an acrylic-based resin or the like. The spacer 16 may otherwise be formed from silicon rubber of a high refractive index, that is, from a high dielectric.

Where the spacer 16 is formed from a synthetic resin, it can be formed, for example, in the following manner. First, a synthetic resin sheet is sandwiched between the transmission conductors 14 and the reception conductors 12. Then, while evacuation between the conductors is carried out, pressurization and heating are carried out to form the spacer 16. As another example, a synthetic resin in the form of liquid may be supplied into a space between the transmission conductors 14 and the reception conductors 12, whereafter it is solidified to form the spacer 16.

Referring back to FIG. 1, the transmission conductor group 13 includes a plurality of transmission conductors 14 extending in a predetermined direction, indicated by an arrow mark X, and the transmission conductors 14 are disposed in parallel to each other and in a spaced relationship at a predetermined distance from each other. Meanwhile, the reception conductor group 11 includes a plurality of reception conductors 12 extending in a direction perpendicular to the extension direction of the transmission conductors 14, that is, in the direction indicated by an arrow mark Y in FIG. 1. The reception conductors 12 are disposed in parallel to each other and in a spaced relationship from each other. The transmission conductors 14 and the reception conductors 12 may each be formed from a conductor of a linear or plate shape or some other predetermined shape. In the first embodiment, the transmission conductors 14 and the reception conductors 12 are each formed in a linear shape. While in FIG. 1 the transmission conductors 14 and the reception conductors 12 are shown extending perpendicularly to each other, they may otherwise cross each other at an angle other than the right angle, for example, in an obliquely crossing relationship with each other. From an electric characteristic, the reception conductors should be formed with a width smaller than that of the transmission conductors. This will decrease the floating capacitance to thereby reduce noise, which may appear in the reception conductor.

In the first embodiment, the number of transmission conductors 14 is 64 and the number of reception conductors 12 is 128. Further, the disposition distance, that is, the pitch, of both of the transmission conductors 14 and the reception conductors 12 is 3.2 mm. However, the present invention is not limited to the configuration just described, and the number and the pitch of each of the transmission conductors 14 and the reception conductors 12 is set suitably in accordance with the size of the sensor section 10, required detection accuracy, and so forth.

The transmission conductors 14 in the transmission conductor group 13 are represented by indexes n from "0" to "63" in order, beginning with that of the transmission conductors 14 which is positioned nearest to the reception section 30. In the following description, a transmission conductor 14 corresponding to the index n is referred to as transmission conductor $Y_n$. The reception conductors 12 in the reception conductor group 11 are represented by index m from "0" to "127" in order, beginning with that of the reception conductors 12, which is positioned farthest from the transmission section 20. In the following description, a reception conductor 12 corresponding to the index m is referred to as reception conductor X.

Further, each of the transmission conductor group 13 and the reception conductor group 11 is divided into 16 groups or blocks. A group of the transmission conductor group 13 is hereinafter referred to as transmission block, and a group of the reception conductor group 11 is hereinafter referred to as detection block.

The transmission block includes four transmission conductors 14. In particular, each transmission block includes four transmission conductors 14 which are positioned adjacent to each other and have consecutive indexes n. More particularly, in the present embodiment, the transmission conductor group 13 is divided into blocks $\{Y_0 \text{ to } Y_3\}$, $\{Y_4 \text{ to } Y_7\}$, ..., $\{Y_{56} \text{ to } Y_{59}\}$ and $\{Y_{60} \text{ to } Y_{63}\}$.

Similarly, the detection block includes eight reception conductors 12. In particular, each detection block includes eight reception conductors 12 which are positioned adjacent to each other and have consecutive indexes m. More particularly, the reception conductor group 11 is divided into blocks $\{X_0 \text{ to } X_7\}$, $\{X_8 \text{ to } X_{15}\}$, ..., $\{X_{112} \text{ to } X_{119}\}$ and $\{X_{120} \text{ to } X_{127}\}$.

However, the present invention is not limited to the configuration just described. The number of conductors in one group, the number of groups, and the form of groups such as the positional relationship of the conductors belonging to the same group may be set suitably in accordance with the size of the sensor section 10, the required detection speed, and so forth. Details are hereinafter described.

The transmission section 20 includes a transmission conductor selection circuit 22, a multi-frequency signal supplying circuit 21 and a clock generation circuit 23. The transmission conductor selection circuit 22, multi-frequency signal supplying circuit 21 and clock generation circuit 23 are formed in this order from the sensor section 10 side. The multi-frequency signal supplying circuit 21 is connected to the clock generation circuit 23 and controlled by a clock signal output from the clock generation circuit 23.

Figure 3:
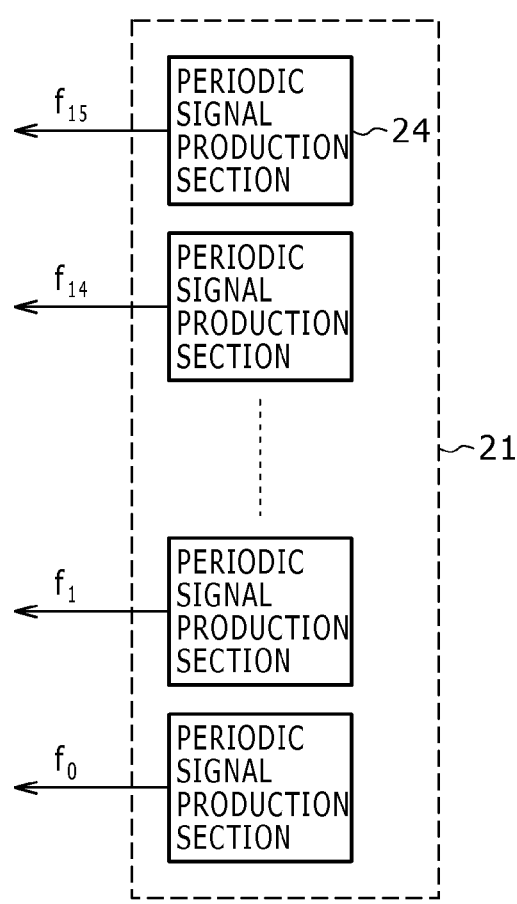
FIG. 3 is a block diagram of a multi-frequency signal supplying circuit of the pointer detection apparatus of FIG. 1.

FIG. 3 shows an example of a general configuration of the multi-frequency signal supplying circuit 21.

Referring to FIG. 3, the multi-frequency signal supplying circuit 21 in the first embodiment includes a number of periodic signal production sections 24 equal to the number of the transmission blocks of the reception conductor group 11, that is, 16 periodic signal production sections 24. The periodic signal production sections 24 individually produce a periodic signal of a fixed period under the control of the control circuit 40. In the first embodiment, the periodic signals produced by the periodic signal production sections 24 are denoted by indexes i from "0" to "15" in order beginning with that of the periodic signal production sections 24 that is positioned nearest to the reception section 30. The 16 periodic signals have 16 different frequencies different by 10 kHz from each other, for example, from 100 kHz to 250 kHz.

Figure 4:
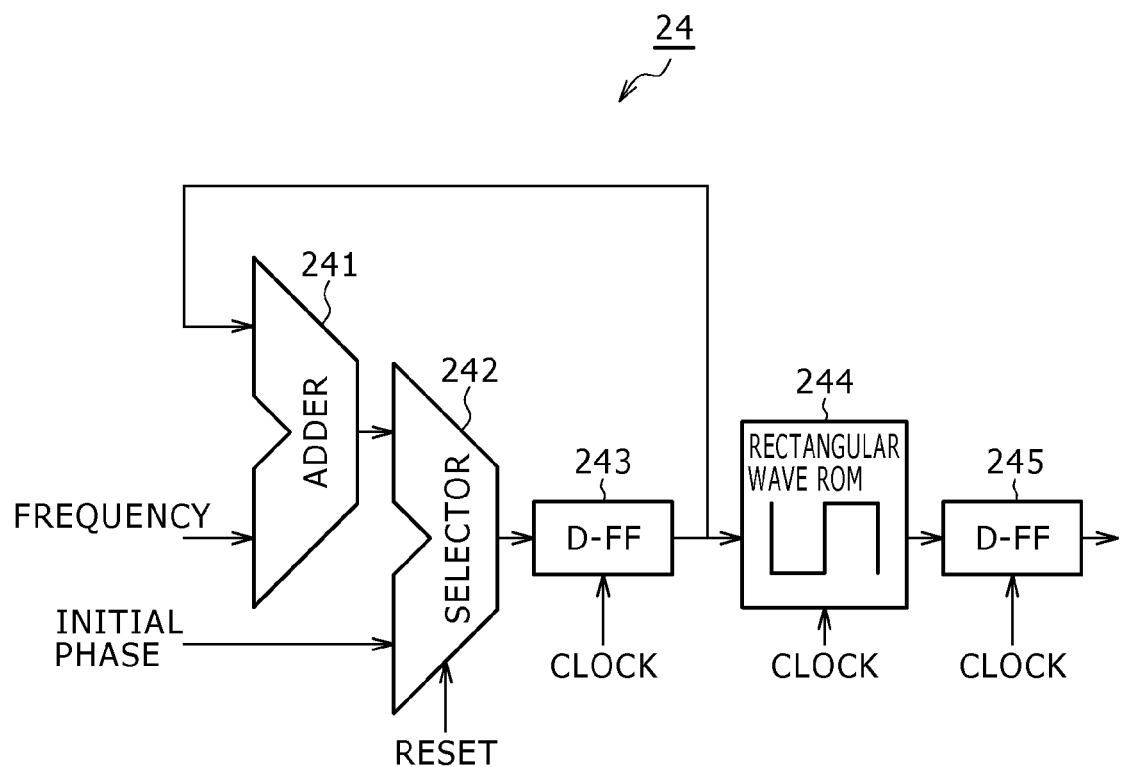
FIG. 4 is a block diagram of a periodic signal production section of the pointer detection apparatus of FIG. 1.

FIG. 4 shows a general configuration of the periodic signal production section 24. Referring to FIG. 4, the periodic signal production section 24 includes, as principal components thereof, an adder 241, a selector 242, a D-type flip-flop (hereinafter referred to as D-FF) 243, a rectangular wave ROM 244 and another D-FF 245. These components are individually described below.

The adder 241 has a pair of input terminals and a single output terminal for outputting a result of arithmetic operation. To one of the input terminals of the adder 241, frequency data which is a skipping over number designation signal is input from a register not shown. The frequency data is a digital signal indicative of one frequency within the range from 100 kHz and 250 kHz and is set for each of the periodic signal production sections 24 by the control circuit 40. An arithmetic operation result output from the output terminal of the adder 241 is input to the D-FF 243 through the selector 242, and an output of the D-FF 243 is input to the other input terminal of the adder 241.

The selector 242 has a pair of input terminals and a single output terminal for outputting a result of arithmetic operation. An arithmetic operation result from the adder 241 is input to one of the input terminals of the selector 242. Initial phase data is input from a register (not shown) to the other input terminal of the selector 242. The selector 242 selectively outputs one of the arithmetic operation result and the initial phase data input thereto. The initial phase data is a digital signal representative of, for example, 22.5°, 45° or 90°, and is set for each of the periodic signal production sections 24 by the control circuit 40. In the present embodiment, the initial phase is 0°.

The D-FF 243 temporarily retains data input thereto from the selector 242. To the D-FF 243, also a clock generated by the clock generation circuit 23 is input. The D-FF 243 stores data input thereto from the selector 242 at a timing of an edge of the clock input thereto from the clock generation circuit 23. An output of the D-FF 243 is input to the rectangular wave ROM 244 and also to the adder 241.

The rectangular wave ROM 244 is a ROM (Read Only Memory) in which data of, for example, a pseudo rectangular wave of 8 bits×256 samples is stored. In the periodic signal production section 24, the control circuit 40 or a special readout section designates an address of the rectangular wave ROM 244 in response to a signal input thereto from the D-FF 243, based on a clock supplied from the clock generation circuit 23, to read out data from the rectangular wave ROM 244. If the frequency data and the initial phase data from the registers change, the address of the rectangular wave ROM 244 from which data is to be output changes, and the frequency data and the initial phase of rectangular wave data to be output from the rectangular wave ROM 244 also change.

In order to make it possible to produce a plurality of frequencies, when an address for reading out data from the rectangular wave ROM 244 is designated, the periodic signal production section 24 designates the number of addresses to be skipped. Where data of the rectangular wave ROM 244 is to be read out using, for example, a 2.56-MHz clock without skipping out addresses at all, the frequency of a rectangular wave to be read out becomes 2.56 MHz÷256=10 kHz. Where skipping out addresses is to be carried out by one address to read out data of the rectangular wave ROM 244 using a 2.56-MHz clock, the frequency of the rectangular wave to be read out is 2.56 MHz÷(256÷2)=20 kHz. In other words, if the number of addresses to be skipped increases, the frequency also increases. The numerical value examples given above are a mere illustration, and the numerical values are not limited to them.

The D-FF 245 temporarily retains rectangular wave data input thereto from the rectangular wave ROM 244. The D-FF 245 outputs the temporarily retained rectangular wave data to the transmission conductor selection circuit 22 based on a clock data supplied thereto from the clock generation circuit 23.

An operation of the periodic signal production section 24 will now be described. In the periodic signal production section 24 configured in a manner described above, if a reset signal output from the control circuit 40 is input to the selector 242, then the selector 242 selects the initial phase. Then, a signal representative of the initial phase selected by the selector 242 is input to the D-FF 243, by which the initial phase is set. The former process (i.e., selection of the initial phase) is carried out earlier than a rising edge of the clock, and the latter process (i.e., inputting of the selected initial phase) is carried out later than the rising edge of the clock.

Then, the D-FF 243 inputs a signal representative of the initial phase to the adder 241 based on a clock generated by the clock generation circuit 23. The adder 241 carries out a process of adding the frequency data, which is a skipping out designation signal, to the signal input thereto from the D-FF 243 and representative of the initial phase. The adder 241 outputs a result of arithmetic operation thereof to the D-FF 243 through the selector 242. The arithmetic operation result, that is, the addition value obtained by the addition of the signal of the initial phase and the frequency data, is set in the D-FF 243. The addition value is supplied from the D-FF 243 to the rectangular wave ROM 244. Then, an address corresponding to the addition value is designated based on a clock generated by the clock generation circuit 23. Data is output from the rectangular wave ROM 244 in response to the designated address. The read out data is output to the transmission conductor selection circuit 22 through the D-FF 245. Thereafter, the loop process from the D-FF 243 to the adder 241 is repeated to carry out the addition process for a number of times equal to the number of the frequency data. By repeating a sequence of operations described above, rectangular wave data of an object frequency and an initial phase are obtained.

The first embodiment described is directed to a case where the periodic signals to be supplied to the transmission conductors have a rectangular waveform, which is a pulse waveform exhibiting upward and downward potential variations with respect to a reference potential of 0 volt. However, any periodic signal may be used as long as it has a fixed period. For example, the rectangular wave ROM 244 may be replaced by a sine wave ROM or a pulse wave ROM so as to produce a sine wave or a pulse wave, which is a rectangular wave oscillating between the 0 volt and another potential Vcc or which may be a negative signal having a polarity reversed from that of the rectangular wave. The rectangular wave described above may be regarded as a rectangular wave which oscillates upwardly and downwardly with reference to a potential, which is equal to one half the potential Vcc of the pulse wave. The periodic signal production section 24 may naturally be implemented without using various ROMS as described above.

Further, although, in the first embodiment, the initial phase of the periodic signals is set to 0°, and any of the initial phase and the frequency is not changed after it is set once, the frequency and the initial phase of the frequency signals to be produced by the periodic signal production section 24 are not limited to those of the example just described. Although the periodic signal production section 24 outputs the periodic signal at a certain timing, the periodic signal production section 24 is not limited to that example. Other examples are hereinafter described.

The selected one of the transmission conductors 14, to which a periodic signal is to be supplied, is changed over by the transmission conductor selection circuit 22 under the control of the control circuit 40. The transmission conductor selection circuit 22 in the first embodiment is formed of a number of switches equal to the number of groups of the transmission conductor group 13, that is, of 16 switches.

FIG. 5 shows an internal configuration of the transmission conductor selection circuit 22. Referring to FIG. 5, the transmission conductor selection circuit 22 includes a plurality of switches 22a for selectively supplying a periodic signal supplied thereto from the multi-frequency signal supplying circuit 21. The switches 22a are provided in a one-by-one corresponding relationship to transmission blocks 25. Each of the switches 22a has four terminals 22b on the output side thereof, which are individually connected to corresponding ones of the transmission conductors 14. Each of the switches 22a has one terminal 22c on the input side thereof, which is connected to an output terminal of a corresponding one of the periodic signal production sections 24 of the multi-frequency signal supplying circuit 21 shown in FIG. 3. Each of the switches 22a connects, at a predetermined interval of time, a selected one of the transmission conductors 14 and a terminal of a corresponding one of the periodic signal production sections 24, which outputs a frequency signal of a predetermined frequency $f_k$ (k=0 to 15), to each other. The changeover (switching) operation of the switches 22a is controlled by the control circuit 40.

Figure 6:
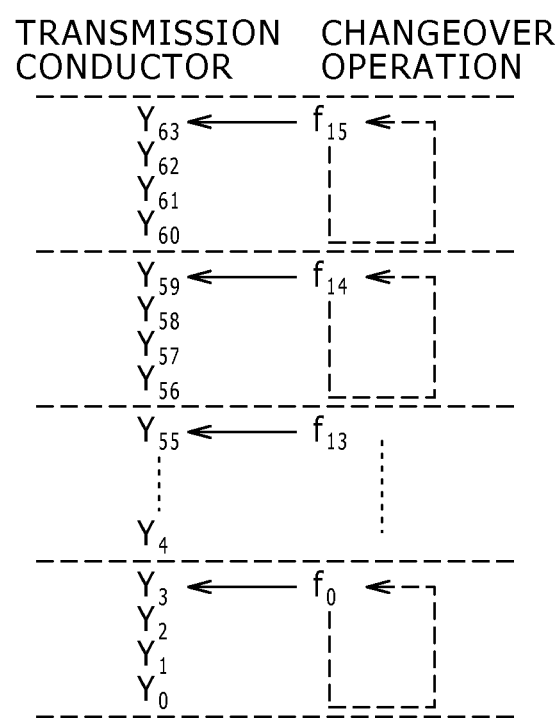
FIG. 6 is a diagrammatic view illustrating switching operation of transmission conductors in the pointer detection apparatus of FIG. 1.

FIG. 6 illustrates an example of the changeover (switching) operation of the transmission conductors 14 in the first embodiment. Referring to FIG. 6, the selected one of the transmission conductors 14, which has the highest index in each of the transmission blocks 25, that is, the transmission conductor $Y_3, Y_7, \ldots, Y_{59}$ or $Y_{63}$, is connected to an output terminal of a corresponding one of the periodic signal production sections 24 through a switch 22a as illustrated in FIG. 5.

Then, the periodic signals output from the periodic signal production sections 24 of the multi-frequency signal supplying circuit 21 and having frequencies different from each other are supplied at the same time to 16 transmission conductors 14 selected by the switches 22a of the transmission blocks 25. In this state, position detection of a pointer is carried out for a predetermined period of time. After the predetermined period of time passes, the switches 22a change over to be connected to adjacent ones of the transmission conductors 14 positioned in the direction in which the index n decreases, that is, to the transmission conductors $Y_2, Y_6, \ldots, Y_{58}$ and $Y_{62}$. Then, frequency signals output from the periodic signal production sections 24 of the multi-frequency signal supplying circuit 21 and having different frequencies are supplied at the same time to the 16 transmission conductors 14 after the changeover to carry out position detection. This series of operations is repeated to carry out position detection of at least one pointer.

After those transmission conductors 14, which have the lowest indexes in the individual transmission blocks 25, that is, the transmission conductors $Y_0, Y_4, \ldots, Y_{56}$ and $Y_{60}$, are selected by the switches 22a to carry out position detection of the pointer, those transmission conductors 14 having the highest indexes in the individual transmission blocks 25 are again selected by the switches 22a, and the series of operations described above are repeated in the individual groups. At this time, those transmission conductors 14, which are not selected by the switches 22a are preferably connected to an arbitrary reference potential or the ground potential. Where the transmission conductors, which are not selected by the switches 22a, are connected to an arbitrary reference potential or the ground potential such that noise, which may otherwise appear in those non-selected transmission conductors, can be minimized. Consequently, the noise resisting property can be improved. The procedure of the changeover (switching) operation of the transmission conductors 14 is not limited to the example described above with reference to FIG. 6. Modification is hereinafter described in detail.

As described above, in the transmission section 20, the plural transmission conductors 14 are divided into a plurality of groups, each including a predetermined number M (M is an integer equal to or greater than 2 (M≥2); in the example of FIG. 5, M=4) of conductors. The supply signals, that is, periodic signals of different frequencies produced by the multi-frequency signal supplying circuit 21 are supplied to predetermined transmission conductors 14, which form the groups, and are successively changed over to be supplied to adjacent conductors in the individual groups. Since the transmission section 20 is configured in a manner described above, periodic signals for position detection can be supplied at the same time to a plurality of transmission conductors 14. Because, in the example described, 16 different frequencies are utilized at the same time, the time required for transmission of a signal for position detection can be reduced to 1/16 of that according to the prior art.

In this embodiment, where the frequency increases from $f_0$ toward $f_{15}$, if a comparatively low frequency (for example, $f_0$) is supplied to a transmission conductor positioned at a comparatively remote position from the reception section 30 and a comparatively high frequency (for example, $f_{15}$) is supplied to a transmission conductor positioned at a comparatively near position to the reception section 30, a high reception sensitivity is obtained.

Referring back to FIG. 1, the reception section 30 includes a reception conductor selection circuit 31, an amplification circuit 32, an A/D (Analog to Digital) conversion circuit section 33, a signal detection circuit 34 and a position calculation circuit 35. The reception conductor selection circuit 31, amplification circuit 32, A/D conversion circuit 33, signal detection circuit 34 and position calculation circuit 35 are disposed in this order from the sensor section 10 side.

The reception conductor selection circuit 31 in the first embodiment includes a number of switches equal to the number of detection blocks of the reception conductor group 11, that is, 16 switches.

Figure 7:
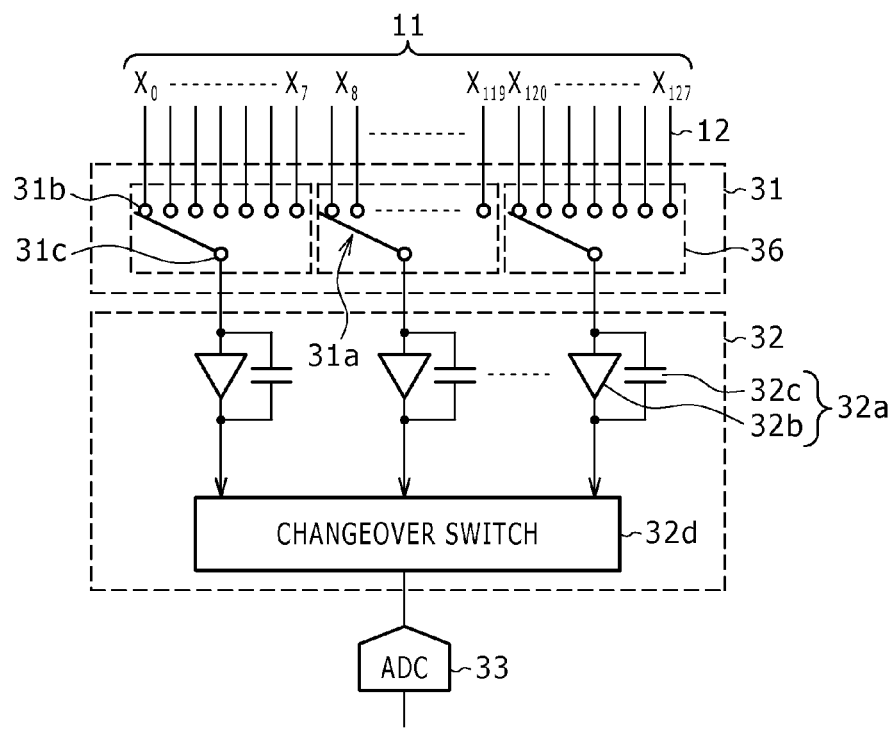
FIG. 7 is a diagrammatic view of a reception conductor selection circuit and an amplification circuit of the pointer detection apparatus of FIG. 1.

FIG. 7 shows a general configuration of the reception conductor selection circuit 31 and associated elements. Referring to FIG. 7, the reception conductor selection circuit 31 includes a plurality of switches 31a. The switches 31a are provided in a one-by-one corresponding relationship with the detection blocks 36. Each of the switches 31a has eight terminals 31b on the input side thereof, which are connected to corresponding ones of the reception conductors 12. Each of the switches 31a has a terminal 31c on the output side thereof, which is connected to an input terminal of a corresponding one of I/V conversion circuits 32a hereinafter described. Further, each of the switches 31a changes over between the reception conductors 12, which is to be connected to the corresponding I/V conversion circuit 32a. Outputs of the I/V conversion circuits 32a are output to a changeover switch 32d.

The changeover switch 32d successively changes over between the I/V conversion circuits 32a, which is to be connected to the A/D conversion circuit 33 after every predetermined interval of time to output voltage signals time-divisionally to the A/D conversion circuit 33. Where the configuration just described is used, it is necessary to provide only one system of an A/D conversion circuit 33 and a circuit group (synchronous detection circuit 37 and so forth), which is disposed at a succeeding stage to the A/D conversion circuit 33 in the reception section 30. Therefore, the circuit configuration of the reception section 30 is simple. The changeover switch 32d may be provided either in the amplification circuit 32 or in the A/D conversion circuit 33.

Figure 8:
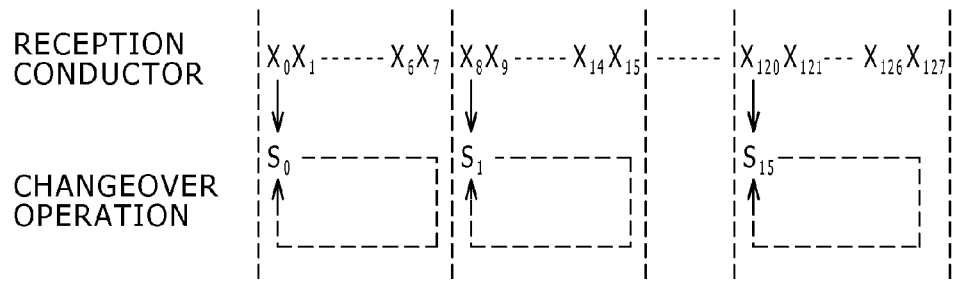
FIG. 8 is a diagrammatic view illustrating switching operation of reception conductors in the pointer detection apparatus of FIG. 1.

FIG. 8 illustrates changeover (switching) operation of the reception conductors 12 by the switches 31a. Referring to FIG. 8, the changeover operation of each of the switches 31a is controlled by the control circuit 40. In this example, it is assumed that the switches 31a in the detection blocks 36 are first connected to those reception conductors 12 having the lowest indexes, that is, to the reception conductors $X_0$, $X_8, \ldots, X_{112}$ and $X_{120}$, as seen in FIG. 7. In this state, position detection of a pointer is carried out at the same time by those reception conductors 12, which are currently selected, for a predetermined period of time to obtain output signals $S_0$, $S_1, \ldots, S_{15}$ of the individual groups.

When the predetermined period of time elapses, the switches 31a change over the connection of the reception conductors 12 to adjacent ones of the reception conductors 12 which are positioned in the direction in which the index m increases, that is, to the reception conductors $X_1, X_9, \ldots, X_{113}$ and $X_{12i}$. Then, output signals output from the reception conductors $X_1, X_9, \ldots, X_{113}$ and $X_{121}$ connected to the switches 31a after the changeover, that is, output signals $S_0$, $S_1, \ldots, S_{15}$ of the individual groups, are obtained. Thereafter, the switches 31a repeat this sequence of operations to carry out position detection of the pointer.

Then, the switches 31a are connected to the reception conductors 12 having the highest indexes in the individual detection blocks 36, that is, to the reception conductors $X_7$, $X_{15}, \ldots, X_{119}$ and $X_{127}$, and position detection of a pointer is carried out at the same time by the reception conductors 12. Thereafter, the switches 31a are again connected to the reception conductors 12 having the lowest indexes in the individual detection blocks 36, and the operations described above are repeated in the individual blocks. At this time, those reception conductors 12 which are not selected by the switches 31a are preferably connected to an arbitrary reference potential or the ground potential. Where the reception conductors, which are not selected by the switches 31a, are connected to an arbitrary reference potential or the ground potential, noise, which may otherwise appear in the non-selected reception conductors, can be minimized Consequently, the noise resisting property can be improved. The changeover (switching) operation of the reception conductors 12 is not limited to the example described above with reference to FIG. 8. Modification is hereinafter described in detail.

As described above, in the reception section 30, the reception conductors 12 are divided into a plurality of groups, each including a plurality of conductors. Then, at least one conductor which forms each group is selected, and the conductor to be selected is successively changed over among the conductors which form each group. In the configuration just described, multiple output signals for position detection can be obtained at the same time from the reception conductor group 11. Since the reception conductor group 11 is divided into 16 groups, the time required for reception of a signal for position detection can be reduced to 1/16 of that of the prior art.

The amplification circuit 32 acquires current signals output from the reception conductors 12, converts the current signals into voltage signals, and amplifies the voltage signals. Referring to FIG. 7, the amplification circuit 32 includes a number of I/V conversion circuits 32a equal to the number of detection groups of the reception conductor group 11, that is, 16 UV conversion circuits 32a. The amplification circuit 32 also includes a changeover circuit 32d. One I/V conversion circuit 32a is connected to each of the detection blocks 36. In the present embodiment, each of the I/V conversion circuits 32a includes an amplifier 32b in the form of an operational amplifier having one input and one output, and a capacitor 32c connected to the amplifier 32b. A resistance element, a transistor, or the like, may be connected in parallel to the capacitor 32c in order to adjust the dc bias (omitted in FIG. 7).

The A/D conversion circuit 33 is connected to the amplification circuit 32 and converts an analog signal output from the amplification circuit 32 into a digital signal. An A/D converter known in the art may be used for the A/D conversion circuit 33.

Referring back to FIG. 1, the signal detection circuit 34 is connected to the A/D conversion circuit 33 and detects, from within an output signal from the A/D conversion circuit 33, a signal of an object frequency from a plurality of signals of different frequencies produced by the multi-frequency signal supplying circuit 21. More particularly, the signal detection circuit 34 determines a cross point and the level of the detection signal at the cross point. Then, the signal detection circuit 34 connects the levels of such detection signals between adjacent ones of the cross points and calculates a level curved surface of a mountain shape which exhibits an apex or peak at the cross point $[X_m, Y_n]$, at which the pointer touches. Then, the signal detection circuit 34 outputs the level curved surface as bit map data to the position calculation circuit 35.

Figure 9:
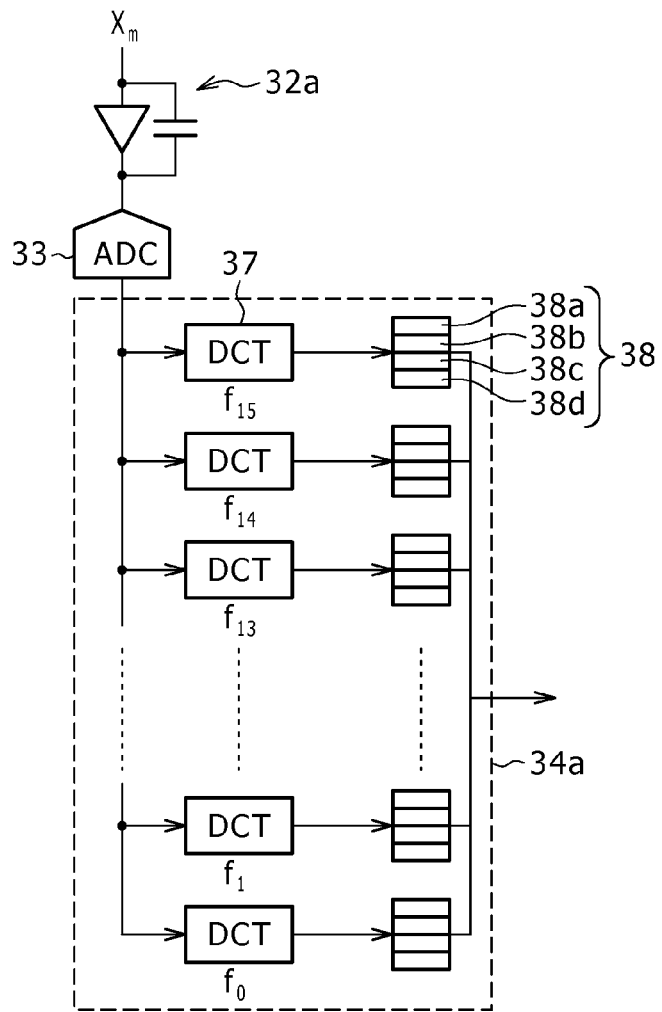
FIG. 9 is a block diagram of a reception section of the pointer detection apparatus of FIG. 1.

Referring to FIG. 9, the signal detection circuit 34 includes a signal detection section 34a having a number of synchronous detection circuits 37 equal to the number of the periodic signals, that is, 16 synchronous detection circuits 37, corresponding to the periodic signal production sections 24. The signal detection section 34a is connected at an input terminal thereof to an output terminal of the A/D conversion circuit 33. In the example of FIG. 7, the changeover switch 32d, which functions as a circuit for time-divisional selection, is provided on the output side of the I/V conversion circuit 32a. However, the changeover switch 32d may be replaced by a number of A/D conversion circuits equal to the number of the detection blocks 36.

FIG. 9 illustrates a connection relationship of the I/V conversion circuit 32a, which forms the amplification circuit 32, the A/D conversion circuit 33, and the signal detection sections 34a, which form the signal detection circuit 34, and an internal configuration of the signal detection section 34a. Referring to FIG. 9, an I/V conversion circuit 32a, an A/D conversion circuit 33 and a signal detection section 34a are connected in series in this order from the reception conductors 12 side.

A current signal output from a reception conductor 12 is converted into a voltage signal and amplified by the UV conversion circuit 32a. The amplified signal is input to the A/D conversion circuit 33, where it is converted into a digital signal. The digital signal is input to the signal detection section 34a. Then, the signal detection section 34a detects, from within the digital signal, a signal of the same frequency as that of the periodic signal output from a corresponding one of the periodic signal production sections 24 in the multi-frequency signal supplying circuit 21.

The signal detection section 34a includes a plurality of synchronous detection circuits 37 and a plurality of registers 38 individually connected to the synchronous detection circuits 37. Each of the registers 38 is divided into four regions 38a to 38d. The registers 38 correspond to the transmission blocks 25 of the transmission conductor selection circuit 22, and the regions 38a to 38d in each of the registers 38 correspond to transmission conductors in a corresponding one of the transmission blocks 25. For example, data obtained by dividing output signals from the reception conductors 12 corresponding to periodic signals supplied to the transmission conductors $Y_{63}$ to $Y_{60}$ by one of the synchronous detection circuits 37 is stored into the regions 38a to 38d of the register 38 connected to the synchronous detection circuit 37. Instead of dividing each register 38 into four regions 38a to 38d as in the example described above, four independent registers may be provided for one synchronous detection circuit.

Each of the synchronous detection circuits 37 detects a signal of an object frequency from within the signal input thereto. The number of synchronous detection circuits 37 provided is equal to the number of the periodic signals, that is, 16, and the synchronous detection circuits 37 are connected in parallel to each other. Which one of the frequencies each of the synchronous detection circuits 37 should detect is controlled in an interlocking relationship with production of the periodic signal of the multi-frequency signal supplying circuit 21 and changeover (switching) of the transmission conductors 14 by the transmission conductor selection circuit 22 based on the timing signals inputting from the control circuit 40. In the example of FIG. 9, the synchronous detection circuits 37 are represented by indexes j from "0" to "15" in order beginning with that of the synchronous detection circuits 37 that is positioned remote from the A/D conversion circuit 33. In the following description, a synchronous detection circuit 37 corresponding to the index j is referred to as DCT. The synchronous detection circuits 37 at the first to 16th stages ($DCT_0$ to $DCT_{15}$) are connected at an input terminal thereof to the output terminal of the A/D conversion circuit 33. DCT means "discrete cosine transform."

Figure 10:
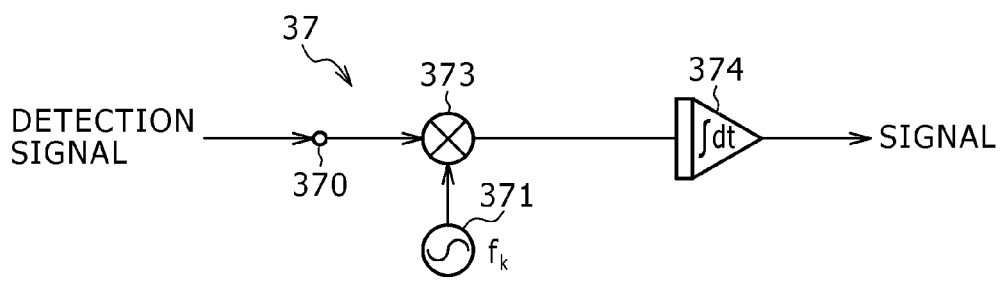
FIG. 10 is a block diagram of a synchronous detection circuit section of the pointer detection apparatus of FIG. 1.

FIG. 10 shows a general configuration of the synchronous detection circuit 37. Referring to FIG. 10, the synchronous detection circuit 37 includes, as principal components thereof, an input terminal 370, a signal source 371 for generating a frequency signal of a frequency $f_k$ that is the object of detection, a multiplier 373 and an integrator 374. If a detection signal or an output signal is input from a reception conductor 12 to the synchronous detection circuit 37 through the A/D conversion circuit 33, it is supplied to the multiplier 373 of the synchronous detection circuit 37 through the input terminal 370. A periodic signal having a frequency $f_k$ is input from the signal source 371 to the multiplier 373, and the detection signal and the periodic signal of the frequency $f_k$ are multiplied to detect an object signal. Then, the detection signal is input to the integrator 374, where it is temporally integrated and output.

Where the frequency $f_k$ of the periodic signal to be generated by the signal source 371 is set in this manner, a signal or signal component of the object frequency can be detected. A noise signal has a characteristic that, if an output for a fixed period of time is integrated, components having frequencies different from the frequency $f_k$ are suppressed significantly. Therefore, if a signal component and noise components included in an output signal are integrated for a fixed period of time using the integrator 374, the signal component is amplified while the noise components cancel each other and are compressed.

If a $\pi/2$ phase shifter is used to shift the phase of the detection signal by $\pi/2$ to carry out detection, it is possible to detect a frequency signal of the frequency $f_k$ having a phase displaced by $\pi/2$ from the signal component included in the detection signal. In other words, a DFT (Discrete Fourier Transform) configuration may be used, and this configuration may be preferable in a pointer detection apparatus that uses an electrostatic pen, in that a detectable phase range is expanded.

Referring back to FIG. 9, the number of registers 38 is equal to the number of the transmission conductors 14 ($Y_0$ to $Y_{63}$) similarly to the synchronous detection circuits 37, and the registers 38 are individually connected to the synchronous detection circuits 37 ($DCT_0$ to $DCT_{15}$). The registers 38 (regions 38a to 38d) retain signals detected by the corresponding synchronous detection circuits 37, and the signals retained in the registers 38 are read out to the position calculation circuit 35 based on timing signals from the control circuit 40.

Referring back to FIG. 1, the position calculation circuit 35 detects, from signals sent from the register 38 (regions 38a to 38d) of the synchronous detection circuits 37, a reception conductor 12, from which a signal which exhibits a dropped signal level is output, and a frequency of the signal. Then, the position calculation circuit 35 calculates the position of the pointer based on the index m (0 to 127) of the reception conductor 12 specified from the signal read out from the register 38 and the index n (0 to 63) of the transmission conductor 14 from which the corresponding periodic signal is supplied. The series of operations by the synchronous detection circuit 37 described above are carried out for the entire reception conductor group 11 in an interlocking relationship. A periodic signal is produced by the multi-frequency signal supplying circuit 21 and changeover of the transmission conductor 14 is carried out by the transmission conductor selection circuit 22. The position calculation circuit 35 outputs not only the position (coordinate) of a cross point, at which a pointer is placed, but also information of the surface area of the sensor section 10 over which the pointer is placed, and the pressure applied to the sensor section 10 by the pointer.

[Principle of Position Detection]

Now, the principle of position detection of a pointer by the pointer detection apparatus of the present embodiment will be described. As described above, the detection system of the present embodiment is an electrostatic coupling system of the cross point type. It detects the position of a pointer based on a variation of the electrostatic coupling state between the transmission conductors and the reception conductors of the sensor section.

Figure 11A:
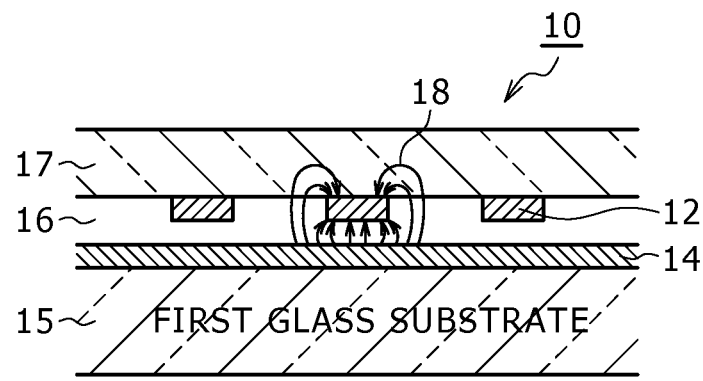
FIG. 11A is a schematic view illustrating an electrostatic coupling state between a transmission conductor and a reception conductor where no pointer exists on the sensor section shown in FIG. 2.

An electrostatic coupling state between a transmission conductor 14 and a reception conductor 12 varies depending upon whether a pointer exists on the sensor section 10. FIG. 11A illustrates an electrostatic coupling state between a transmission conductor 14 and a reception conductor 12 where no pointer exists on the sensor section 10, and FIG. 11B illustrates an electrostatic coupling state between the transmission conductor 14 and the reception conductor 12 where a pointer exists on the sensor section 10.

If a pointer does not exist on the sensor section 10, as seen in FIG. 11A, the transmission conductor 14 and the reception conductor 12 are capacitively coupled to each other through the spacer 16, and an electric field emerging from the transmission conductor 14 converges to the reception conductor 12. As a result, current of a predetermined value flows between the transmission conductor 14 and the reception conductor 12.

Figure 11B:
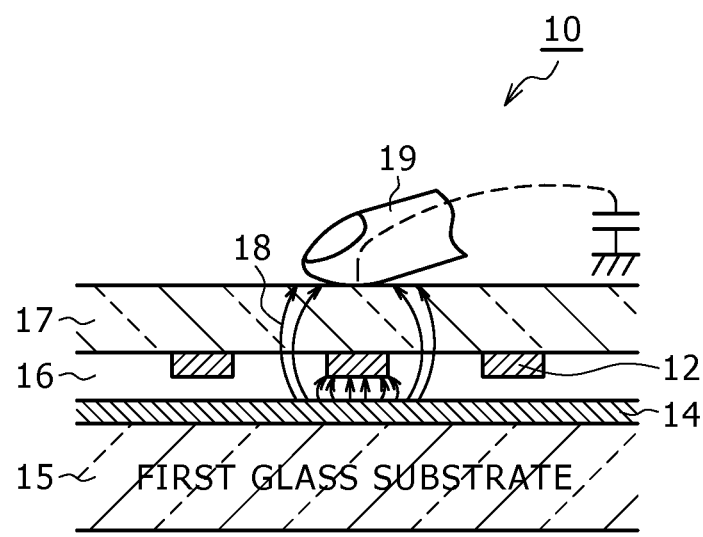
FIG. 11B is a similar view but illustrating another electrostatic coupling state between the transmission conductor and the reception conductor where a pointer exists on the sensor section shown in FIG. 2.

However, if a finger 19 as a pointer exists on the sensor section 10, as seen in FIG. 11B, the reception conductor 12 is capacitively coupled not only to the transmission conductor 14 but also to the ground through the finger 19. In the state just described, part of an electric field emerging from the transmission conductor 14 converges to the finger 19 and part of current flowing between the transmission conductor 14 and the reception conductor 12 flows to the ground through the finger 19. As a result, the value of current flowing into the reception conductor 12 decreases. In the electrostatic coupling system, a variation of the value of current output from the reception conductor 12 is detected by the reception section 30 to detect the position of the pointer.

A position detection where a finger 19 is placed on a plurality of cross points of the sensor section 10 at the same time will now be described with reference to FIGS. 12A to 12D.

Figure 12A:
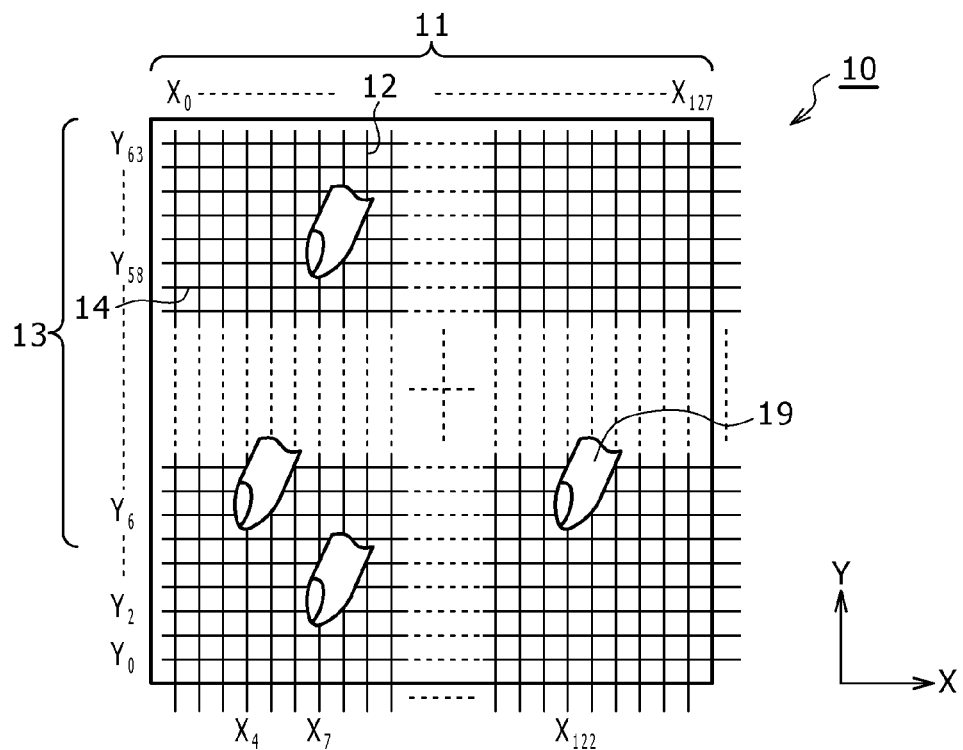
FIG. 12A is a schematic view illustrating a multi-touch state of the pointer detection apparatus of FIG. 1, and FIGS. 12B, 12C and 12D are waveform diagrams respectively illustrating a waveform of output signals of the reception conductors on a transmission conductor, another detection waveform of output signals of the reception conductors on another transmission conductor, and a further detection waveform of output signals of the reception conductors on a further transmission conductor.
Figure 12B:
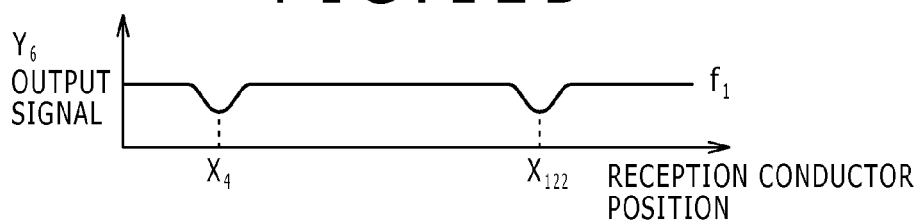
Figure 12C:
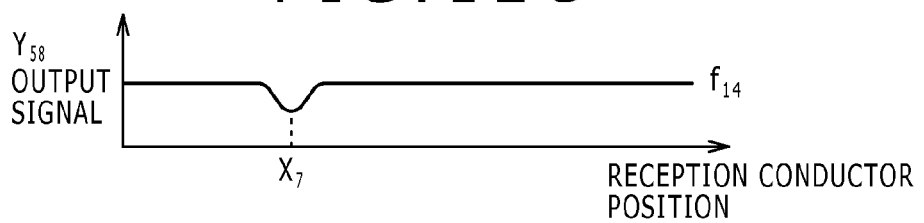
Figure 12D:
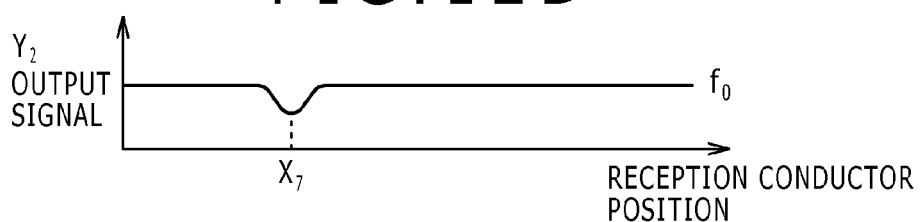

FIG. 12A shows the pointer detection apparatus 100 where a finger 19 is placed at a point (grid) of a certain transmission conductor and a certain reception conductor of the sensor section 10. Here, as an example, attention is directed to cross points between the transmission conductor $Y_6$ and the reception conductor $X_4$ and between the transmission conductor $Y_6$ and the reception conductor $X_{122}$. FIG. 12B illustrates output signals of the reception conductor $X_4$ and the reception conductor $X_{122}$ on the transmission conductor $Y_6$. FIG. 12C illustrates a detection waveform of an output signal of the reception conductor $X_7$ on the transmission conductor $Y_{58}$. FIG. 12D illustrates a detection waveform of an output signal from the reception conductor $X_7$ on the transmission conductor $Y_2$.

As described above, if a finger 19 does not exist on the sensor section 10, output current from the reception conductor 12 has a predetermined value. However, if a finger 19 is placed in proximity to the cross points between the transmission conductor $Y_6$ and the reception conductor $X_4$ and between the transmission conductor $Y_6$ and the reception conductor $X_{122}$, the electrostatic coupling state between the transmission conductor $Y_6$ and the reception conductor $X_4$, and between the transmission conductor $Y_6$ and the reception conductor $X_{122}$ varies as described above with reference to FIGS. 11A and 11B. Consequently, the current flowing into the reception conductors $X_4$ and $X_{122}$ at the cross points varies. Thereupon, the frequency $f_1$ of the current output from the reception conductor $X_4$ and the reception conductor $X_{122}$ corresponds to the frequency $f_1$ of the periodic signal supplied to the transmission conductor $Y_6$.

The reception conductor $X_4$ has a detection order number of five in the detection block 36 (refer to FIG. 7), and the reception conductor $X_{122}$ has a detection order number of three in the detection block 36 (refer to FIG. 7). Therefore, the synchronous detection circuit 37 detects the output signal of the reception conductor $X_{122}$ with the same frequency as that of the periodic signal supplied to the transmission conductor 14 at a certain clock time, and then detects the output signal of the reception conductor $X_4$ with the same frequency after an interval of two clocks. The output signals of the reception conductor $X_4$ and the reception conductor $X_{122}$ have a decreased level and the position of the finger can be detected in this manner.

If multiple fingers 19 are placed on a plurality of cross points along one of the reception conductors 12 of the sensor section 10, the positions can be detected similarly. A detection operation where multiple fingers are placed on a plurality of cross points along the same reception conductor 12 is described below.

It is assumed that fingers 19 are placed on the transmission conductor $Y_{58}$ and $Y_2$ along the reception conductor $X_7$ of the sensor section 10, as seen in FIG. 12A. A periodic signal of a frequency $f_{14}$ is supplied to the transmission conductor $Y_{58}$, while another synchronizing signal of the frequency $f_a$ is supplied to the transmission conductor $Y_2$. Here, the transmission conductor $Y_{58}$ has a supplying order number of three in the corresponding transmission block 25, as shown in FIG. 5, and the transmission conductor $Y_2$ also has a supplying order number of three in the corresponding transmission block 25, as shown in FIG. 5. Therefore, an output signal of the reception conductor $X_7$ is detected simultaneously, with the frequencies $f_{14}$ and $f_0$ of the periodic signals supplied to the transmission conductors 14, by the DCTs $DCT_{14}$ and $DCT_0$ of the synchronous detection circuits 37. In this manner, it is detected that the levels of the output signals of the reception conductor $X_7$ with respect to the transmission conductor $Y_{58}$ and the reception conductor $X_7$ with respect to the transmission conductor $Y_2$ decrease as seen in FIGS. 12C and 12D, respectively, and thus the positions of the fingers can be specified.

In the cross point type electrostatic coupling system configured in a manner described above, the position of a finger 19 can be specified by detecting the index n (0 to 63) of the transmission conductor 14, to which a periodic signal is applied, and the index m (0 to 127) of the reception conductor 12, on which reduction of the output signal is detected. On the other hand, in the projection type electrostatic coupling system, where fingers may overlap with each other, it is impossible to specify the positions of the fingers.

It is to be noted that, when the supplying order of periodic signals to the transmission conductors 14 differs depending upon the place of a cross point (transmission conductor), the order in which a variation of current flowing to the cross points can be detected through the same reception conductor 12 becomes different. In other words, the timing at which variations of current flowing to the cross points are detected is not always the same, as in the case just described above wherein the fingers 19 are placed on the transmission conductors $Y_{58}$ and $Y_2$ along the reception conductor $X_7$.

Where a finger 19 is placed over a plurality of successive cross points of the sensor section 10, the position of the finger 19 can be detected in accordance with a principle similar to that described above. In this instance, the positions of the cross points to be detected appear successively, and a region in which the finger 19 is placed over can be detected. In other words, the shape of the finger 19 placed on the sensor section 10 can be estimated. Therefore, in the present embodiment, not only the position of a pointer disposed on the sensor section 10, but also the shape of the pointer placed at the sensor section 10 can be estimated. For example, where the palm is placed on the sensor section 10, not only the position of the hand, but also the shape of the palm of the hand can be estimated.

[Operation of the Pointer Detection Apparatus]

Figure 13:
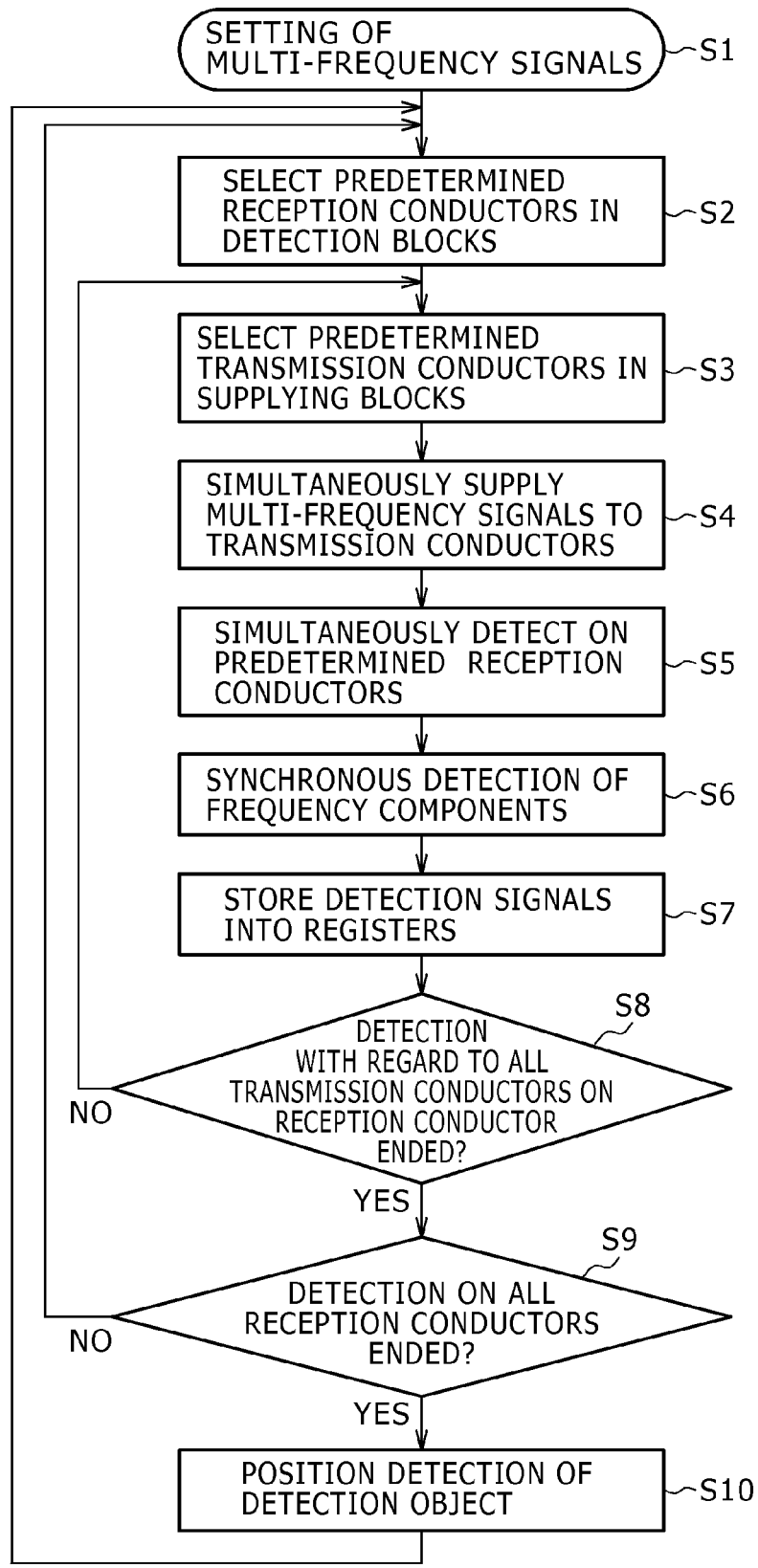
FIG. 13 is a flow chart illustrating a procedure for position detection by the pointer detection apparatus of FIG. 1.

An operation of the pointer detection apparatus 100 of the present embodiment will now be described with reference to the drawings. FIG. 13 illustrates a detection procedure of a pointer by the pointer detection apparatus 100 of the present embodiment.

First, each of the periodic signal production sections 24 in the multi-frequency signal supplying circuit 21 sets a periodic signal of a frequency allocated thereto by the control circuit 40 at step S1.

Then, the reception conductor selection circuit 31 of the reception section 30 uses the switches 31a to select a predetermined reception conductor 12 in each of the detection blocks 36, and connects the selected reception conductors 12 to the corresponding IN conversion circuits 32a at step S2.

Then, the transmission conductor selection circuit 22 selects one of the transmission conductors 14, to which a periodic signal is to be supplied in each of the transmission blocks 25, at step S3. The multi-frequency signal supplying circuit 21 supplies, to the predetermined transmission conductors 14 selected in the transmission blocks 25, corresponding periodic signals at the same time at step S4. The predetermined reception conductors 12 in the detection blocks 36 to be selected upon starting the position detection process are preferably selected in advance before the periodic signals are supplied to the transmission conductor group 13.

Then, the reception section 30 detects output current from the predetermined reception conductors 12 selected at step S2 at the same time at step S5. In particular, the amplification circuit 32 first converts the output current from the selected predetermined reception conductors 12, that is, from the 16 reception conductors 12, into voltages, amplifies the voltages, and outputs the amplified signals to the A/D conversion circuit 33. At this time, the output current is converted into voltages by the IN conversion circuits 32a connected to the reception conductors 12 and amplified. Thereafter, the A/D conversion circuit 33 A/D converts the input voltage signals and outputs the resulting digital signals to the signal detection circuit 34.

Then, the signal detection circuit 34 synchronously detects the different frequency components from the digital signals input thereto at step S6. In particular, the signal detection sections 34a connected to the A/D conversion circuit 33 detect signals of the same frequencies as the frequencies supplied to the transmission conductors 14 from the signals detected through the corresponding reception conductors 12. Then, the signal detection circuit 34 stores the signals calculated with regard to the predetermined reception conductors 12 into the registers 38 (regions 38a to 38d) at step S7.

Then, the control circuit 40 decides at step S8 whether or not the position detection with regard to all transmission conductors 14 ends on the reception conductors 12 selected at step S2. If the position detection with regard to all transmission conductors 14 does not end on the selected reception conductors 12, that is, if the result of the decision at step S8 is NO, then the processing returns to step S3, at which the switches 22a in the transmission blocks 25 in the transmission conductor selection circuit 22 are changed over to select the transmission conductors 14 different from those in the preceding operation cycle. Then, multi-frequency signals are supplied simultaneously from the multi-frequency signal supplying circuit 21 to the selected transmission conductors 14. Thereafter, the processes at steps S3 to S7 are repeated until the position detection with regard to all transmission conductors 14 ends on the selected reception conductors 12. If the position detection with regard to all transmission conductors 14 ends on the selected reception conductors 12, the signals at all cross points on the reception conductors 12 stored in the registers 38 are read out into the position calculation circuit 35.

Referring to FIGS. 1, 5 and 7, for example, when the reception conductors $X_0$, $X_8$, ..., and $X_{120}$ are selected, periodic signals are supplied to the transmission conductors $Y_3$, $Y_7$, ..., and $Y_{63}$ to carry out position detection. Then, at a next clock signal, while the reception conductors remain selected, periodic signals are supplied this time to the transmission conductors $Y_2$, $Y_6$, ..., and $Y_{62}$ to carry out position detection. This process is repeated until periodic signals are supplied to the transmission conductors $Y_0$, $Y_4$, ..., and $Y_{60}$ to carry out position detection. At this time, a full cycle of the changeover (switching) of transmission conductors in each group is completed, and the position detection of all transmission conductors 14 regarding the reception conductors $X_0$, $X_8$, ..., and $X_{120}$ is completed. This is a state when the result of the decision at step S8 is YES. If the detection of all transmission conductors with regard to the selected reception conductors is ended in this manner, the processing advances to step S9.

When the position detection with regard to all transmission conductors 14 ends on the reception conductors 12 selected at step S4, that is, if the result of the decision at step S8 is YES, then the control circuit 40 decides at step S9 whether or not the position detection with regard to all reception conductors 12 is completed. If the position detection with regard to all reception conductors 12 is not completed, (the result of the decision at step S9 is NO), the processing returns to step S2, at which the switches 31a of the detection blocks 36 in the reception conductor selection circuit 31 are changed over to select the reception conductors 12 different from those in the preceding operation cycle. Further, concurrently with the changeover on the reception side, the switches 22a of the transmission blocks 25 in the transmission conductor selection circuit 22 are changed over to select those transmission conductors 14 which are different from those in the preceding cycle, that is, the same as those selected first at step S3. Then, to the selected transmission conductors 14, multi-frequency signals are supplied at the same time from the multi-frequency signal supplying circuit 21. In this manner, the reception conductors 12 and the transmission conductors 14 are changed over to continue the position detection. Thereafter, the processes at steps S2 to S8 are repeated until the position detection with regard to the transmission conductors 14 is completed on all reception conductors 12.

Referring to FIGS. 1, 5 and 7, for example, when the reception conductors $X_0$, $X_8$, ..., and $X_{120}$ remain selected, the transmission conductor 14 to be selected in each group is rotated such that position detection of all transmission conductors in each group is carried out with regard to the reception conductors $X_0$, $X_8$, ..., and $X_{120}$. Then, the reception conductors 12 to be selected are changed over to the reception conductors $X_1$, $X_9$, ..., and $X_{121}$, and the transmission conductor 14 to be selected in each group is rotated in a manner described above. The sequence of processes described is repeated to successively change over the reception conductors 12 to be selected. If at the end of the rotation, the position detection with regard to all transmission conductors is completed with respect to the reception conductors $X_7$, $X_{15}$, ..., and $X_{127}$, the processing advances to step S10, but if the position detection is not completed, the processing returns to step S2.

The position calculation circuit 35 detects, from the signals at the cross points of the reception conductors 12 input from the synchronous detection circuit 37, a reception conductor 12, which outputs a signal having a reduced signal level and the frequency of the signal. At step S10, the position calculation circuit 35 calculates the position of the pointer based on the index m (0 to 127) of the reception conductor 12 specified from the signal level and the index n (0 to 63) of the transmission conductor 14 from which the periodic signal is supplied. In the present embodiment, position detection of the pointer disposed on the sensor section 10 is carried out in this manner.

As described above, in the first embodiment, signals having different frequencies are supplied simultaneously or multiple-transmitted to predetermined ones of the transmission conductors 14 in the individual groups, and the position of the pointer is detected at the same time through a predetermined plural number of reception conductors 12. In other words, a position detection process is carried out at the same time for a plurality of cross points between the transmission conductors 14 and the reception conductors 12. Therefore, with the present embodiment, the time required for position detection for a plurality of cross points can be reduced and higher speed position detection becomes possible.

More particularly, in the first embodiment, the transmission conductor group 13 and the reception conductor group 11 are each divided into 16 groups and the groups are processed in parallel to each other. Therefore, in the present embodiment, the detection time can be reduced, for example, to 1/(16×16) in comparison with the detection time where a detection process is carried out successively for all cross points as in the prior art. The number of groups is not limited to the specific number mentioned above, and an effect of reduction of the detection time can be obtained even if only one of the transmission conductor group 13 and the reception conductor group 11 is divided into groups.

Further, in the first embodiment described above, after detection ends for all transmission conductors on one reception conductor, the processing-object reception conductor is changed over to a next reception conductor to continue the position detection. However, the position detection is not limited to this configuration. For example, the processing-object reception conductor may be changed over to another reception conductor to continue position detection before the detection with regard to all transmission conditions on one reception conductor is completed. It is only necessary for the position detection to be carried out in the end at all cross points of the sensor section 10.

[Modification 1]

Figure 14:
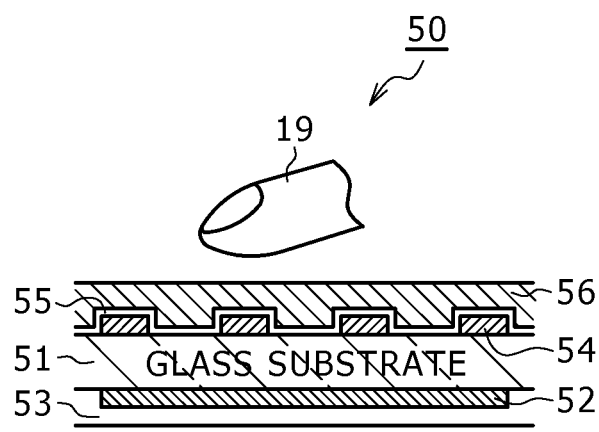
FIG. 14 is a schematic sectional view of the sensor section according to modification 1 to the pointer detection apparatus of FIG. 1.

In the first embodiment described above, the sensor section 10 is configured such that the reception conductors 12 and the transmission conductors 14 between which the spacer 16 is interposed are formed on one of the surfaces of the first glass substrate 15. However, the present invention is not limited to such arrangement. For example, the reception conductors and the transmission conductors may be formed on the opposite faces of one glass substrate. FIG. 14 shows an example of such configuration.

In particular, FIG. 14 shows a schematic cross section of a sensor section according to modification 1.

Referring to FIG. 14, the sensor section 50 according to modification 1 includes a glass substrate 51, a plurality of transmission conductors 52 formed on one of surfaces of the glass substrate 51, on the lower face of the glass substrate 51 in FIG. 14, and a first protective layer 53 formed on the transmission conductors 52. The sensor section 50 further includes a plurality of reception conductors 54 formed on the other surface of the glass substrate 51, on the upper surface of the glass substrate 51 in FIG. 14, a second protective layer 55 formed on the reception conductors 54, and a protective sheet 56 formed on the second protective layer 55. The detection surface for a pointer in the present example is a surface of the sensor section 50 on the protective sheet 56 side.

In modification 1, the glass substrate 51, transmission conductors 52 and reception conductors 54 are formed from materials similar to those used in the first embodiment described above. Further, in modification 1, the glass substrate 51 may be replaced by a sheet-like or film-like substrate formed from a synthetic resin material similarly as in the first embodiment. Further, the first protective layer 53 and the second protective layer 55 can be formed, for example, from a $SiO_2$ film or a synthetic resin film, and the protective sheet 56 may be formed using a sheet member made of, for example, a synthetic resin material.

Since the sensor section 50 of modification 1 can reduce the number of glass substrates in comparison with the sensor section 10 of the first embodiment described above with reference to FIG. 2, the thickness of the sensor section 50 can be further reduced. Further, in the sensor section 50 of modification 1, since the number of glass substrates can be reduced, a less expensive sensor section can be formed.

[Modification 2]

Figure 15A:
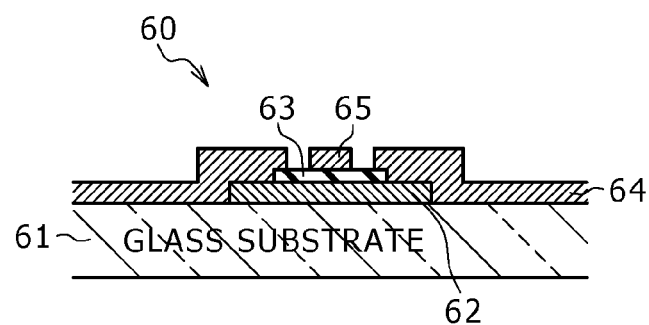
FIG. 15A is a schematic sectional view of the sensor section according to modification 2 to the pointer detection apparatus of FIG. 1.
Figure 15B:
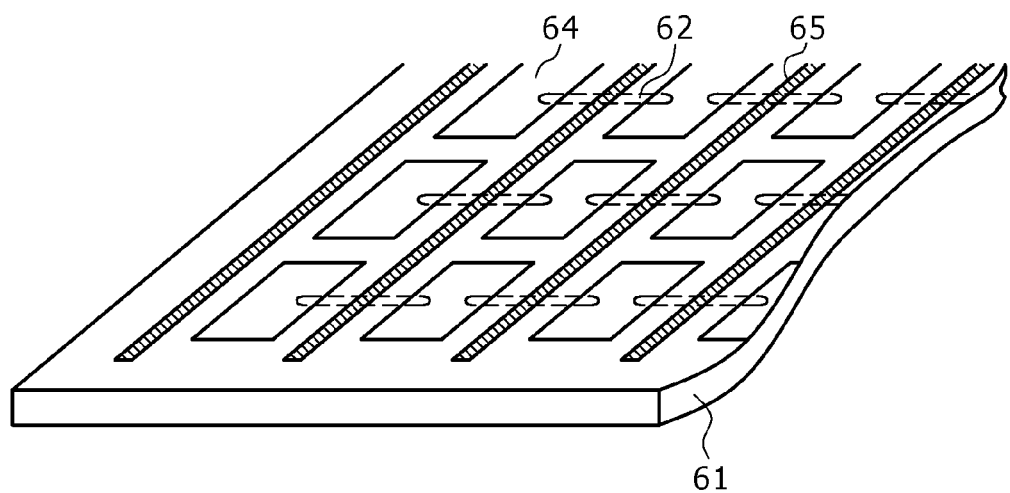
FIG. 15B is a perspective view of the sensor section shown in FIG. 15A.

FIGS. 15A and 15B illustrate an example of a configuration of a sensor section where transmission conductors and reception conductors are formed on the surface on one side of a glass substrate, as modification 2. In particular, FIG. 15A shows a cross section of the sensor section of modification 2 at a cross point, and FIG. 15B shows a perspective view of the sensor section of modification 2.

Referring to FIGS. 15A and 15B, the sensor section 60 shown includes a glass substrate 61, metal sections 62 having conductivity and formed in a predetermined pattern on one of the surfaces of the glass substrate 61, insulating sections 63 formed on the metal sections 62, a plurality of transmission conductors 64, and a plurality of reception conductors 65. Although a protective layer and a protective sheet are provided, they are omitted in FIGS. 15A and 15B.

The metal sections 62 are substantially linear metal members formed, for example, by drawing a metal material in a direction perpendicular to the direction in which the reception conductors 65 extend. The insulating sections 63 are formed so as to cover over part of the metal sections 62. Further, the transmission conductors 64 are provided at the opposite ends in the drawing direction of the metal sections 62 and are electrically connected to each other by the metal sections 62. The reception conductors 65 are formed so as to stretch over the insulating sections 63, such that the reception conductors 65 are electrically isolated from the metal sections 62 and transmission conductors 64.

Although in FIGS. 15A and 15B, the transmission conductors 64 are formed in such a manner as to cover over part of the upper surface of the metal sections 62 and the insulating sections 63, the present modification is not limited to the form described. Since the object of the provision of the metal sections 62 is achieved as long as the transmission conductors 64 provided at the opposite ends in the extension direction of the metal sections 62 are electrically connected to each other by the metal sections 62, there is no need, for example, for the transmission conductors 64 to cover over the upper surface of the metal sections 62. Similarly, although, in FIGS. 15A and 15B, the transmission conductors 64 are shown covering over part of the upper surface of the insulating sections 63, the covering state is not limited to this arrangement. It is only necessary for the reception conductors 65 to be electrically isolated from the transmission conductors 64 and metal sections 62.

Further, in the example of FIGS. 15A and 15B, the detection surface for a pointer may be the surface of the glass substrate 61 on which the conductors are formed or the face of the glass substrate 61 opposite to the face on which the conductors are formed.

In modification 2, the reception conductors 65 are formed from a linear conductor similar to the first embodiment described above. Meanwhile, the transmission conductors 64 are formed so as to be connected to the metal sections 62 through openings in the insulating sections 63. In particular, the transmission conductors 64, to which periodic signals are supplied, are disposed three-dimensionally such that they pass below the reception conductors 65 with the insulating sections 63 sandwiched therebetween.

Further, in modification 2, the glass substrate 61, transmission conductors 64 and reception conductors 65 are formed from materials similar to those which are used in the first embodiment described above. In the present example, the glass substrate 61 may be replaced with a sheet-like or film-like substrate formed from a synthetic resin material similarly as in the first embodiment.

The metal sections 62 can be formed from a metal material having a high conductivity such as, for example, Mo (molybdenum) or Al (aluminum). Since the dimension of the connecting portions between the metal sections 62 and the transmission conductors 64 is very small, in order to reduce the resistance at the connecting portions, it is preferable to use a metal material having a high conductivity for the metal sections 62. Further, the insulating sections 63 may be formed, for example, from resist.

With the sensor section 60 of modification 2, since the number of glass substrates can be reduced in comparison with the sensor section 10 of the first embodiment described above with reference to FIG. 2, the thickness of the sensor section 60 can be reduced. Further, in the sensor section 60 of the present example, since the number of glass substrates can be reduced, a less expensive sensor section can be provided. Further, cost reduction occurs also because wiring lines of the transmission conductors and the reception conductors can be formed in the same layer.

Furthermore, the sensor section 60 of modification 2 can achieve the following advantage in comparison with the sensor section 50 of modification 1. In particular, where the face of the glass substrate 61 on the side opposite to the face, on which the conductors are formed, is used as the detection surface for a pointer in the sensor section 60 of modification 2, the glass substrate 61 exists between the pointer and the conductors. In this instance, the distance between the pointer and the conductors increases in comparison with that in the sensor section 50 of modification 1, and any effect of noise from the pointer decreases.

[Modification 3]

In the first embodiment and modifications 1 and 2 described above, the transmission conductors and the reception conductors can be individually formed from a linear conductor of a fixed width extending in a predetermined direction. However, the shape of the transmission conductors and the reception conductors in the present invention is not limited to a linear shape extending in a predetermined direction. Another example of a configuration of the transmission conductors is described below as modification 3.

Figure 16A:
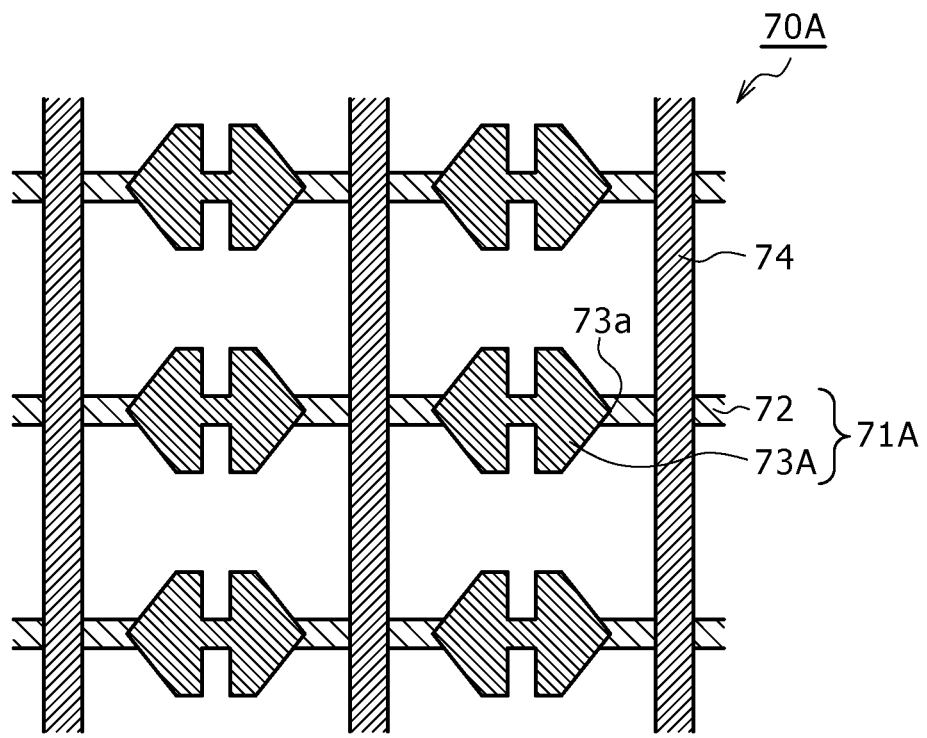
FIG. 16A is a schematic enlarged view of a cross point of the sensor section of a first example according to modification 3 to the pointer detection apparatus of FIG. 1.
Figure 16B:
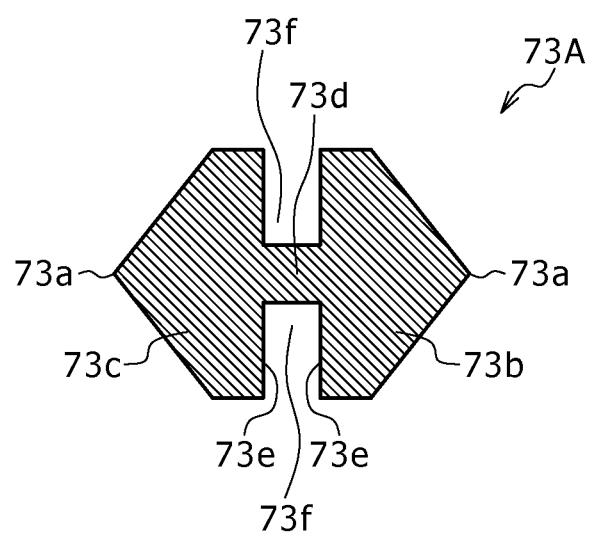
FIG. 16B is a schematic further enlarged view of a land conductor portion of the sensor section shown in FIG. 16A.

FIG. 16A shows, in an enlarged scale, cross points between transmission conductors and reception conductors in a sensor section of modification 3, and FIG. 16B shows a land conductor portion 73A in an enlarged scale.

Referring to FIGS. 16A and 16B, in the sensor section 70A of modification 3 shown, the reception conductors 74 are formed from a linear conductor of a fixed width as seen in FIG. 16A. However, the transmission conductors 71A are formed from a linear conductor portion 72 and land conductor portions 73A having a width greater than that of the linear conductor portion 72 and made of ITO or the like.

Referring to FIG. 16B, each land conductor portion 73A includes first and second land portions 73b and 73c formed in a substantially same shape and a substantially linear connecting portion 73d for electrically connecting the first and second land portions 73b and 73c to each other. The first and second land portions 73b and 73c are formed in a substantially triangular shape having an apex 73a, at which the land conductor portion 73A is connected to the linear conductor portion 72. The first land portion 73b and the second land portion 73c are electrically connected to each other at bottom portions 73e thereof, opposite the apexes 73a, by the connecting portion 73d.

Where the transmission conductor 71A is formed in a shape described above, it is provided with an increased area in proximity to the cross point. As a result, when a pointer comes near the sensor section, an electric field emerging from the transmission conductor converges by an increasing amount to the pointer, and therefore, the detection sensitivity is improved.

Further, the land conductor portion 73A is shaped in a substantially H shape such that the first land portion 73b and the second land portion 73c are connected to each other by the connecting portion 73d to provide recesses 73f therebetween. Thus, if the pointer detection apparatus, to which the present invention is applied, and another pointer detection apparatus, which adopts an electromagnetic resonance system, are placed one on the other to form an inputting apparatus wherein a region for detecting a pointer is formed commonly between the two pointer detection apparatus, eddy current in the transmission conductors resulting from an electric field generated from the position detection apparatus of the electromagnetic resonance system is suppressed. As a result, deterioration of the detection sensitivity of the pointer detection apparatus of the electromagnetic resonance type due to loss caused by the eddy current can be prevented.

Figure 17:
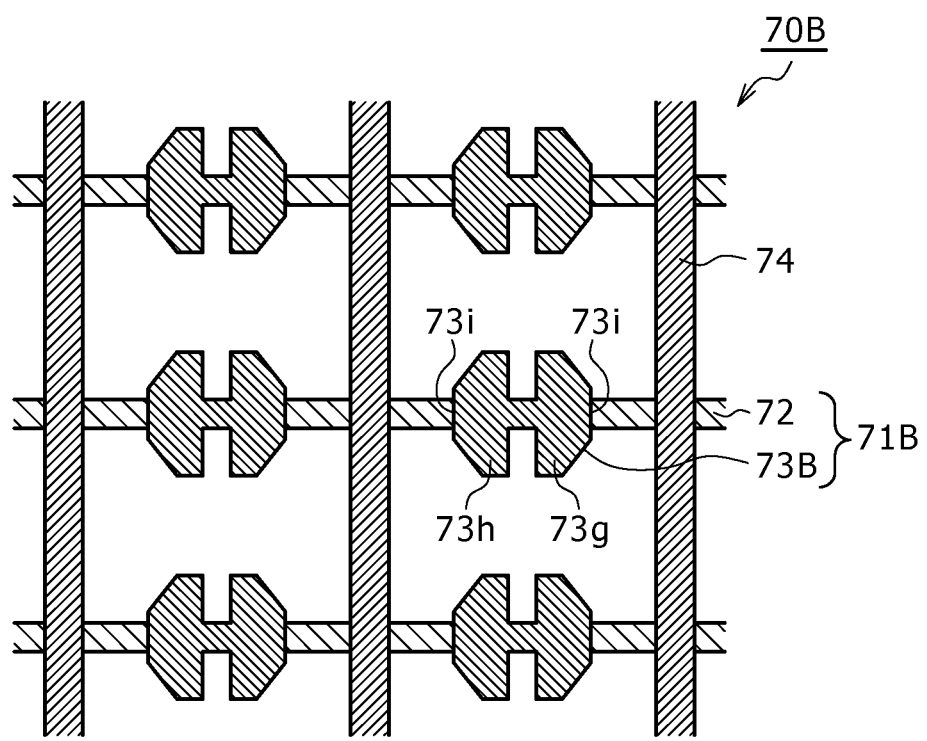
FIG. 17 is a schematic enlarged view of the sensor section of a second example according to modification 3 to the pointer detection apparatus of FIG. 1.

FIG. 17 shows, in an enlarged scale, a cross point between a transmission conductor and a reception conductor in a sensor section of another example of modification 3.

Referring to FIG. 17, in the sensor section 70B of the present example, a transmission conductor 71B includes a linear conductor portion 72 and a land conductor portion 73B modified from that in modification 3. The sensor section 70B is different from that of modification 3 in that, while the land conductor portion 73A in modification 3 has the first and second land portions 73b and 73c of a substantially triangular shape, the land conductor portion 73A in the present example has first and second land portions 73g and 73h having a substantially trapezoidal shape. In the present example, the land conductor portion 73B is electrically connected at smaller parallel sides 73i thereof, which correspond to the apexes 73a of the first and second land portions 73b and 73c in modification 3, to the linear conductor portion 72. The remaining part of the sensor section 70B is similar to that of the sensor section 70A described above with reference to FIG. 16, and the description of the common configuration is omitted to avoid redundancy.

Comparing the present land conductor portion 73B to the land conductor portion 73A in modification 3, since the land conductor portion 73B is shaped such that it has no apex portion 73a, that is, no sharp (acute) angle portion, the flow path of electric current is wider than that of the land conductor portion 73A. As a result, concentration of current upon the connecting portion between the land conductor portion 73B and the linear conductor portion 72 does not occur, and the current disperses. In particular, since current flows in a spread fashion between the smaller parallel sides 73i, which define the opposite ends of the land conductor portion 73B, the resistance value between the smaller parallel sides 73i does not increase. As a result, the electric conduction characteristic is further improved in comparison with that of the transmission conductors in modification 3 described above with reference to FIG. 16. Where the transmission conductors around the cross points of the sensor section are shaped in this manner, the electric conduction characteristic can be further improved. The shape of the smaller parallel side 73i preferably has no sharp (acute) angle portion and the smaller parallel side 73i may have, for example, a curved shape different from the shape described above and shown in FIG. 17. Further, while the sensor section 70B in the present example is configured such that the two recesses 73f are formed in the land conductor portions 73A and 73B, the number of such recesses is not limited to two, and four or more recesses may be provided.

The two examples of modification 3 shown in FIGS. 16 and 17 can be applied not only in the sensor section of the pointer detection apparatus of the cross point type electrostatic coupling system, but can be applied also in a sensor section of a pointer detection apparatus of the projected capacitive type or some other type. Further, while in modification 3 a unique shape of the land conductor portion of the transmission conductors is proposed, a similar shape may be used to form a land conductor portion on the reception conductors in proximity to the cross points.

Further, the land conductor portion can be applied to any of the sensor section 50 formed from two layers in modification 1 described above with reference to FIG. 14, and the sensor section 60 formed from one layer in modification 2 described above with reference to FIG. 15. Where the pointer detection apparatus is formed integrally with a display apparatus such as in a liquid crystal panel, in order to suppress the influence of electrostatic noise from the liquid crystal panel, the reception conductors are preferably disposed in a direction crossing the scanning direction of the liquid crystal panel.

[Modification 4]

A pointer detection apparatus in a cross point electrostatic coupling system has a region wherein a plurality of reception conductors and a plurality of transmission conductors cross each other and a conductor pattern exists, and another region wherein no conductor exists and no conductor pattern exists, if the sensor section is viewed from the surface of the pointer detection apparatus on which a pointer is to be operated, that is, from above the surface of the pointer detection apparatus. Although the conductors are formed from a transparent electrode film such as an ITO film, the transmission factor in the region in which the conductor pattern exists is lower than that in the region in which no conductor pattern exists. As a result, unevenness of the transmission factor appears on the sensor section. The user may feel uneasy with the unevenness of the transmission factor. Therefore, modification 4 is configured so as to eliminate such unevenness of the transmission factor on the sensor section.

Figure 18:
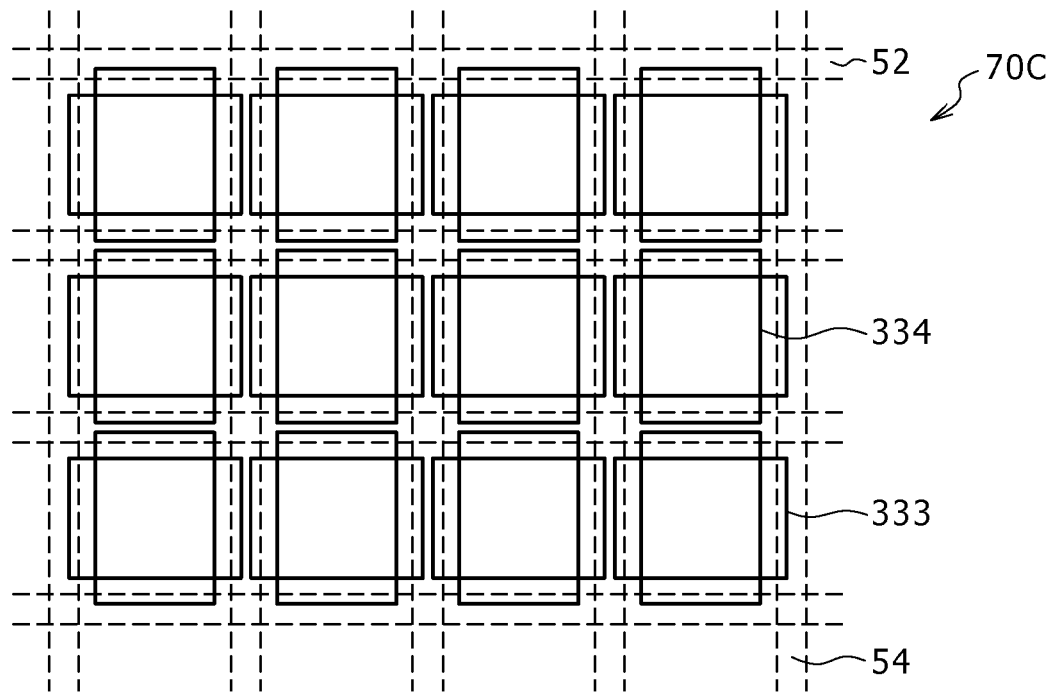
FIG. 18 is a schematic view showing a configuration of the sensor section according to modification 4 to the pointer detection apparatus of FIG. 1.

FIG. 18 shows a general configuration of the sensor section of modification 4. The configuration of modification 4 is applied to the sensor section 50 of modification 1 described above with reference to FIG. 14. Referring to FIG. 18, in the sensor section 70C of modification 4, in a region in which none of transmission conductors 52 and reception conductors 54 exist, first transparent electrode films 333 and second transparent electrode films 334 made of the same material as the conductors are provided. The other part of the sensor section 70C has the same configuration as that of the sensor section 50 of modification 1 described above with reference to FIG. 14.

Figure 19A:
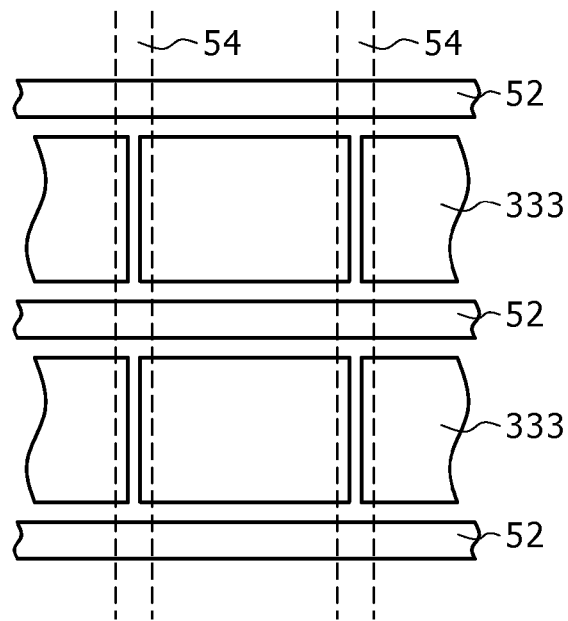
FIG. 19A is a schematic view showing an upper conductor pattern of the sensor section shown in FIG. 18.

FIG. 19A shows a configuration of a transmission conductor 52 and a first transparent electrode film 333 formed on one surface, that is, on the lower surface, of a glass substrate of the sensor section 70C. The first transparent electrode film 333 of a rectangular shape is disposed on the surface of a glass substrate, on which the transmission conductor 52 is provided, between two transmission conductors 52 disposed in proximity to each other. The first transparent electrode film 333 has a dimension a little smaller than the dimension of the distance between the transmission conductors such that it does not contact with any of the transmission conductors 52, and is spaced away from the reception conductors 52 with some air gap left therebetween. The dimension of the first transparent electrode film 333 in the lengthwise dimension of the transmission conductors 52 is a little smaller than the dimension of the sum of the distance between the reception conductors 54 disposed in proximity to each other and the conductor width of one reception conductor 54. The first transparent electrode film 333 is disposed between the two reception conductors 54 positioned in proximity to each other, and is positioned such that both sides thereof extend to overlap approximately ½ of the conductor width of the reception conductors 54.

Figure 19B:
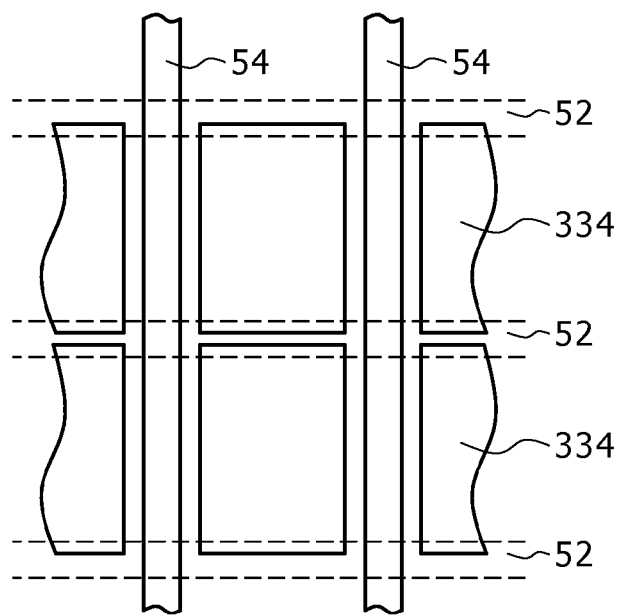
FIG. 19B is a schematic view showing a lower conductor pattern of the sensor section shown in FIG. 18.

FIG. 19B shows a configuration of a reception conductor 54 and a second transparent electrode film 334 formed on the other surface, that is, on the upper surface, of the glass substrate of the sensor section 70C. In the present example, the second transparent electrode film 334 is disposed on the surface of the glass substrate on which the reception conductor 54 is disposed. Regarding the dimension of the second transparent electrode film 334, an approach similar to that used where the dimension of the first transparent electrode film 333 is defined can be applied. In particular, the second transparent electrode film 334 has a little smaller dimension than the dimension between the reception conductors so that it does not contact with the reception conductors 54, and is spaced away from the reception conductors 54 with some air gap left therebetween. Regarding the dimension of the second transparent electrode film 334 in the lengthwise dimension of the reception conductor 54, it is set such that the second transparent electrode film 334 partly overlaps with part of the transmission conductor 52 disposed in proximity to each other. The first transparent electrode film 333 and the second transparent electrode film 334 should be disposed such that, when the sensor section 70C is viewed from the surface side of the sensor section 70C on which a pointer is to be operated, that is, from the upper surface side, the superposing relationship of the transmission conductor 52, reception conductor 54, first transparent electrode film 333, and second transparent electrode film 334 is made as uniform as possible while the electric isolation from each other is maintained. Thus, unevenness of the transmission factor can be suppressed over the entire sensor section 70C and a uniform optical characteristic can be maintained.

If the conductors and the transparent electrode films formed on the surfaces of the glass substrate of the sensor section 70C are disposed as seen in FIGS. 19A and 19B, then when the sensor section 70C is viewed from above, the first transparent electrode films 333 and the second transparent electrode films 334 made of the same material as the conductors, are formed also in a region, in which the conductor pattern does not exist (as seen in FIG. 18). As a result, unevenness of the transmission factor on the sensor section 70C is suppressed.

The shape of the first transparent electrode film 333 and the second transparent electrode film 334 for suppressing unevenness of the transmission factor is not limited to a rectangular shape. It is only necessary that the superposing relationship between the conductor pattern formed from the transparent electrodes, the first transparent electrode films 333, and second transparent electrode films 334. when the sensor section 70C is viewed from above. be optically uniform. The shape of the first transparent electrode films 333 and the second transparent electrode films 334 is suitably set in relation to the shape of the conductor pattern formed from the transparent electrode films. For example, a plurality of transparent electrode films of a rectangular shape are disposed in a spaced relationship from each other by a predetermined distance and extend along a direction in which the transmission conductors or the reception conductors extend. However, the plural transparent electrode films may otherwise be formed as a single electrode film.

[Modification 5]

While in the first embodiment described above, both of the transmission conductors and the reception conductors are linear conductors and extend perpendicularly to each other, the preset invention is not limited to such arrangement. For example, at least one of the transmission conductors and the reception conductors may be formed from a curved conductor. An example is shown in FIG. 20.

Figure 20:
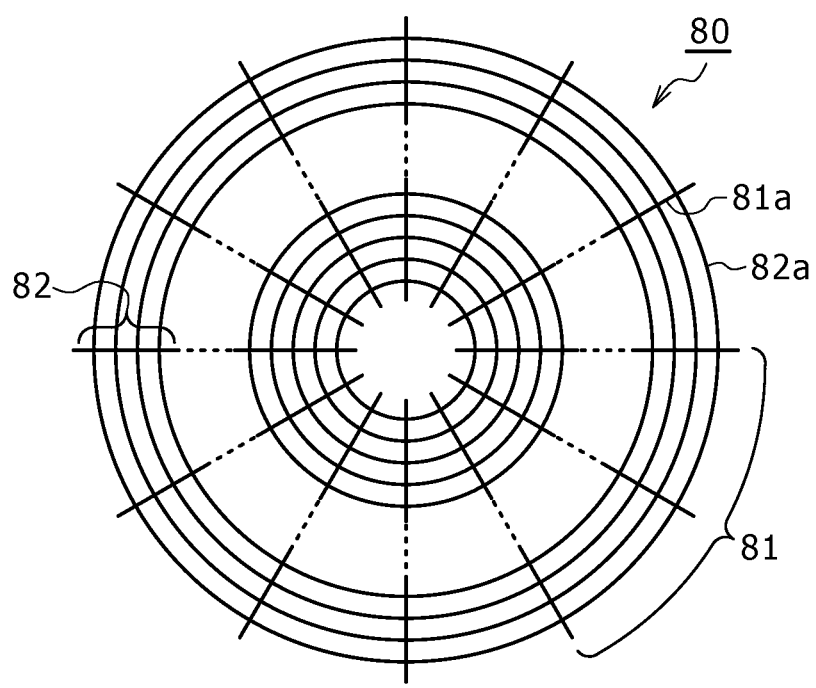
FIG. 20 is a schematic view showing a configuration of the sensor section according to modification 5 to the pointer detection apparatus of FIG. 1.

FIG. 20 shows an arrangement pattern of a transmission conductor group 82 and a reception conductor group 81 of a sensor section 80 according to modification 5. In modification 5, the transmission conductor group 82 includes a plurality of transmission conductors 82a individually formed as rings having different diameters from each other. The ring-shaped transmission conductors 82a are disposed in a concentric relationship with each other such that the distances between adjacent ones of the transmission conductors 82a in a radius direction are equal to each other.

Meanwhile, the reception conductor group 81 includes a plurality of linear reception conductors 81a formed so as to extend radially from the center of the transmission conductor group 82. The reception conductors 81a are disposed in an equidistantly spaced relationship from each other in a circumferential direction of the concentric circles formed from the transmission conductor group 82. While in modification 5 shown in FIG. 20, the transmission conductors 82a are disposed in an equidistantly spaced relationship from each other, the distances between the transmission conductors 82a need not be equal to each other, but may be set to suitable distances in accordance with an application of the present invention.

The sensor section 80 in modification 5 is suitable for detection, for example, of rotational operation.

[Modification 6]

Figure 21A:
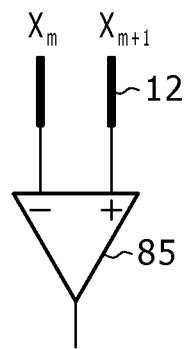
FIG. 21A is a schematic circuit diagram of an amplifier according to modification 6 to the pointer detection apparatus of FIG. 1.
Figure 21B:
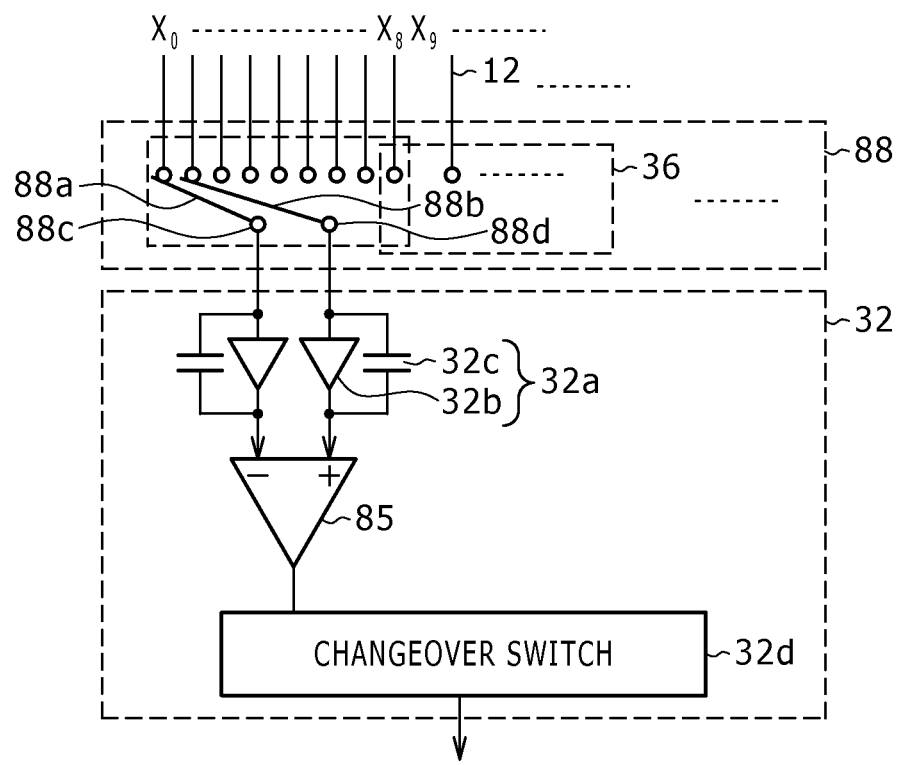
FIG. 21B is a block diagram of the amplification circuit where a differential amplifier is used and associated elements of the amplification circuit.

While in the first embodiment described above, a one-input one-output amplifier is used for the amplifier 32b in the amplification circuit 32 as seen in FIG. 7, the present invention is not limited to such configuration. For example, a differential amplifier may be used for the amplifier. An example is shown in FIGS. 21A and 21B. In FIGS. 21A and 21B, elements like those in the first embodiment described above with reference to FIG. 7 are denoted by like reference characters and overlapping description of them is omitted herein to avoid redundancy.

In particular, FIG. 21A shows a general configuration of an amplifier according to modification 6, and FIG. 21B shows a general configuration of an amplification circuit and peripheral circuits where a differential amplifier is used.

Referring first to FIG. 21A, the differential amplifier 85 in modification 6 is a two-input one-output differential amplifier. In modification 6, a pair of adjacent ones of reception conductors 12 are connected one by one to the two input terminals of the differential amplifier 85. Further, in modification 6, the reception conductor group 11 includes 129 reception conductors 12. The reception conductor group 11 is divided into 16 detection blocks 36, each including 9 reception conductors 12. Each detection block 36 includes 9 reception conductors 12 which are positioned adjacent to each other, that is, which have consecutive indexes m. The ninth one of the reception conductors 12 which has the highest index m in each detection block 36 is used commonly by an adjacent detection block 36. In particular, in modification 6, the reception conductor group 11 is divided into detection blocks $\{X_0 \text{ to } X_8\}, \{X_8 \text{ to } X_{15}\}, \ldots, \{X_{114} \text{ to } X_{121}\}$ and $\{X_{121}$ to $X_{128}\}$.

Referring now to FIG. 21B, a reception conductor selection circuit 88 includes a plurality of pairs of switches 88a and 88b. One pair of switches 88a and 88b are provided for each one detection block 36. The paired switches 88a and 88b include nine common input terminals 31b. The common input terminals 31b are connected to corresponding ones of the reception conductors 12. Terminals 88c and 88d of the paired switches 88a and 88b on the output side are connected to input terminals of different IN conversion circuits 32a. The one of the I/V conversion circuits 32a, which is connected to the output terminal of the switch 88a, is connected to the negated input terminal, which has the negative polarity (−), of a differential amplifier 85. The other I/V conversion circuit 32a, connected to the output terminal of the switch 88b, is connected to the non-negated input terminal, which has the positive polarity (+), of the differential amplifier 85. The paired switches 88a and 88b are structured such that those reception conductors 12, which are to be connected to the IN conversion circuits 32a, are changed over at predetermined time intervals. In particular, if it is assumed that the switch 88a is connected to the reception conductor $X_0$ and the switch 88b is connected to the reception conductor $X_1$ first, the switches 88a and 88b are changed over after a predetermined time interval such that the switch 88a is connected to the reception conductor $X_1$ and the switch 88b is connected to the reception conductor $X_2$. Thereafter, the conductors to be connected are successively changed over at predetermined time intervals. Then, after the switch 88a is connected to the reception conductor $X_7$ and the switch 88b is connected to the reception conductor $X_8$, the switches 88a and 88b are changed over such that the switch 88a is again connected to the reception conductor $X_0$ and the switch 88b is again connected to the reception conductor $X_1$.

Where the differential amplifier 85 is used in the reception section, since noise included in outputs from the reception conductors 12 is canceled by the differential amplifiers 85, the noise resisting property can be improved.

[Modification 7]

While in modification 6 the number of reception conductors to be connected to a differential amplifier is two, the number of reception conductors to be connected to a differential amplifier may be further increased. An example is shown in FIG. 22.

Figure 22:
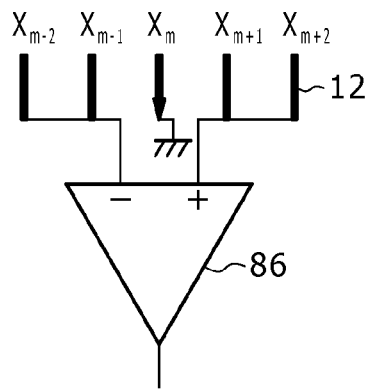
FIG. 22 is a schematic circuit diagram of the amplifier according to modification 7 to the pointer detection apparatus of FIG. 1.

FIG. 22 shows a general configuration of a differential amplifier according to modification 7.

Referring to FIG. 22, in the differential amplifier 86 in modification 7, the number of reception conductors 12 connected at the same time to the differential amplifier 86 is five. Those five reception conductors 12, which are positioned adjacent to each other, are used as the reception conductors 12 to be connected at the same time. In the example of FIG. 22, the five reception conductors 12 connected to the differential amplifier 86 shown are reception conductors $X_{m-2}$ to $X_{m+2}$. In particular, the reception conductors $X_{m-2}$ and $X_{m-1}$ are connected to the negated input terminal of the differential amplifier 86, and the reception conductors $X_{m+2}$ and $X_{m+1}$ are connected to the non-negated input terminal of the differential amplifier 86. The central reception conductor $X_m$ is connected to the terminal of a predetermined reference voltage level (e.g., ground) of the differential amplifier 86. If the differential amplifier 86 is of the single power supply type, the voltage level of the reception conductor $X_m$ is set to a predetermined reference voltage level, but if the differential amplifier 86 is of the double power supply type, the voltage level of the reception conductor $X_m$ is zero.

Where a configuration as just described is adopted, a plurality of outputs from different reception conductors 12 are input at the same time to the differential amplifier 86. As a result, since the level of the difference signal increases, the integration signal also increases, and the detection sensitivity can be improved. Further, since the number of reception conductors, whose output signals are to be input at the same time to the differential amplifier 86, increases, the range over which detection is possible is expanded. Further, since the differential amplifier 86 is used, the noise resisting property can be improved similar to modification 6.

In the example of FIG. 22, the reception conductor selection circuit 31 is not shown. In the succeeding drawings, only those elements that are necessary for description of the present invention are shown. This applies also to illustration of the switches 22a of the transmission conductor selection circuit 22.

The reason why the central reception conductor $X_m$ to be connected to the differential amplifier 86 is set to the predetermined reference voltage level in modification 7 is as follows. In particular, as described above in connection with the first embodiment, in the electrostatic coupling system, current at a cross point near a pointer is shunted to the ground through the pointer, and the variation of the current at the cross point due to shunting is detected. However, if the pointer is not grounded sufficiently, then the shunting of current at the cross point becomes insufficient to be detected. In this instance, the current variation at the cross point becomes small, and the sensitivity in position detection decreases.

However, if the reception conductor which is positioned at the center of a plurality of reception conductors connected to the differential amplifier 86, is set to a reference voltage level or the zero voltage as in modification 7, even if the pointer is not grounded sufficiently, as long as the pointer is positioned in proximity to the reception conductor $X_m$, part of the current can be shunted through both the pointer and the reception conductor $X_m$. As a result, the decrease in the sensitivity described above can be minimized

[Modification 8]

While in modifications 6 and 7 a differential amplifier is utilized to assure high detection sensitivity, it is also possible to inverse the phase of a periodic signal, which is to be supplied to a transmission conductor, to assure high detection sensitivity.

Figure 23:
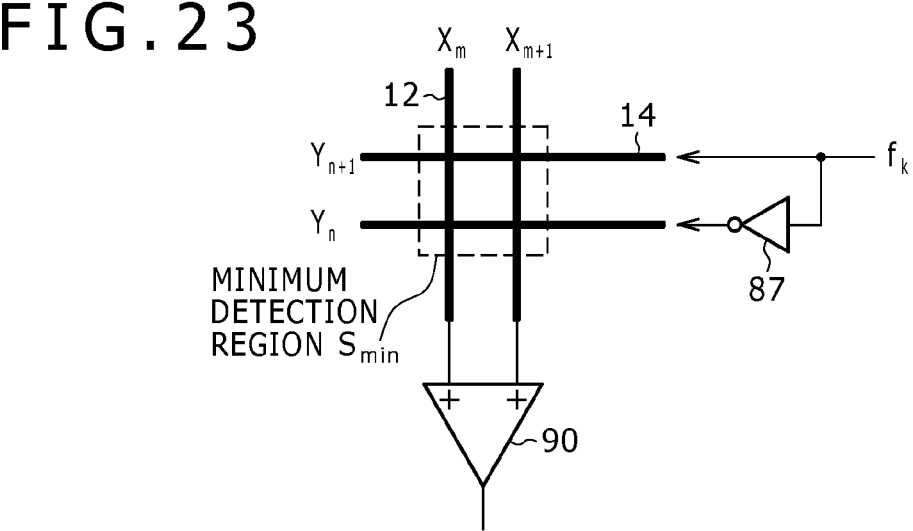
FIG. 23 is a schematic circuit diagram illustrating a supplying form of periodic signals according to modification 8 to the pointer detection apparatus of FIG. 1.

FIG. 23 illustrates a supplying form of a periodic signal in modification 8. Referring to FIG. 23, modification 8 is configured such that, between the multi-frequency signal supplying circuit 21 and the transmission conductor selection circuit 22 of the transmission section 20 shown in FIG. 1, a phase inversion circuit 87 for inversing the phase of a periodic signal produced by each periodic signal production section 24 is provided. When a periodic signal of a predetermined frequency $f_k$ is supplied to a transmission conductor $Y_{n+1}$, the phase inversion circuit 87 inverses the phase of the periodic signal of the frequency $f_k$ and supplies the periodic signal of the inversed phase to a transmission conductor $Y_n$. Then, in the reception section 30 shown FIG. 1, currents output from the two reception conductors $X_{n+1}$ and $X_n$ positioned adjacent to each other are input to a two-input one-output amplifier 90. Both input terminals of the amplifier 90 are non-negated (+) terminals.

Where the phase inversion circuit 87 is used in the transmission section 20, when a pointer is not positioned in proximity, signals output from the two reception conductors $X_{n+1}$ and $X_n$ to be used for detection simultaneously cancel each other and therefore, the detection sensitivity can be improved.

[Modification 9]

In modification 8 described above, in order to enhance the detection sensitivity, a periodic signal produced by the transmission section and an inverted phase signal having a phase inverse to that of the periodic signal are utilized and a two-input one-output amplifier is used in the reception section. However, in order to achieve enhancement of the detection sensitivity and expansion of the range for detection without using an inverted phase signal, a periodic signal having the same frequency may be supplied to a plurality of transmission conductors while a plural-input one-output amplifier is used in the reception section.

Figure 24:
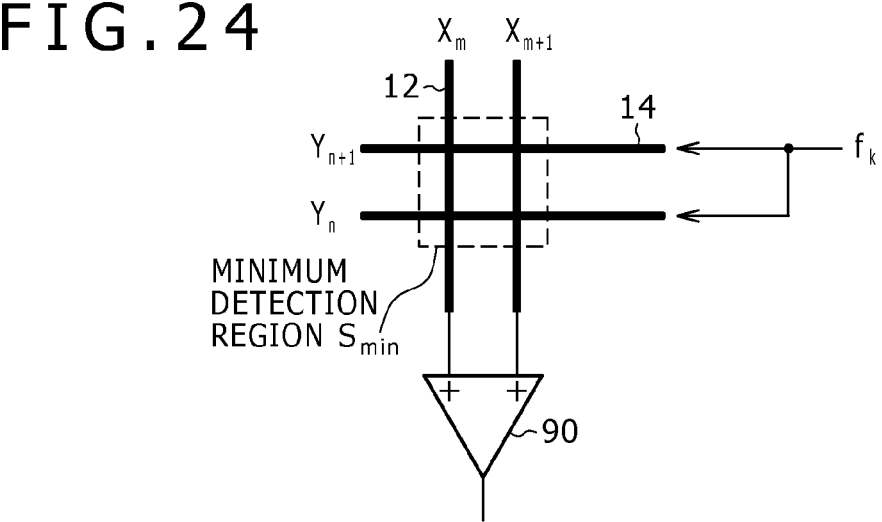
FIG. 24 is a similar view but illustrating a supplying form of periodic signals and a detection form of an output signal according to modification 9 to the pointer detection apparatus of FIG. 1.

FIG. 24 illustrates a supplying form of a periodic signal and a detection form of an output signal according to modification 9. Referring to FIG. 24, a two-input one-output amplifier 90 with two inputs being non-negated (+) terminals is used in the reception section 30. Where the amplifier 90 is used, periodic signals of the same frequency are supplied to two transmission conductors 14.

Where periodic signals of the same frequency are supplied to a plurality of transmission conductors 14 and output signals from a plurality of reception conductors 12 are added, not only the level of the output signal to be detected can be increased, but also the detection range can be expanded.

Where output signals of a plurality of reception conductors are added, since the detection range can be expanded, the configuration described is suitable particularly where the position detection region of the sensor section 10 is large.

In modification 9 described above, periodic signals of the same frequency are supplied in a unit of two transmission conductors 14, while output signals of two reception conductors 12 are added in the reception section. However, the number of transmission conductors 14, to which periodic signals of the same frequency are to be supplied, may be three or more, and the number of reception conductors 12 whose outputs are to be added by an amplifier of the reception section may also be three or more accordingly.

Further, while in modification 9, the number of reception conductors 12 whose outputs are added by an amplifier is equal to the number of transmission conductors 14 to which periodic signals of the same frequency are supplied, the present invention is not limited to such arrangement. The number of transmission conductors 14 to which periodic signals of the same frequency are to be supplied and the number of reception conductors 12 whose outputs are to be added by an amplifier may be different. Where the number of transmission conductors 14, to which periodic signals of the same frequency are to be supplied and the number of reception conductors 12 whose outputs are to be added by an amplifier are set equal to each other, the following advantages can be achieved.

In particular, where the number of transmission conductors, to which periodic signals of the same frequency are to be transmitted, is different from the number of reception conductors 12, whose outputs are to be added by an amplifier, the minimum detection region on the sensor section 10 has a rectangular shape, resulting in production of anisotropy in sensitivity distribution. In this instance, if the sensor section 10 detects a pointer whose face opposing the sensor section 10 has a circular shape (such face is hereinafter referred to as "opposing face"), the opposing face of the pointer is not detected as a circular shape but as a deformed shape, like an elliptic shape. On the other hand, where the number of transmission conductors, to which periodic signals of the same frequency are to be transmitted, is equal to the number of reception conductors 12, whose outputs are to be added by an amplifier as in modification 9, the minimum detection region $S_{min}$ on the sensor section 10 has a square shape, and an isotropic sensitivity distribution is obtained. In this instance, when a pointer with a circular opposing face is disposed on the sensor section 10, the opposing face of the pointer can be detected as a circular shape.

In the first embodiment described above with reference to FIG. 5, rotation of a frequency is carried out in an example wherein each periodic signal to be supplied to the transmission conductors 14 in a transmission block 25 has a different frequency from each other. However, where periodic signals of the same frequency are supplied to each of two transmission conductors 14 positioned adjacent to each other, as in the case of modification 9, the frequency may be rotated after every predetermined period of time as described above. Different examples are illustrated in FIGS. 25A and 25B and FIGS. 26A to 26C.

In the example of rotation illustrated in FIGS. 25A and 25B, periodic signals of a frequency $f_0$ having the same phase are supplied to the transmission conductors $Y_2$ and $Y_3$ first at a certain, time, as seen in FIG. 25A. Then, after a predetermined interval of time, periodic signals of the frequency $f_0$ having the same phase are supplied to the transmission conductors $Y_0$ and $Y_1$ as seen in FIG. 25B. In short, in the example of rotation of FIGS. 25A and 25B, the transmission conductors 14, to which periodic signals of the same frequency are to be supplied, are shifted or displaced in a unit of two transmission conductors after every predetermined interval of time.

Where the rotation wherein the transmission conductors 14, to which periodic signals of the same frequency are to be supplied, are displaced in a unit of two transmission conductors in this manner, detection of a pointer can be carried out at a higher speed.

In the example of rotation illustrated in FIGS. 26A to 26C, periodic signals of the frequency $f_0$ having the same phase are supplied to the transmission conductors $Y_2$ and $Y_3$ at a certain time as seen in FIG. 26A. After a predetermined interval of time, periodic signals of the frequency $f_0$ having the same phase are supplied to the transmission conductors $Y_1$ and $Y_2$, as seen in FIG. 26B. Then, after an equal predetermined interval of time elapses, periodic signals of the frequency $f_0$ having the same phase are supplied to the transmission conductors $Y_0$ and $Y_1$, as seen in FIG. 26C. In short, in the example of FIGS. 26A to 26C, the transmission conductors 14, to which periodic signals of the same frequencies are to be supplied, are displaced by one transmission conductor after every predetermined interval of time.

With the rotation wherein the transmission conductors 14, to which periodic signals of the same frequency are to be supplied, are displaced in a unit of one transmission conductor after every predetermined interval of time, since periodic signals of the same frequency are supplied to a plurality of transmission conductors 14, the detection accuracy can be enhanced in comparison with the example according to the first embodiment described above with reference to FIG. 5.

[Modification 10]

Figure 27:
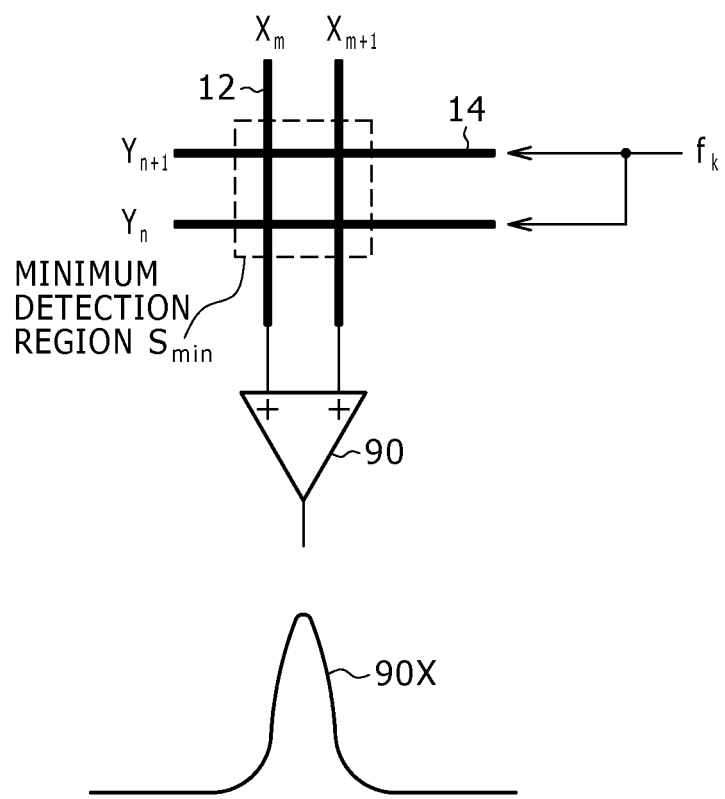
FIG. 27 is a diagrammatic view illustrating a level curve detected in modification 9 to the pointer detection apparatus of FIG. 1.

In modification 9 described above, the number of reception conductors 12 whose outputs are to be added by an amplifier on the reception side is increased by two, three or more so that the level curve of the output signals becomes broader to expand the detection range. However, if the number of reception conductors is increased in the frequency multiplex system (particularly one that does not use a differential amplifier), there is a possibility that the level of the current flowing into the reception conductors by synthesis of the periodic signals may become much higher than the level suited for detection. As a result, the dynamic range of an amplifier or the like of the reception section 30 may be exceeded and the amplifier may become saturated. FIG. 27 illustrates an example of a level curve detected in modification 9 shown in FIG. 24, wherein the level curve 90X includes steep rising and falling edges and also indicates a high level. When the number of reception conductors 12 increases to three, four and so forth, the reception level further rises and the current flowing into the reception conductors increases by synthesis of periodic signals. Therefore, in modification 10, in order to suppress current flowing into reception conductors by synthesis of periodic signals while broadening the level curve of the output signal, a reception conductor connected to the ground is provided between the other reception conductors. An example is shown in FIG. 28.

FIG. 28 illustrates a supplying form of periodic signals and a detection form of an output signal in modification 10. Referring to FIG. 28, in modification 10, a three-input one-output amplifier 91 having threes input terminals is used. The three input terminals are formed such that the opposite side ones thereof are non-negated (+) terminals while the central one thereof is connected to the ground. The central input terminal is hereinafter referred to as "0" terminal. The input terminals of the amplifier 91 are connected to the reception conductor selection circuit 31 described above with reference to FIG. 1. In particular, reception conductors $X_m$ and $X_{m+2}$ positioned on the opposite sides of arbitrary three reception conductors $X_m$ to $X_{m+2}$ of the reception conductor selection circuit 31, which are positioned adjacent to each other, are connected to the non-negated terminals on the opposite sides of the amplifier 91. The reception conductor $X_{m+1}$ of the reception conductor selection circuit 31 that is positioned centrally is connected to the "0" terminal of the amplifier 91. In other words, the level of an output signal from the central reception conductor $X_{m+1}$ is zero.

In the configuration just described, the output signal output from the amplifier 91 in modification 10 exhibits a level curve 91X illustrated in FIG. 28. In particular, as seen in FIG. 28, the level curve 91X has a broad curved shape having a magnitude equal to or smaller than that of the "++" reception by two reception conductors, while having a breadth substantially equal to that of the "+++" reception by three reception conductors. In modification 10, as the curved shape of the level curve 91X becomes broader, the maximum value thereof is suppressed to a value lower than that where three reception conductors are involved. The value may also be lower than that where two reception conductors are involved. The detection range is substantially the same as that where three reception conductors are involved. Further, connecting one of the reception conductors to the ground plays a role similar to that where a pointer is connected to the ground.

Since the output signal from the reception conductor $X_{m+1}$ connected to the ground is zero, the central one of three transmission conductors may be connected to the ground in accordance with the connection condition of the reception conductors. Where the configuration just described is used, it contributes not only to improvement of the level curve of an output signal to be detected, but also to suppression of power consumption. Further, since small swells are generated by multiplexing of periodic signals even if a differential amplifier is used, the transmission side may use a connection scheme which exhibits a similar signal level in a corresponding relationship to the connection scheme of the reception side.

Where a reception conductor to be connected to the ground is provided between other reception conductors as described above, the shape of the level curve can be made broad while swells of the level curve remain suppressed. Therefore, output signals can be detected at the same time through a plurality of reception conductors while the level of the level curve is suppressed, and the coordinate recognition characteristic is improved. Further, the detection range can be expanded to a plurality of reception conductors while suppressing the level of the level curve.

Figure 29:
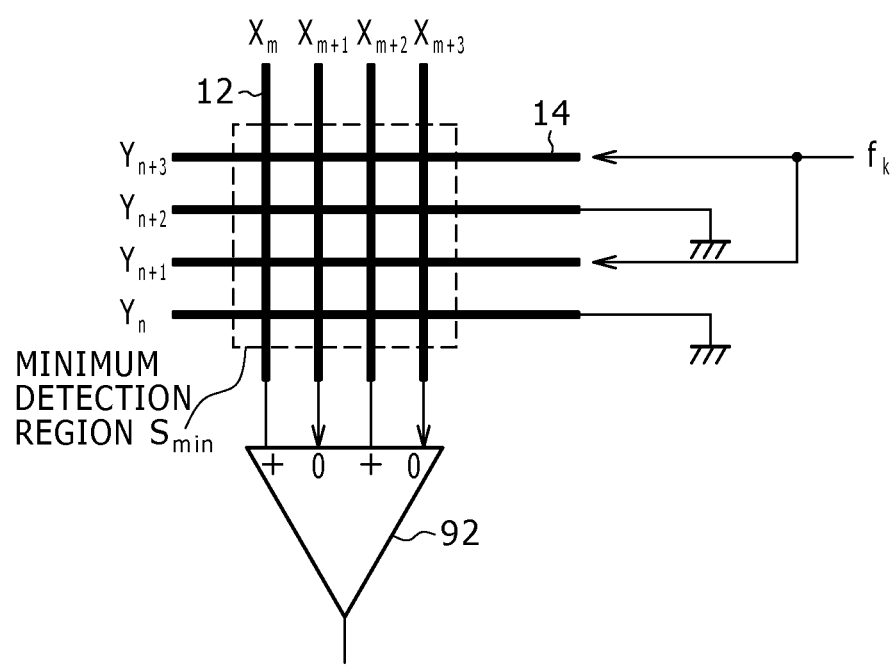
FIG. 29 is a diagrammatic view showing another example of a supplying form of periodic signals and a detection form of the output signal according to modification 10 to the pointer detection apparatus of FIG. 1.

FIG. 29 illustrates another supplying form of periodic signals and another detection form of an output signal in modification 10. Referring to FIG. 29, in the example of modification 10, a four-input one-output amplifier 92 having four input terminals is used. The four input terminals of the amplifier 92 include non-negated (+) terminals and "0" terminals arranged alternately. The "0" terminals are connected to the ground. The input terminals are connected to the reception conductor selection circuit 31 described above with reference to FIG. 1. In particular, arbitrary four reception conductors $X_m$ to $X_{m+3}$ of the reception conductor selection circuit 31, which are positioned adjacent to each other, are respectively connected to the non-negated terminals and the negated terminals of the amplifier 92. In particular, of the four adjacent reception conductors $X_m$ to $X_{m+3}$, the reception conductors $X_{m+1}$ and $X_{m+3}$ are connected to the ground so that the level of the output signals from the reception conductors $X_{m+1}$ and $X_{m+3}$ is set to zero. Alternate ones of the transmission conductors $Y_n$ to $Y_{n+3}$, that is, the transmission conductors $Y_n$ and $Y_{n+2}$, may be connected to the ground in a corresponding relationship to the connection scheme of the reception conductors, as seen in FIG. 29. Further, another configuration is possible wherein the reception conductors $X_{m-1}$ and $X_{m+1}$ are connected to the "0" terminals while the reception conductors $X_m$ and $X_{m+2}$ are connected to the non-negated terminals.

In this example, for example, if a four-input one-output amplifier is used and all of the input terminals of the same are non-negated terminals, that is, if four arbitrary reception conductors selected by the reception conductor selection circuit 31 are used to carry out "++++" reception, the level curve of the output signal will exceed the dynamic range of the amplifier 92 due to swells and so forth based on synthesis of periodic signals, resulting in saturation of the amplifier 92. However, where "+0+0" or "0+0+" reception is carried out (alternate ones of the reception conductors are connected to the ground), although an equal number of reception conductors are used, the level curve of the output signal is not saturated.

According to the example of modification 10 described above with reference to FIG. 29, a plurality of periodic signals of the same frequency are supplied to the corresponding transmission conductors 14 and output signals from alternate ones of the reception conductors 12 are added similarly as in the example described above with reference to FIG. 28. In the configuration described, the detection range can be expanded while current flowing into the reception conductors is suppressed to a suitable degree, and the level of the output signal to be detected can be increased. Therefore, the detection sensitivity can be enhanced. Further, the example of modification 10 described above with reference to FIG. 29 is suitable particularly where the position detection region on the sensor section 10 is great since the detection range can be expanded and the level of the output signal to be detected can be increased similar to the example of FIG. 28.

In modification 10 illustrated in FIGS. 28 and 29, the supplying pattern of periodic signals of the same frequency to the transmission conductors 14 is the same as the connection pattern of the reception conductors 12 whose outputs are to be added by an amplifier. In this instance, the minimum detection region on the sensor section 10 becomes a square shape, and an isotropic distribution is obtained.

[Modification 11]

Figure 30:
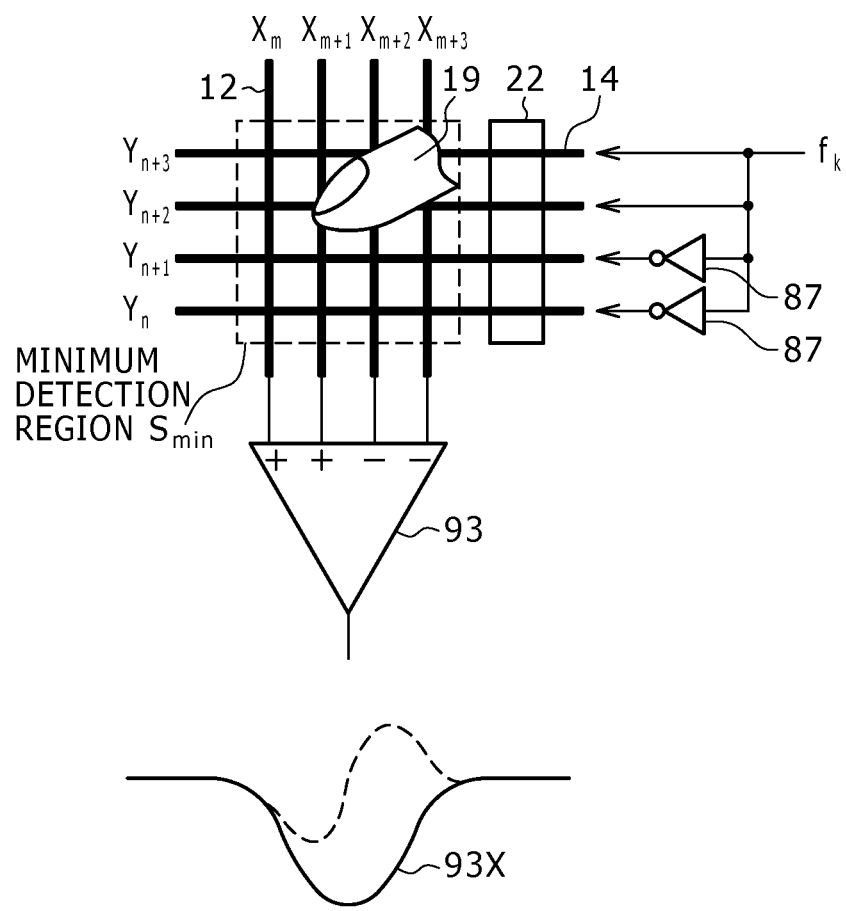
FIG. 30 is a diagrammatic view showing an example of a supplying form of periodic signals and a detection form of an output signal according to modification 11 to the pointer detection apparatus of FIG. 1.

As an example for improving the noise resisting property of an output signal to be detected by the reception section 30, a configuration which uses a differential amplifier to carry out differential driving is available. An example of a supplying form of periodic signals and a detection form of an output signal where four reception conductors form a detection range is illustrated in FIG. 30. FIG. 30 illustrates modification 11, which uses a four-input one-output differential amplifier 93. The four input terminals of the differential amplifier 93 include negated (−) terminals and non-negated (+) terminals disposed such that the terminals of the same polarity are disposed in a neighboring relationship with each other. Thus, the reception conductors $X_m$ and $X_{m+1}$ from arbitrary four reception conductors $X_m$ to $X_{m+3}$ of the reception conductor selection circuit 31 shown in FIG. 1 are connected to the non-negated terminals of the differential amplifier 93, while the reception conductors $X_{m+2}$ and $X_{m+3}$ are connected to the negated terminals of the differential amplifier 93.

Where the signal detection form of the reception section is "++−−" as in modification 11, the signal supplying form of the transmission section is preferably set in conformity with the signal detection form. In particular, periodic signals having "negative, negative, positive, positive" phases in the ascending order of the indexes of the transmission conductors 14 are supplied to the four transmission conductors $Y_n$ to $Y_{n+3}$ positioned adjacent to each other. In order to implement this, periodic signals of a frequency $f_k$ are supplied to the transmission conductors $Y_{n+2}$ to $Y_{n+3}$ without changing the phase thereof, as seen in FIG. 30. Meanwhile, periodic signals of the frequency $f_k$ are supplied through phase inversion circuits 87 to the transmission conductors $Y_n$ to $Y_{m+1}$.

In this example, a level curve 93X illustrated in FIG. 30 represents the level or output value of the output signal originating from the four reception conductors 12. Where the differential amplifier 93 with the configuration described above is used in the reception section, noise included in a synthetic signal of the reception conductors $X_m$ and $X_{m+1}$ and a synthetic signal of the reception conductors $X_{m+2}$ and $X_{m+3}$ cancel each other in the differential amplifier 93. Therefore, the noise resisting property can be enhanced.

Where a differential amplifier is used, the level variation of the output signal obtained when a pointer actually touches the sensor section exhibits an S-shaped characteristic, as indicated by a broken line in FIG. 30. In order to calculate the position of the pointer, the output signal must have one peak value, as in the level curve 93X. This is because a reception conductor, which exhibits the peak value, indicates the position at which the pointer actually touches. Such an output signal, which has one peak value as just described, can be obtained by applying an integration process to an output signal having an S-shaped characteristic indicated by a broken line in FIG. 30. However, the integration process accumulates noise, and the position detection accuracy may thus deteriorate.

Therefore, in modification 11, the same number of input terminals of different polarities can be arranged in the left and right portions of a differential amplifier of the reception section 30 such that left and right output signals to be detected are balanced. An example is shown in FIG. 31.

Figure 31:
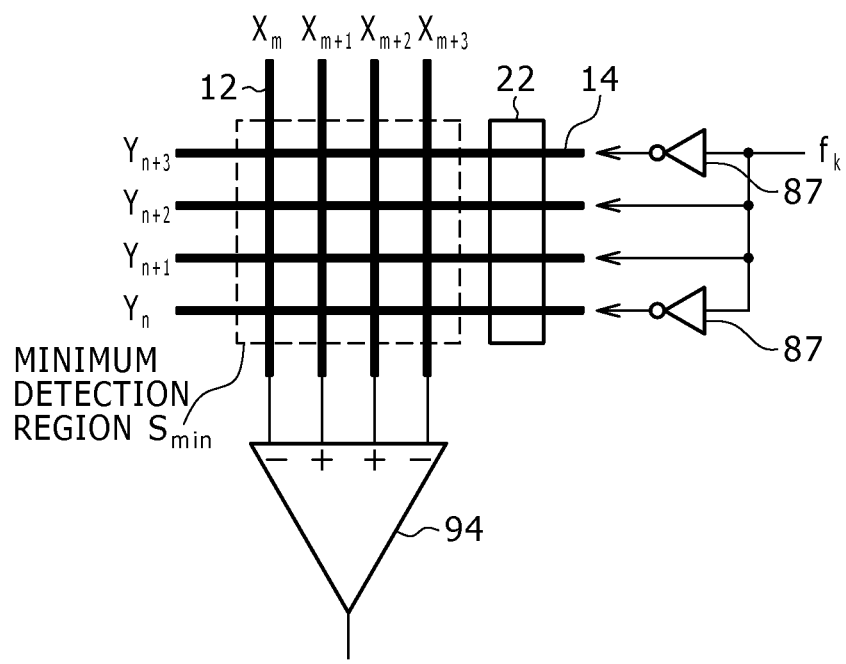
FIG. 31 is a similar view but showing another example of a supplying form of periodic signals and a detection form of an output signal according to modification 11 to the pointer detection apparatus of FIG. 1.

FIG. 31 illustrates an example of a supplying form of periodic signals and a detection form of an output signal where the detection range includes four reception conductors. Referring to FIG. 31, in the example shown, a four-input one-output differential amplifier 94 is used. The four input terminals of the differential amplifier 94 are disposed such that the non-negated (+) terminals and the negated (−) terminals are symmetrical with each other in the leftward and rightward direction. The reception conductor selection circuit 31 shown in FIG. 1 is connected to the differential amplifier 94 such that arbitrary four reception conductors $X_m$ to $X_{m+3}$ positioned adjacent to each other are connected to the four input terminals of the differential amplifier 94. In particular, of the four adjacent reception conductors $X_m$ to $X_{m+3}$, the reception conductors $X_{m+1}$ and $X_{m+2}$ are connected to the non-negated terminals of the differential amplifier 94 and the reception conductors $X_m$ and $X_{m+3}$ are connected to the negated terminals. In the transmission section 20, it is preferable to arrange the supplying pattern of periodic signals to match the polarities of the input terminals of the differential amplifier 94 to which the reception conductors 12 are connected. Specifically, of arbitrary four transmission conductors $Y_n$ to $Y_{n+3}$ positioned adjacent to each other and selected by the transmission conductor selection circuit 22, periodic signals of the frequency $f_k$ are supplied to the transmission conductors $Y_{n+1}$ to $Y_{n+2}$, while, to the transmission conductors $Y_n$ to $Y_{n+3}$, periodic signals having a phase reversed from that of the periodic signals of the frequency $f_k$ are supplied through the phase inversion circuit 87.

An output signal obtained from the differential amplifier 94 in modification 11 has one peak value as seen from a level curve 94X illustrated in FIG. 31. As a result, since the necessity for an integration process of an output signal of the differential amplifier is eliminated, the noise resisting property can be improved. Therefore, a signal when the sensor section is pointed by a pointer can be detected with certainty.

While in modification 11 described above, the number of reception conductors to be connected to a differential amplifier is four, the number of reception conductors is not limited to four or any even number. It may also be a unit of an odd number, such as three or five. Further, the phase reversal may be carried out not only on the reception conductors side, but also on the transmission conductors side or on both of the reception conductors side and the transmission conductors side. Further, the central reception conductor may be connected to the ground or to an arbitrary reference potential as in the example of FIG. 28.

Further, while the disposition of the input terminals of the differential amplifier in modification 11 described above is "−++−," the disposition of the input terminals is not limited to this example, and it is only necessary for the input terminals to be disposed symmetrically in the leftward and rightward direction. Thus, FIG. 32 illustrates a different example of a supplying form of periodic signals and a detection form of an output signal where the detection range includes four reception conductors.

Figure 32:
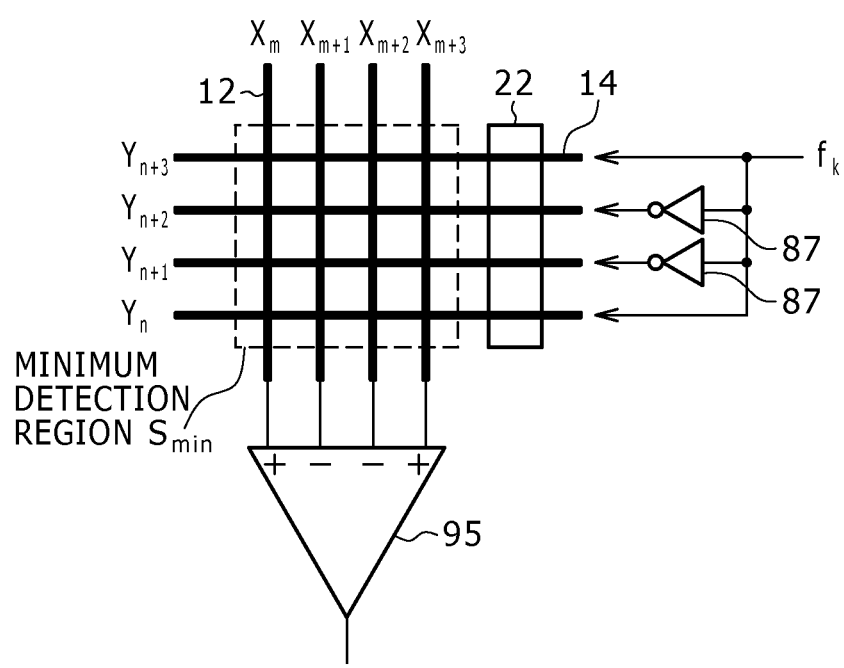
FIG. 32 is a similar view but showing a further example of a supplying form of periodic signals and a detection form of an output signal according to modification 11 to the pointer detection apparatus of FIG. 1.

Referring to FIG. 32, a four-input one-output differential amplifier 95 is used, and the input terminals of the differential amplifier 95 are disposed such that non-negated (+) terminals and negated (−) terminals are switched relative to those used in modification 11 described above with reference to FIG. 31. The reception conductor selection circuit 31 described above with reference to FIG. 1 is connected to the differential amplifier 95 such that arbitrary four reception conductors $X_m$ to $X_{m+3}$ positioned adjacent to each other of the reception conductor selection circuit 31 are connected to the four input terminals of the differential amplifier 95. In particular, from the four adjacent reception conductors $X_m$ to $X_{m+3}$, the reception conductors $X_m$ and $X_{m+3}$ are connected to the non-negated terminals of the differential amplifier 95, while the reception conductors $X_{m+1}$ and $X_{m+2}$ are connected to the negated terminals of the differential amplifier 95. In the transmission section 20, of arbitrary four transmission conductors $Y_n$ to $Y_{n+4}$ positioned adjacent to each other and selected by the transmission conductor selection circuit 22, to the transmission conductors $Y_n$ and $Y_{n+3}$ periodic signals of the frequency $f_k$ are supplied. To the transmission conductors $Y_{n+1}$ and $Y_{n+2}$, periodic signals having a phase reversed from that of the periodic signals of the frequency $f_k$ are supplied through the phase inversion circuit 87. As a result, the supplying pattern of periodic signals corresponds to the polarities of the input terminals of the differential amplifier 95, to which the reception conductors 12 are connected. In other words, in the example of FIG. 32, the disposition of the input terminals of the differential amplifier 95 is "+−−+." In the case of "+−−+" also, the necessity for an integration process of an output signal of the differential amplifier is eliminated similar to the example described above with reference to FIG. 31. Consequently, the noise resisting property can be improved.

[Modification 12]

While, in modification 11 described above, the detection range includes four reception conductors, in modification 12, the detection range includes three reception conductors.

Figure 33A:
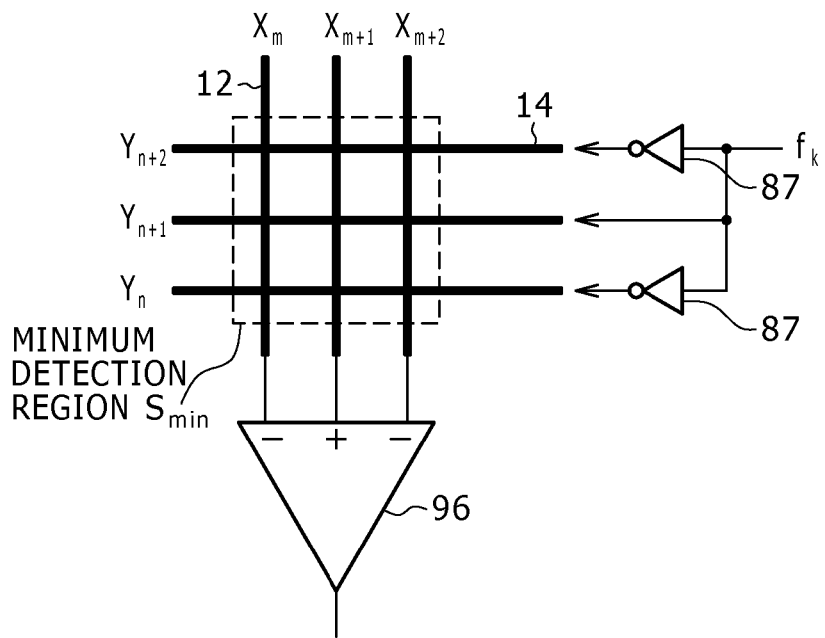
FIGS. 33A and 33B are diagrammatic views showing different examples of a supplying form of periodic signals and a detection form of an output signal according to modification 12 to the pointer detection apparatus of FIG. 1.
Figure 33B:
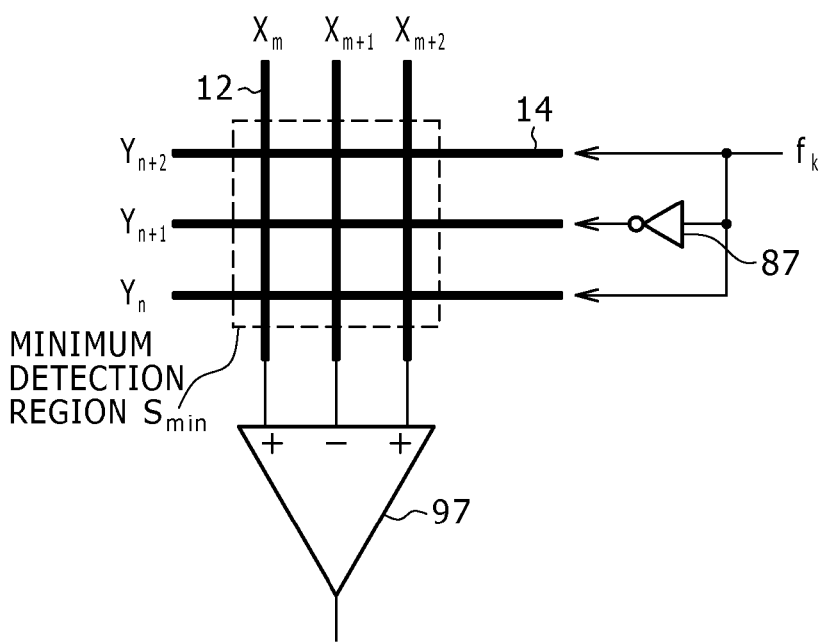

FIG. 33A illustrates a supplying form of periodic signals and a detection form of an output signal where the detection range includes three reception conductors, as modification 12, and FIG. 33B illustrates an example different from modification 12 of FIG. 33A.

In the example of FIG. 33A, a three-input one-output differential amplifier 96 is used. The three input terminals of the differential amplifier 96 are disposed such that the non-negated (+) terminal and the negated (−) terminals are symmetrical with each other in the leftward and rightward direction. Then, the reception conductor selection circuit 31 described above with reference to FIG. 1 is connected to the differential amplifier 96 such that arbitrary three reception conductors $X_m$ to $X_{m+2}$ of the reception conductor selection circuit 31 positioned adjacent to each other are connected to the three input terminals of the differential amplifier 96. More particularly, of the three reception conductors $X_m$ to $X_{m+2}$ positioned adjacent to each other, the reception conductor $X_{m+1}$ is connected to the non-negated terminal, and the reception conductors $X_m$ and $X_{m+2}$ are connected to the negated terminal. Meanwhile, in the transmission section 20, to the transmission conductor $Y_{n+1}$ from among arbitrary three transmission conductors $Y_n$ to $Y_{n+2}$ positioned adjacent to each other and selected by the transmission conductor selection circuit 22, periodic signals of the frequency $f_k$ are supplied. To the transmission conductors $Y_n$ and $Y_{n+2}$, periodic signals having a phase reversed from that of the periodic signals of the frequency $f_k$ are supplied through the phase inversion circuit 87. As a result, the supplying pattern of periodic signals corresponds to the polarities of the input terminals of the differential amplifier 96 to which the reception conductors 12 are connected.

In the example of FIG. 33B, the polarities of the input terminals of the differential amplifier of FIG. 33A are reversed. In particular, a three-input one-output differential amplifier 97 is used. The three input terminals of the differential amplifier 97 are disposed such that the non-negated (+) terminals and the negated (−) terminal are symmetrical with each other in the leftward and rightward direction. Then, the reception conductor selection circuit 31 described above with reference to FIG. 1 is connected to the differential amplifier 97 such that arbitrary three reception conductors $X_m$ to $X_{m+2}$ of the reception conductor selection circuit 31 positioned adjacent to each other are connected to the three input terminals of the differential amplifier 97. More particularly, of the three reception conductors $X_m$ to $X_{m+2}$ positioned adjacent to each other, the reception conductors $X_m$ and $X_{m+2}$ are connected to the non-negated terminal and the reception conductor $X_{m+1}$ is connected to the negated terminal Meanwhile, in the transmission section 20, to the transmission conductors $Y_m$ and $Y_{m+2}$ from among arbitrary three transmission conductors $Y_m$ to $Y_{m+2}$ positioned adjacent to each other and selected by the transmission conductor selection circuit 22, periodic signals of the frequency $f_k$ are supplied. To the transmission conductor $Y_{m+1}$, a periodic signal having a phase reversed from that of the periodic signals of the frequency $f_k$ is supplied through the phase inversion circuit 87. As a result, the supplying pattern of period signals corresponds to the polarities of the input terminals of the differential amplifier 97 to which the reception conductors 12 are connected.

In the examples illustrated in FIGS. 33A and 33B, in order to establish a balanced state between output signals obtained at the input terminals of different polarities, an output signal obtained from a terminal of one polarity, to which a comparatively smaller number of reception conductors are connected, and output signals obtained at terminals of the other polarity, to which a comparatively greater number of reception conductors are connected, are balanced with each other. In particular, the level of an output signal obtained at the "+(−)" terminal of the differential amplifier 96 (97) is increased to twofold, and both this output signal increased to twofold and output signals obtained at the other two "−(+)" terminals are used. In this example, to what extent (i.e., to what number of times) the level of the output signal obtained at an input terminal or terminals of a polarity for which the number of terminals provided is comparatively small is to be increased, is determined based on both the number of input terminals of the polarity with which the number of reception terminals connected is comparatively small and the number of input terminals of the other polarity with which the number of reception terminals connected is comparatively great.

With modification 12, even where the number of conductors to be detected is a unit of an odd number, left and right output signals detected upon detection waiting can be balanced with each other similar to the examples of modification 11 illustrated in FIGS. 31 and 32. Further, with modification 12, the minimum detection region $S_{min}$ can be reduced in comparison with that in modification 11 in addition to the effect that the noise resisting property is improved similarly to modification 11.

[Modification 13]

Modification 13 is modification to the first embodiment in that a nonlinear process is carried out for a level curve or level characteristic of an output signal obtained when a pointer actually touches the sensor section. Modification 13 is described with reference to FIGS. 34 and 35.

Figure 34:
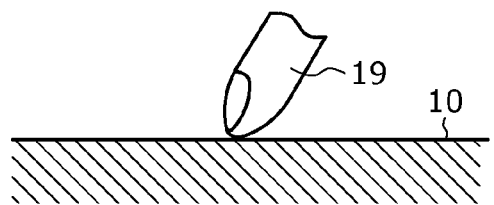
FIG. 34 is a schematic diagrammatic view illustrating a signal level upon normal detection of a finger.

FIG. 34 illustrates a signal level upon ordinary detection of a finger. Usually, a level curve 101 of an output signal obtained by the reception section 30 when a pointer such as a finger 19 touches the detection surface of the sensor section 10 has such a characteristic as seen in FIG. 34. The level of the output signal obtained upon touching by the pointer is very high at the touched location of the sensor section 10. On the other hand, the level of the output signal is very low at a portion of the sensor section 10 at which the pointer is spaced from the sensor section 10, that is, at a non-touched portion of the sensor section 10. Even if a recognition process is carried out at a location where the pointer is spaced a little from the sensor section 10, the level of the output signal is very different between the two cases (the touched vs. non-touched) and, therefore, an accurate recognition process is difficult.

Thus, in modification 13, an output signal obtained upon touching by a pointer is subjected to a detection process by the signal detection circuit 34, and then to logarithmic transformation. Where nonlinear transformation such as logarithmic transformation is carried out, a signal portion of the output signal, which has a comparatively low level and corresponds to a non-touched portion of the sensor section 10, can be made to stand out while the signal level of another signal portion, which has a comparatively high level and corresponds to a touched portion of the sensor section 10, can be suppressed.

Figure 35:
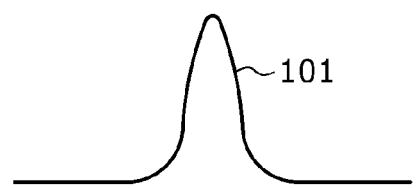
FIG. 35 is similar view but illustrating an example of a level curve after a nonlinear process for the signal of the signal level of FIG. 34, according to modification 13 to the pointer detection apparatus of FIG. 1.

FIG. 35 illustrates an example of a level curve after the nonlinear process of the output signal represented by the level curve 101 in the example of FIG. 34. The level curve 102 in the example of FIG. 35 has a suppressed maximum value and is broadened. Therefore, the level of the output signal continues between adjacent reception conductors at the boundary between a touched portion and a non-touched portion of the sensor section 10 by the pointer. Consequently, a boundary recognition process for the pointer can be readily carried out. It is to be noted that a nonlinear process for the output signal is not limited to the logarithmic transformation and other suitable processes may be used.

According to the example described, an output signal obtained upon touching by a pointer is nonlinearly transformed once. Consequently, an output signal continues between adjacent reception conductors at the boundary between a touched portion and a non-touched portion of the sensor section 10. Therefore, a boundary recognition process for the pointer can be readily carried out. Accordingly, a recognition characteristic with respect to a pointer can be improved. Such extraction of a surface area that is touched by the pointer including the boundary is important for the purpose of detecting a pointer coordinate, a pointer pressure, and so forth, as will be described later. Particularly when the pointer moves on the sensor section, a coordinate error that may otherwise occur when the pointer crosses over between reception conductors (i.e., a selection error of a reception conductor before and after such crossing over) can be reduced.

[Modification 14]

Modification 14 is an example in which identification of a state wherein a pointer is spaced away from the detection surface of the sensor section in the first embodiment is carried out satisfactorily. The state described is hereinafter referred to as hovering.

Identification of whether or not a pointer touches the sensor section is conventionally recognized based only on a gradient 102A of an edge, that is, a rising edge, of a level curve of an output signal obtained from the reception conductors of the sensor section, as seen in FIG. 35. For example, when the gradient 102A is steep, it is identified that a pointer 19 is touching the sensor section, but when the gradient 102A is moderate, it is identified that a pointer is spaced away from the sensor section.

However, if a setting of the amplifier varies, accurate identification of a touching state becomes difficult. A method that identifies a hovering situation without being influenced by a detected level variation of the output signal is described below with reference to FIGS. 34 to 36.

In modification 14, a hovering situation is identified from a maximum value of the level curve of the output signal obtained from the reception conductors of the sensor section and a form of the level curve. The maximum value of the level curve is hereinafter referred to as a peak value. Therefore, the pointer detection apparatus of modification 14 includes ratio calculation means for detecting a peak value, which is the length of an arrow mark in FIG. 35, and the gradient 102A of an edge of the level curve, and dividing the gradient 102A of the edge by the peak value to determine a ratio. It further includes hovering identification means for identifying whether or not the pointer is in a hovering state depending upon whether or not the ratio is higher than a predetermined threshold value. In particular, the signal detection circuit 34 is provided with the ratio calculation means and the hovering identification means, and a result of the identification by the signal detection circuit 34 is transmitted to the position calculation circuit 35. Alternatively, the functions of the ratio calculation means and the hovering identification means may be provided in the control circuit 40.

The hovering identification means has stored therein a predetermined threshold value for deciding whether or not the pointer is in a hovering state, and has a function of comparing the ratio between the peak value and the gradient 102A of the edge as determined by the ratio calculation means with the predetermined threshold value. If the ratio between the peak value and the gradient 102A of the edge is higher than the predetermined threshold value, the hovering identification means decides that the pointer is in a non-hovering state, that is, the pointer is touching the sensor section. If the ratio between the peak value and the gradient 102A of the edge calculated by the ratio calculation means is lower than the predetermined threshold value, the hovering identification means decides that the pointer is in a hovering state, that is, the pointer is not in touch with the sensor section. Further, the hovering identification means may set a second threshold value lower than the predetermined threshold value, and compare the second threshold value and the ratio between the peak value and the gradient 102A of the edge determined by the ratio calculation means with each other. A degree of the hovering situation may thus be identified more particularly.

Figure 36:
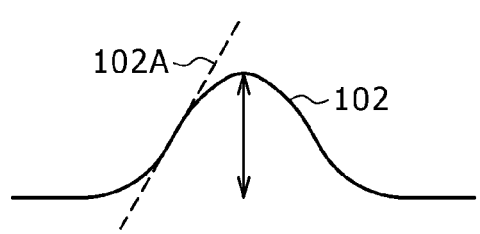
FIG. 36 is a diagrammatic view illustrating an example of normalized levels of output signals detected by the reception section according to modification 14 to the pointer detection apparatus of FIG. 1.

An example of determination of a peak value and a gradient of an edge is described with reference to FIG. 36. FIG. 36 illustrates an example of normalized levels of output values of output signals detected by the reception section 30. The present example represents a normalized value of the level of an output signal detected during a certain instantaneous time period, using three transmission conductors and three reception conductors. Since the level 100 as a maximum value is detected at the center and the level 50 is detected on the left and right sides of the center in the direction along a transmission conductor, the gradient of the edge in this instance is 100−50=50. Then, since the maximum value of the level curve of the output signal is 100, the value of the ratio to be determined is the gradient of edge/maximum value=50/100=0.5. In the example illustrated in FIG. 36, the peak value and the gradient of the edge of the output signal are determined from the level curve 102 illustrated in FIG. 35 obtained by the non-linear process. They may otherwise be determined from the level curve 101 before the non-linear process.

According to the example illustrated in FIG. 36, since a hovering situation is identified based on a maximum value of the level curve of the detected output signal and a ratio of the shape of the level curve, stable identification of a hovering situation becomes possible. Therefore, the identification of a hovering situation is not influenced by the level variation of the output signal obtained from the reception conductors of the sensor section.

[Modification 15]

Modification 15 is an example suitable to carry out detection of hovering with certainty in the first embodiment.

Where hovering at a certain cross point or in a detection area is to be detected, if a predetermined number is selected as the number of transmission conductors and reception conductors which are to be rendered operative at the same time, then the number of conductors to be selected later is fixed. However, where this configuration is used, the detection sensitivity of hovering may become low as the influence of noise increases significantly. Therefore, reliable detection of hovering becomes difficult.

In modification 15, the number of transmission conductors and reception conductors to be rendered operative at the same time is dynamically varied. This operation is described with reference to FIGS. 37 and 38.

Figure 37:
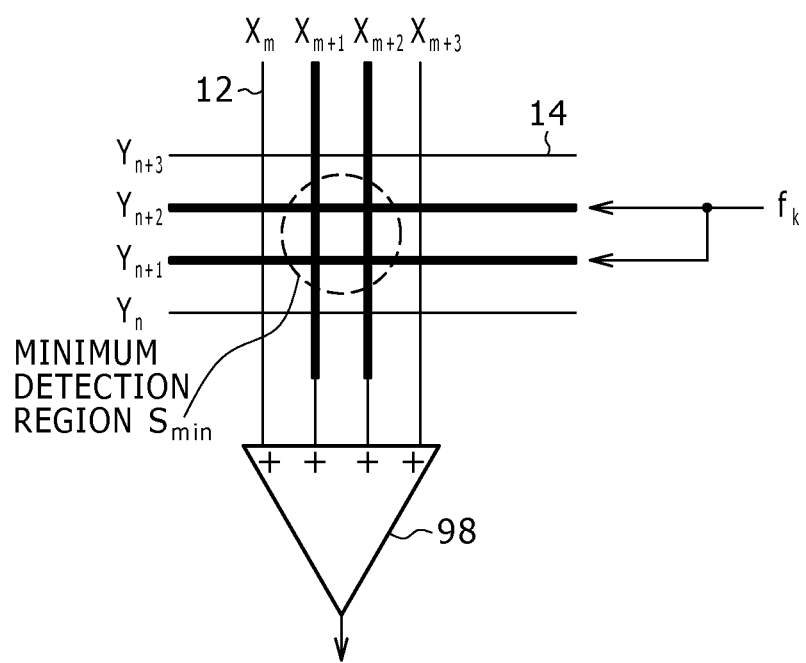
FIGS. 37 and 38 are diagrammatic views illustrating examples of a supplying form of periodic signals and a detection form of an output signal according to modification 15 to the pointer detection apparatus of FIG. 1.
Figure 38:
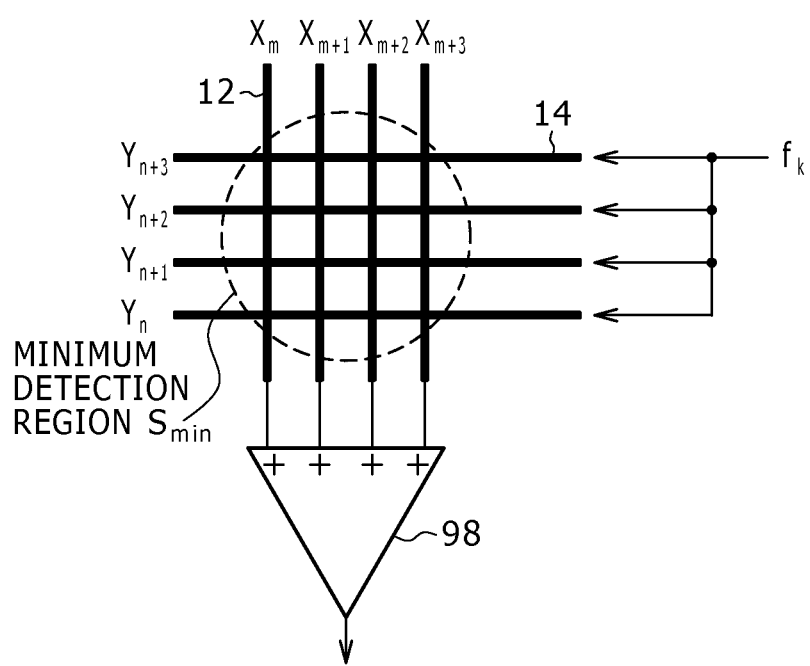

FIG. 37 illustrates a supplying form of periodic signals and a detection form of an output signal where a pointer is positioned in proximity to the sensor section. FIG. 38 illustrates a supplying form of periodic signals and a detection form of an output signal where a pointer is not positioned in proximity to the sensor section.

The example shown FIGS. 37 and 38 has a configuration similar to that of modification 9 described above with reference to FIG. 24. In modification 15 of FIG. 37, a four-input one-output amplifier 98 whose four input terminals have the polarity of "+" is used in the reception section 30.

In the example of FIG. 37, two transmission conductors 14, which are positioned adjacent to each other, are selected to utilize two input terminals from among the four input terminals. In the transmission section 20, periodic signals of the same frequency are preferably supplied to two adjacent ones of the transmission conductors 14. Where a pointer is positioned in proximity to the sensor section, two transmission conductors 14 and two reception conductors 12 are selected to detect a current variation. Whether or not a pointer is positioned in proximity to the sensor section can be detected using modification 13 described above with reference to FIGS. 34 and 35 or modification 14 described above with reference to FIGS. 35 and 36.

In the example illustrated in FIG. 38, the four-input one-output amplifier 98 is used in the reception section 30, and the transmission section 20 selects four adjacent ones of the transmission conductors 14 to which periodic signals are to be supplied. Preferably, the periodic signals to be supplied from the transmission section 20 have the same frequency and are supplied to four transmission conductors 14 positioned adjacent to each other. In this manner, where a pointer is not positioned in proximity to the sensor section, four transmission conductors 14 and four reception conductors 12 are selected to increase the number of conductors to be used.

Such selection of the reception conductors 12 and the transmission conductors 14 is carried out by the control circuit 40. The control circuit 40 receives an output from the position calculation circuit 35 to decide the distance between the sensor section and the pointer, and based on a result of the decision issues an instruction regarding a position and a number of conductors to be selected to both the transmission conductor selection circuit 22 and the reception conductor selection circuit 31.

A particular example of hovering operation is described with reference to FIGS. 1, 37 and 38.

It is assumed that two transmission conductors 14 and two reception conductors 12 are selected at a certain time to execute scanning, as seen in FIG. 37. The following description is given assuming that periodic signals having different frequencies from each other are supplied at the same time from the multi-frequency signal supplying circuit 21 to all transmission conductors 14, which form the transmission conductor group 13.

In this instance, the control circuit 40 first controls the reception conductor selection circuit 31 to select, for example, the reception conductors $X_{m+1}$ and $X_{m+2}$. In this state, the reception section 30 carries out detection of a pointer using the selected reception conductors $X_{m+1}$ and $X_{m+2}$. After the detection process by the reception section 30 is completed, the control circuit 40 controls the reception conductor selection circuit 31 to displace the reception conductors to select the reception conductors $X_{m+3}$ and $X_{m+4}$, for example. Then, the reception section 30 carries out detection using the newly selected reception conductors $X_{m+3}$ and $X_{m+4}$. Thereafter, selection of the reception conductors 12 and detection of a pointer as just described are repeated to carry out scanning of the entire sensor section 10. Here, if the reception section 30 cannot detect a pointer, that is, if an output from the amplifier 98 is not detected, the control circuit 40 controls the reception conductor selection circuit 31 to increase the number of reception conductors 12 to be selected by the reception conductor selection circuit 31, for example, to four, as seen in FIG. 38, and thereafter executes scanning.

Where the number of reception conductors 12 to be selected by the reception conductor selection circuit 31 is increased from two to four in this manner, since the number of output signals to be input from the reception conductors to the amplifier increases to four, the detection accuracy increases. Further, since the number of conductors to be selected increases from two to four, the time required for scanning the entire sensor section can be reduced, also.

While in modification 15 the number of conductors to be selected by the reception conductor selection circuit 31 is two or four, the number of conductors is not limited to four, but may be any number. Further, the number of reception conductors 12 to be selected at the same time is not limited to four. In other words, the control circuit 40 may control the reception conductor selection circuit 31 so that, as the distance between the sensor section and the pointer increases, the number of conductors to be selected by the reception conductor selection circuit 31 is gradually increased. Further, while, in the example of FIGS. 37 and 38, the amplifier described is of the type which carries out single (input) end operation, an amplifier of differential operation may be used instead. In modification 15, periodic signals having different frequencies from each other are supplied at the same time from the multi-frequency signal supplying circuit 21 to all transmission conductors 14 which form the transmission conductor group 13. However, periodic signals to be supplied from the transmission section 20 may be changed over similarly, e.g., by gradually increasing the number of transmission conductors 14 that receive the same frequency signals.

In the present example, if it is decided that no pointer exists in proximity to the sensor section, the number of transmission conductors 14 and reception conductors 12 to be used is controlled so as to increase the detection sensitivity. Accordingly, reliable hovering detection can be implemented.

[Modification 16]

Modification 16 is an example suitable for advantageously carrying out all scanning desired to be carried out at a high speed with increased sensitivity. In particular, it is directed to roughly detecting a pointer in response to a signal level of a detection signal detected by the sensor section.

In the present description, "all scanning" means to sequentially carry out a detection process for a current variation (i.e., scanning) to cover all cross points on the sensor section in order to detect a pointer. It is desired that all scanning is carried out at a high speed with increased sensitivity. However, if all scanning of the transmission conductors and the reception conductors is carried out for each conductor or for each group of a small number of conductors, the sensitivity decreases, and since the number of scanning points is large, the time required for all scanning becomes long.

Therefore, in modification 16, if an output signal is not detected from the sensor section, the number of transmission conductors and reception conductors to be used for a single-time detection process is increased (as compared to that used in all scanning) to make rough scanning of scanning points (hereinafter referred to as "skip scanning"). In the skip scanning, the minimum detection region is made greater, and a detection process for a current variation is carried out using the minimum detection region as a minimum unit of displacement or shifting.

In order to implement the skip scanning, the signal detection circuit 34 is provided with a function of detecting presence or absence of an output signal. The signal detection circuit 34 transmits a result of the detection to the control circuit 40. The control circuit 40 receives the result of detection from the signal detection circuit 34 and controls the number of conductors to be selected by the transmission conductor selection circuit 22 and the reception conductor selection circuit 31 based on the received detection result. If a pointer is not detected, that is, if an output signal is not detected, the control circuit 40 controls the transmission conductor selection circuit 22 and the reception conductor selection circuit 31 to increase the number of transmission conductors 14 and reception conductors 12 to be used for transmission and reception of signals. If a pointer is detected, that is, if an output signal is detected, the control circuit 40 controls the transmission conductor selection circuit 22 and the reception conductor selection circuit 31 to decrease the number of transmission conductors 14 and reception conductors 12 to be selected by the transmission conductor selection circuit 22 and the reception conductor selection circuit 31, respectively.

A particular example of the skip scanning is described with reference to FIGS. 1 and 38.

If all scanning is carried out but an output signal is not detected, the control circuit 40 controls the transmission conductor selection circuit 22 and the reception conductor selection circuit 31 so that four conductors, that is, four transmission conductors $Y_n$ to $Y_{n+3}$ and four reception conductors $X_m$ to $X_{m+3}$, may be selected from the transmission conductors 14 and the reception conductors 12 to initiate skip scanning. Then, after scanning is carried out for the selected four reception conductors $X_m$ to $X_{m+3}$, the control circuit 40 controls the reception conductor selection circuit 31 to shift the reception conductors to be selected to carry out scanning of the reception conductors $X_{m+4}$ to $X_{m+7}$ (not shown). Thereafter, the control circuit 40 repeats selection and scanning of the transmission conductors 14 and the reception conductors 12, and changeover of the transmission conductors 14 and the reception conductors 12 to be selected by the transmission conductor selection circuit 22 and the reception conductor selection circuit 31, to repeat the operation for the entire sensor section 10. Then, if a pointer is detected at any step, the control circuit 40 stops the skip scanning and executes all scanning using a smaller group of transmission conductors 14 and reception conductors 12 to be selected.

Where the number of reception conductors to be selected at the same time is changed to four as in the skip scanning of the present example, the sensitivity is increased. Further, since the detection position is shifted by a greater amount, in addition to the increased sensitivity, the detection time required for the entire sensor section is reduced. While in the example described the number of conductors to be selected at the same time during skip scanning is four, it is not limited to this particular number. The number of conductors to be selected during skip scanning may be any arbitrary number greater than that used in all scanning, for example, two, three or five. Further, while the number of reception conductors to be changed over (i.e., switched or shifted) is four, the number of reception conductors to be changed over is not limited to this number. For example, where four reception conductors are to be selected, they can be shifted by two, three or four conductors. In particular, in the description above using displacement by four conductors, reception is carried out using the reception conductors $X_m$ to $X_{m+3}$ first, and then the reception conductors to be selected are changed over to the reception conductors $X_{m+4}$ to $X_{m+7}$, and so forth. However, displacement by two conductors is possible, wherein reception is carried out first using the reception conductors $X_m$ to $X_{m+3}$, and then the reception conductors to be selected are changed over to the reception conductors $X_{m+2}$ to $X_{m+5}$, and so forth. Further, while both of the transmission conductors and the reception conductors are selected four by four, the number of the transmission conductors may be different than the number of the reception conductors to be selected.

Further, while it is described that both the number of transmission conductors and the number of reception conductors to be selected are increased or decreased at the same time based on the level of the output signal, other arrangements are possible. For example, only the number of transmission conductors or the number of reception conductors may be increased or decreased. Various methods can be applied as long as the effective area, that is, the minimum detection region within which an output signal can be detected, is increased or decreased.

The number of transmission conductors and reception conductors to be used may be changed depending not only upon detecting the presence or absence of an output signal but also upon the degree of the level of the output signal. For example, when the level of the output signal is higher than a predetermined threshold value set in advance, the number of conductors is decreased, but when the level of the output signal is lower than the predetermined threshold value, the number of conductors is increased. Further, not one threshold value but a plurality of threshold values may be set. As a method of detecting the level of the output signal, the method of modification 13 described above with reference to FIGS. 34 and 35, modification 14 described above with reference to FIGS. 35 and 36 or the like may be used.

In the present example, when a pointer is not detected, the number of transmission conductors and reception conductors to be selected at the same time is increased to carry out rough scanning of scan points, that is, to initiate skip scanning. Where the number of conductors is set in this manner, the detection sensitivity can be improved and high speed scanning can be implemented. Therefore, if modification 16 is applied to the first embodiment, that is, to the frequency multiplexing method, the time required for one cycle of scanning the entire sensor section 10 can be reduced significantly in comparison with the conventional systems because of a synergistic effect with the frequency multiplexing.

[Modification 17]

Modification 17 is suitable to more accurately detect a touched location of the sensor section by a pointer or detect a pointer positioned in proximity to the sensor section in the first embodiment.

As described in connection with the first embodiment illustrated in FIG. 2 and modification 1 illustrated in FIG. 14 as well as modification 2 illustrated in FIG. 15, the sensor section may have the transmission conductors and the reception conductors disposed with a spacer interposed therebetween, in two layers with a glass substrate interposed therebetween, or disposed in the same layer. Generally, in a structure which uses a spacer or a glass substrate, that is, in the structure wherein the distance between the detection surface and the transmission conductors is different than the distance between the detection surface and the reception conductors, the intensities of an electric field acting between the detection surface and the transmission and reception conductors are different. Therefore, the level curve of an output signal from a conductor spaced away from the detection surface of the sensor section exhibits a broad shape while the level curve of an output signal from a conductor in proximity to the detection surface of the sensor section exhibits a sharp shape. In other words, the gradient of an edge of the level of an output signal from a conductor spaced away from the detection surface is moderate, while the gradient of an edge of the level curve of an output signal from a conductor in proximity to the detection surface is steep.

Figure 39:
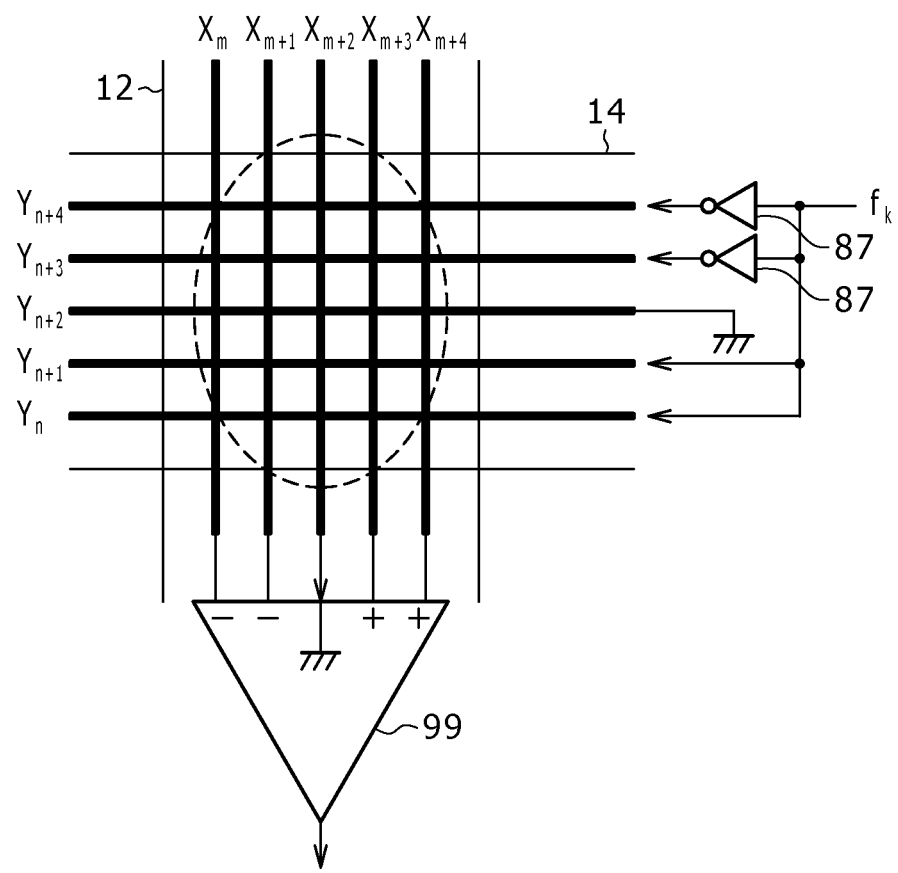
FIG. 39 is a diagrammatic view showing a supplying form of periodic signals and a detection form of an output signal and illustrating a problem to be solved by modification 17 to the pointer detection apparatus of FIG. 1.

FIG. 39 illustrates a supplying form of periodic signals and a detection form of an output signal where the number of transmission conductors and reception conductors is five. In the example of FIG. 39, a five-input one-output differential amplifier 99 is used. The five input terminals of the differential amplifier 99 include a "0" terminal at the center thereof and two non-negated (+) terminals and two negated (−) terminals disposed on the opposite sides of the "0" terminal Five reception conductors $X_m$ to $X_{m+4}$ positioned adjacent to each other are connected to the input terminals. In particular, of the five reception conductors $X_m$ to $X_{m+4}$ positioned adjacent to each other, the reception conductors $X_m$ and $X_{m+1}$ are connected to the negated terminals, the reception conductor $X_{m+2}$ is connected to the "0" terminal, and the reception conductors $X_{m+3}$ and $X_{m+4}$ are connected to the non-negated terminals. Meanwhile, five transmission conductors 14 are connected so as to correspond in polarity to the input terminals of the differential amplifier 99, to which the reception conductors 12 are connected. In particular, the central transmission conductor $Y_{n+2}$ is grounded, and periodic signals of the frequency $f_k$ are supplied to the two transmission conductors $Y_n$ and $Y_{n+1}$, while periodic signals having a phase reversed from that of the periodic signals supplied to the transmission conductors $Y_n$ to $Y_{n+1}$ are supplied to the two transmission conductors $Y_{n+3}$ to $Y_{n+4}$.

Where the structure of the sensor section in FIG. 39 is the same as that of the sensor section 50 of modification 1 described above with reference to FIG. 14, because the reception conductors 12 are disposed at a position nearer to the detection surface than the transmission conductors 14, the level curve of the output signals of the transmission conductors 14 becomes a broad curve. The level curve of the output signals of the reception conductors 12 becomes a sharp curve. Because a difference appears between the shapes of the level curves where they are viewed from the reception side and from the transmission side, even if the pointer has a round shape, there is the possibility that it may be detected as an elliptic shape, as indicated by a broken line in FIG. 39.

Therefore, in modification 17, the pointer detection apparatus is configured such that the detection width on those conductors which are disposed remotely from the detection surface of the sensor section is narrow, while the detection width on those conductors which are disposed nearer to the detection surface of the sensor section is wide. No difference may appear between the shapes or detection widths of the level curves of the output signals on the reception side and the transmission side.

Figure 40:
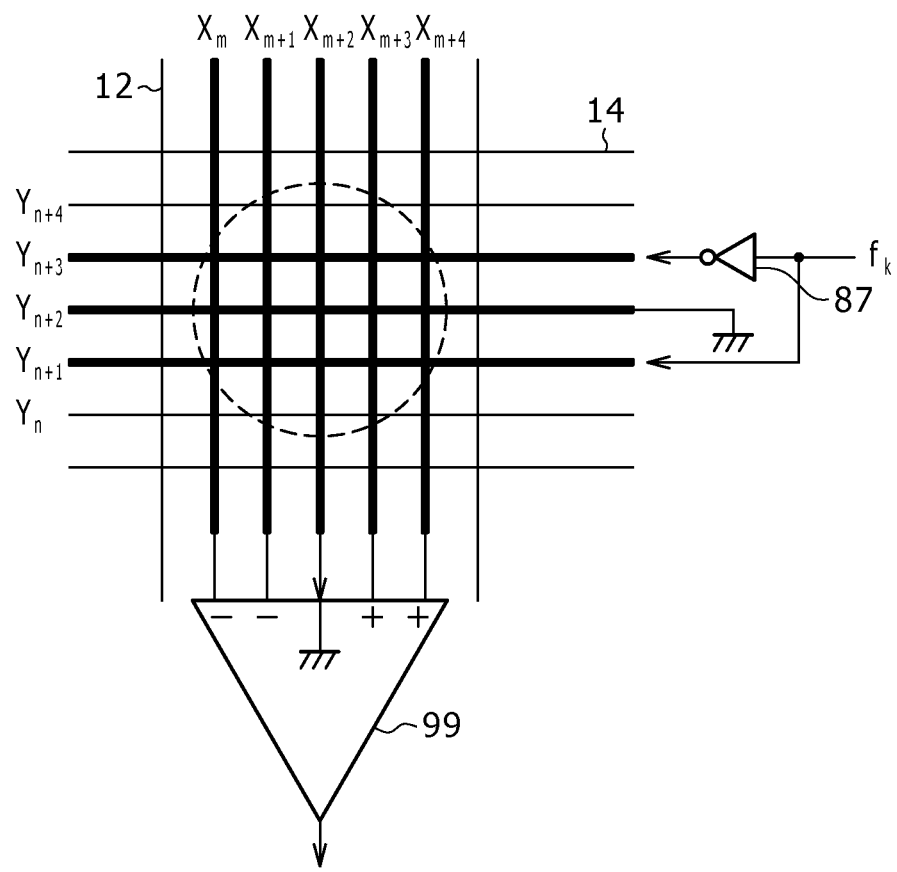
FIG. 40 is a similar view but showing an example of a supplying form of periodic signals and a detection form of the output signal according to modification 17 to the pointer detection apparatus of FIG. 1.

FIG. 40 illustrates a supplying form of periodic signals and a detection form of an output signal by modification 17. Referring to FIG. 40, the sensor section has the same structure as that of the sensor section 50 of modification 1, similar to the example described above with reference to FIG. 39, and uses the same differential amplifier 99. The example of FIG. 40 is different from the example of FIG. 39 in that three transmission conductors 14 are selected so that periodic signals are supplied thereto, wherein the central transmission conductor $Y_{n+2}$ from the three selected transmission conductors 14 is grounded, and a periodic signal is supplied to the transmission conductor $Y_{n+1}$ and to the transmission conductor $Y_{n+3}$ after the phase thereof is reversed by a phase inversion circuit 87.

In the above configuration, if the level curve of the output signals is represented by a three-dimensional representation, and the shape of the level curve is cut away with a certain threshold value, the shapes or detection widths of the level curve portions of the output signals on the transmission side and the reception side are substantially the same. Therefore, no difference appears in the detection widths. As a result, the shape to be detected becomes a substantially round shape as indicated by a broken line in FIG. 40. In other words, the aperture ratios or aspect ratios on the transmission side and the reception side can be adjusted.

In modification 17, the sensor section is used wherein transmission conductors and reception conductors both having a substantially linear shape are juxtaposed, However, in place of the transmission conductors and the reception conductors having a linear shape, conductors having a land portion having a width greater than that of the conductor portions as in the case of modification 3 described above may be used. Further, the transmission conductors and the reception conductors may be formed with an arbitrary width. Also regarding the disposition pattern of the transmission conductors and the reception conductors, they may be formed in a juxtaposed concentric relationship with each other as in the case of modification 5, and also regarding the pitch between the conductors, it may be changed to an arbitrary pitch. Further, not only a differential amplifier but also an amplifier of a single (input) end configuration may be used.

In the present example, the pointer detection apparatus is configured such that the detection width of the conductors spaced far away from the detection face of the sensor section is comparatively narrow while the detection width of the conductors positioned in proximity to the detection face of the sensor section is comparatively broad. Therefore, no difference may appear between the shapes or detection widths of the level curves of the output signals on the reception side and the transmission side, and the aperture ratio or aspect ratio can be made close to 1. In other words, the shape of a portion of a pointer at which the pointer touches the detection surface can be recognized with a higher degree of accuracy. For example, a round shape can be detected as a round shape without being deformed to an elliptic shape.

[Modification 18]

Modification 18 is an example suitable to appropriately control the gain of a received output signal (such gain is hereinafter referred to as "reception gain") based on the level or output value of the entire output signals received from the sensor section in the first embodiment.

In the first embodiment, a signal of a particular frequency component is detected from within an output signal by the synchronous detection circuit 37 shown in FIG. 10 of the signal detection circuit 34, and the level of the detected signal of the particular frequency component (such signal is hereinafter referred to as "detection signal") is used (referenced) by an automatic gain control circuit (not shown) or the control circuit 40 to determine a reception gain. Then, the reception gain is set in the amplification circuit 32. However, where a signal other than the particular frequency component, that is, noise, is input to the synchronous detection circuit 37, or where a plurality of signals having different frequencies are received, the intensity of a combined signal cannot be obtained readily and the reception gain of the amplification circuit 32 cannot be set appropriately. As a result, there is the possibility that the output signal may be saturated in the amplification circuit 32.

Therefore, modification 18 provides not only means for detecting a particular frequency component from within output signals of the reception conductors 12, but also means for obtaining a signal level of all frequency components of the output signals and, further, means for referring to the signal level of all frequency components to set a reception gain.

Figure 41:
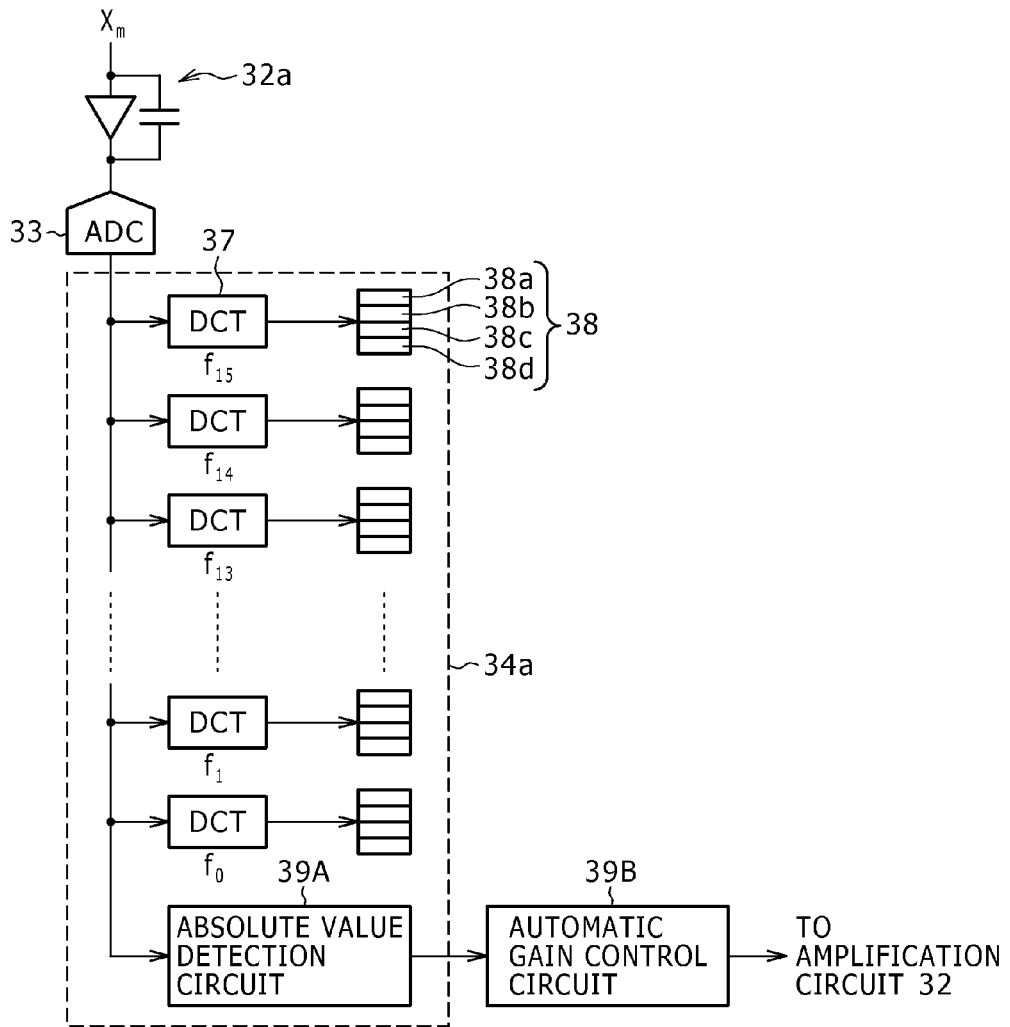
FIG. 41 is a block diagram of the reception section of the pointer detection apparatus according to modification 18 to the pointer detection apparatus of FIG. 1.
Figure 42:
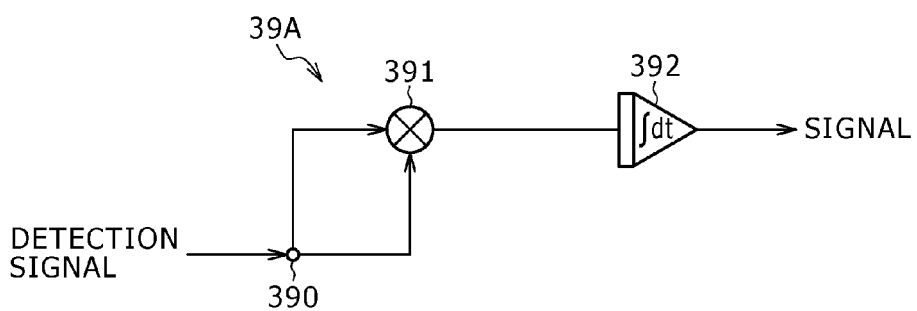
FIG. 42 is a block diagram of an absolute value detection circuit of the pointer detection apparatus according to modification 18 to the pointer detection apparatus of FIG. 1.

FIG. 41 shows a block configuration of the reception section of the pointer detection apparatus according to modification 18. FIG. 42 shows a block configuration of an absolute value detection circuit 39A. In the example of FIG. 41, an absolute value detection circuit 39A for detecting an energy component is given as an example of the means for obtaining the level of all frequency components of the output signals. In the example of FIG. 42, an automatic gain control circuit 39B for acquiring the level of all frequency components from the absolute value detection circuit is provided as an example of the means for referring to the level of the signal of all frequency components to set a reception gain.

As seen in FIGS. 41 and 42, the absolute value detection circuit 39A is provided in the signal detection section 34a in the first embodiment described above with reference to FIG. 9, and the automatic gain control circuit 39B is coupled to (or provided in) the absolute value detection circuit 39A.

As seen in FIG. 42, the absolute value detection circuit 39A includes, as principal components thereof, an input terminal 390, a multiplier 391 for carrying out arithmetic operation of squaring the level of a detection signal or output signal, and an integrator 392 for integrating the output of the multiplier 391. If a detection signal is input from a reception conductor 12 to an absolute value detection circuit 39A through the A/D conversion circuit 33, then the detection signal is branched by the input terminal 390 and supplied to the multiplier 391. Both of the two branched detection signals are input to and subjected to squaring operation by the multiplier 391. Then, the detection signal squared by the multiplier 391 is input to and temporarily integrated by the integrator 392, and output.

The absolute value detection may be carried out not by the method of integrating an energy component obtained by squaring an output signal described above, but by another method of integrating the absolute value of the level of the output signal. Any method may be used by which the level of a signal including a signal of all frequency components and noise can be detected. Further, the absolute value detection process may be carried out by any of digital signal processing means and analog circuit means.

In the present example, the pointer detection apparatus is configured such that the reception gain is set based on the level of a signal obtained by absolute value detection of output signals of the reception conductors 12, that is, of a signal of all frequency components. Thus, the level of received signals including a plurality of signals of different frequencies and noise can be detected to set the reception gain appropriately.

[Modification 19]

Modification 19 is an example suitable to compensate for a drop of the level or a delay of the phase of a periodic signal due to floating capacitance of the transmission conductors and the reception conductors, which serve as transmission lines, in the first embodiment. Modification 19 is described with reference to FIGS. 43A, 43B, 44A, and 44B.

In the first embodiment, periodic signals are supplied from one side of the transmission conductors 14. FIG. 43A illustrates a supplying form of periodic signals in a one-side supplying scheme, and FIG. 43B shows a graph representing the level of output signals when a periodic signal is applied to a transmission conductor $Y_k$. In FIG. 43B, the axis of abscissa of the graph represents the position of the reception conductors 12, and the axis of ordinate represents the level of the output signals.

As the distance from the supplying side of a periodic signal, in the example of FIG. 43A, from the right end of a transmission conductor 14, increases, that is, toward the reception conductor $X_m$ remote from the reception conductor $X_{m+8}$, which is positioned near to the supplying side of a periodic signal, the level of the output signal drops. Similarly, the phase delay increases from the reception conductor $X_{m+8}$ side toward the remote reception conductor $X_m$. A level difference and a phase difference appear between the reception conductor $X_{m+8}$ near the supplying side of a periodic signal and the reception conductor $X_m$ remote from the supplying side, which causes coordinate displacement upon position calculation. Particularly where the sensor section is formed using ITO, the resistance value of the ITO is high and the sensor section is subjected to a rather substantial influence by the transmission line.

Therefore, in modification 19, the transmission section including the multi-frequency signal supplying circuit 21 and the transmission conductor selection circuit 22 is provided at each of the opposite ends of the transmission conductors 14 so that periodic signals are supplied at the same time from the left and the right to the transmission conductors 14.

FIG. 44A illustrates a supplying form of periodic signals where the transmission sections are provided at the opposite ends of the transmission conductors 14 in modification 19, and FIG. 44B shows a graph representing the level of output signals when a periodic signal is supplied to the transmission conductor $Y_k$ in modification 19. In FIG. 44B, the axis of abscissa of the graph represents the position of the reception conductors 12 and the axis of ordinate represents the level of the output signals.

As seen in FIG. 44B, as the distance from the reception conductors $X_m$ and $X_{m+8}$ which are positioned near the supplying sections of a periodic signal increases, the level of the output signal drops. Here, since the distance from the reception conductors $X_m$ and $X_{m+8}$ on the opposite ends of the reception conductors 12 to the remote reception conductor $X_{m+4}$ is one half the distance between the reception conductor $X_m$ and the reception conductor $X_{m+8}$ which are farthest apart in the example of FIG. 44A, the level drop of the output signal decreases to one half. Simultaneously, the phase delay decreases to one half.

In the present example, the periodic signal supplying sections are provided on the opposite sides of the transmission conductors. As an alternative, output signals of the transmission conductor selection circuit 22 shown in FIG. 1 may be branched so as to be supplied to the opposite ends of the transmission conductors 14. As described above, a periodic signal need not be provided to a single transmission conductor 14 at a time, but may be provided to a plurality of transmission conductors.

Since a periodic signal is supplied at the same time from the transmission sections provided at the opposite ends of a transmission conductor 14, the level drop and the phase delay of the periodic signal can be moderated in comparison with those including a conventional one-side supplying system. Hence, the level difference and the phase difference among the reception conductors 12 decrease considerably, thereby suppressing the drop in detection sensitivity.

[Modification 20]

Modification 20 is suitable to detect a pressure when a pointer touches the detection surface of the sensor section in the first embodiment. A pressure exerted by a pointer is hereinafter referred to as finger pressure (though, of course, a pointer is not limited to a human finger in accordance with the present invention).

Heretofore, the finger pressure was calculated based on the assumption that it has a proportional relationship to the area on the detection surface of the sensor section that is touched by the finger (hereinafter "touched area"). Therefore, if a person having a small finger and another person having a large finger depress the detection surface with equal force, then the touched area of the person having a small finger is smaller than that of the person having a large finger. In addition, even if the person having a small finger depresses the detection surface with large force, the conventional finger pressure system may recognize it as a light touch. Therefore, in modification 20, the pointer detection apparatus is configured such that the finger pressure exerted by a pointer such as a finger touching the detection surface is detected based on a spatial distribution or level curved face of the level of the detected output signals.

Figure 45A:
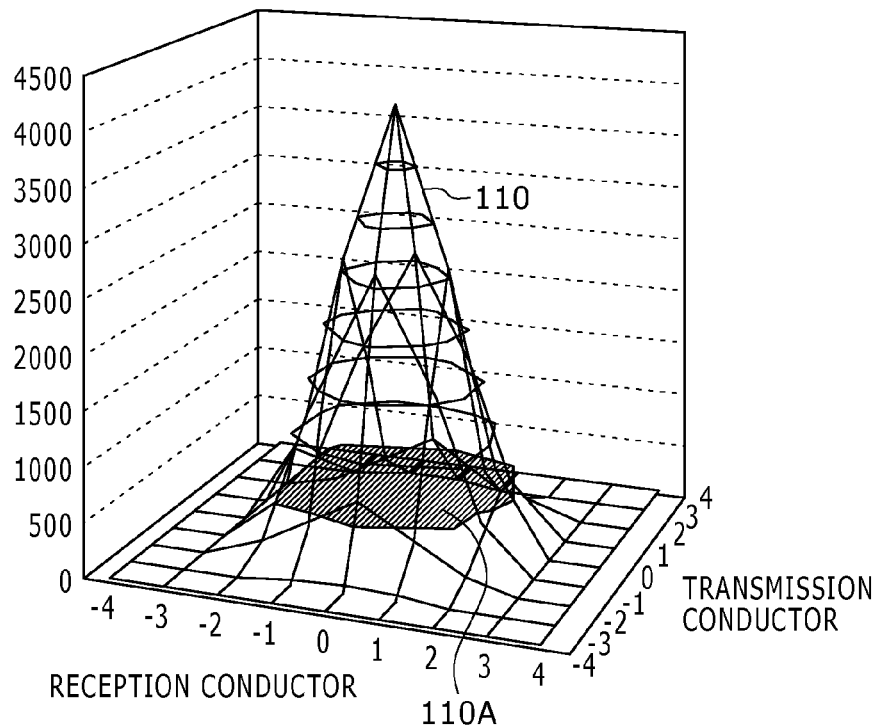
FIG. 45A is a schematic view illustrating an example or a spatial distribution or level curved face of output signals and FIG. 45B is a view illustrating division of the level curved face into a plurality of planes according to modification 19.

FIG. 45A illustrates an example of a spatial distribution or level curved face of the level of detected output signals when a pointer touches the detection surface of the sensor section.

The level curved face 110 of the output signals is determined from the variation of current at cross points of the sensor section. The level curved face 110 is calculated, for example, by the position calculation circuit 35 shown in FIG. 1 which analyzes the output of the signal detection circuit 34. Here, the coordinate of a transmission conductor 14 which is positioned substantially at the center of the touched area at which a high level value is obtained is represented by "0," and the coordinates of the transmission conductors 14 disposed from the left to right sides of the centrally positioned transmission conductor 14 ("0") are represented by " . . . , −3, −2, −1, 1, 2, 3, . . . . " The reception conductors 12 are similarly arranged. The level values of the level curved face 110 are in a normalized form. As seen in FIG. 45A, the level curved face 110 exhibits a mountain-like shape having an apex or summit substantially at the center of the touched area, and a finger pressure is estimated using the volume of a portion of (or under) the level curved face 110 cut across (horizontally in FIG. 45A) at a predetermined level value.

Figure 45B:
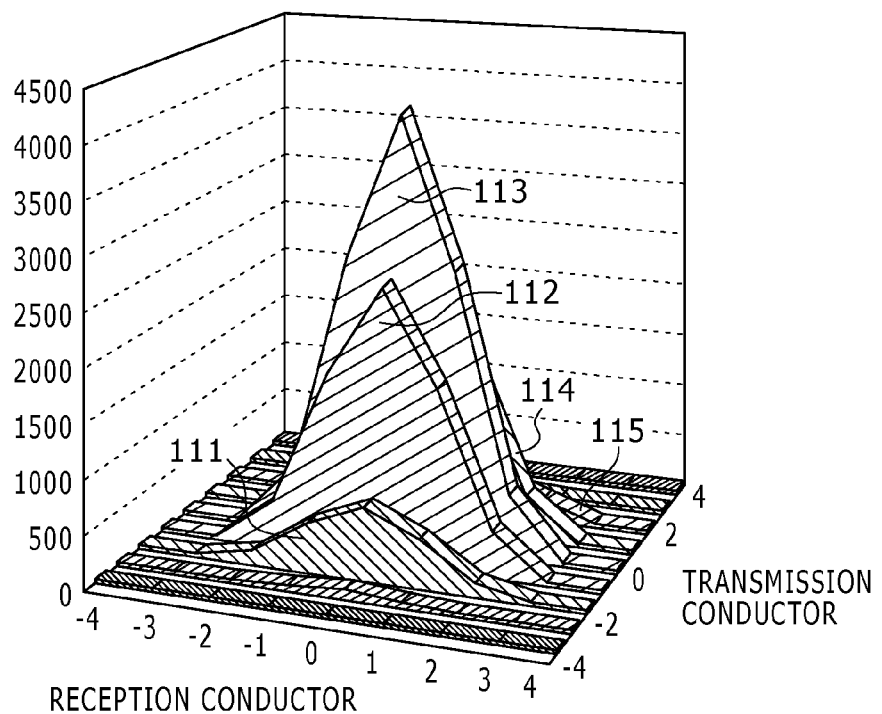

FIG. 45B shows one simple method of determining the volume of an upper space when the level curved face 110 is cut across at a predetermined level, which entails dividing the level curved face 110 into a plurality of (vertical) planes and determining the volume by summing the area values of the planes, that is, two-dimensional level values of the planes.

Referring to FIG. 45B, an example of division of the level curved face 110 into a plurality of planes is shown. In the example of FIG. 45B, the level curved face 110 is divided into a plurality of planes 111 to 115 along those transmission conductors whose coordinates range from "−2" to "2," respectively. First, the area of each of the planes 111 to 115 is determined, and the areas of the planes 111 to 115 are summed to obtain a volume of the level curve 101. At this time, the area is determined preferably with regard to those of the planes 111 to 115 whose apex levels are higher than the predetermined level value.

While, in the example described above, the sum of the areas of the planes into which the level curved face is divided is used as the volume of the level curved face, alternatively the level values may be weight-added in a numerical analysis. Further, the calculation method of the volume is not limited to summing up the values associated with divisional planes. The volume may be calculated, for example, by applying multi-dimensional curved face approximation, such as trapezoidal shape approximation and square approximation.

Figure 46:
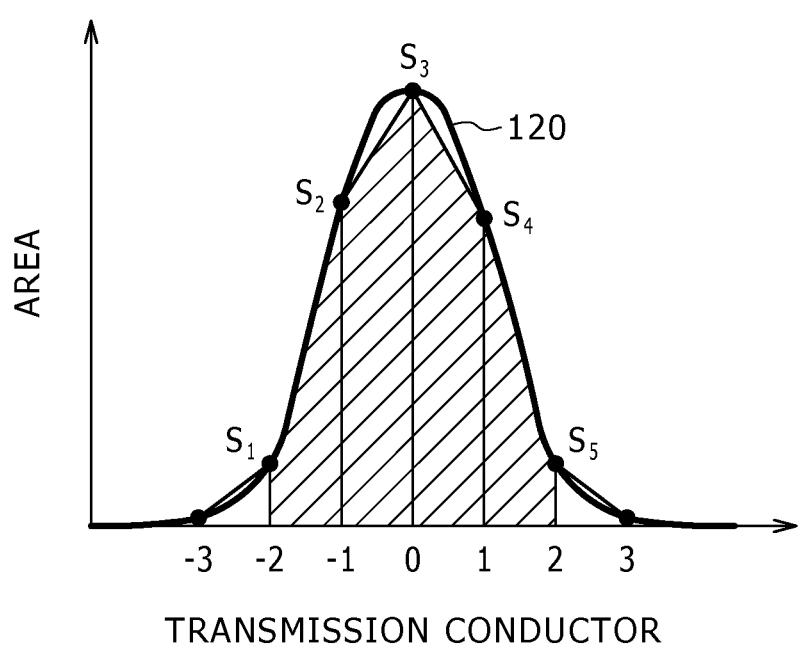
FIG. 46 is a graph illustrating an example of a method of calculating the volume of a level curved face according to modification 20 to the pointer detection apparatus of FIG. 1.

One method of determining the volume of an upper space of the level curved face 110 when it is cut out at a predetermined level value is described with reference to FIG. 46. FIG. 46 illustrates a relationship between the position of transmission conductors and the area of divisional planes (as shown in FIG. 45B). The axis of abscissa indicates the position of transmission conductors, and the axis of ordinate indicates the area of planes.

Referring to FIG. 46, data points $S_1$ to $S_5$ on a curve 120 represent the values of areas determined with regard to the planes 111 to 115 of FIG. 45B, respectively. Further, in FIG. 46, the coordinates "−2" to "2" of the transmission conductors and respectively connected by line segments with the corresponding data points $S_1$ to $S_5$ on the curve 120. Further, each adjacent ones of the data points $S_1$ to $S_5$ are interconnected by a line segment. Consequently, four trapezoids are formed between the positions "−2" to "2" of the transmission conductors.

The volume of the level curved face 110 to be determined corresponds to the area of a portion surrounded by the axis of abscissa of FIG. 46, that is, the straight line between the positions "−2" and the "2" of the transmission conductors, and the curve 120. To calculate this area, however, the method described above (the level curved face is divided into a plurality of planes and the volume is determined from the sum value of the areas of the planes, that is, the two-dimensional level values of the planes) may be less than satisfactory and contain a rather substantial error because the volume is determined simply by adding the discrete values of the data points $S_1$ to $S_5$.

Therefore, in the example of FIG. 46, trapezoid approximation is used to determine the sum value of the areas of the four trapezoids, that is, the area of a portion indicated by slanting lines in FIG. 46, to approximate the volume of the level curved face 110.

First, a weight value is applied to each data point in accordance with trapezoid approximation. For example, weight 1 is applies to the data point $S_1$, 2 to the data point $S_2$, 2 to the data point $S_3$, 2 to the data point $S_4$ and 1 to the data point $S_5$. The volume $V_1$ is determined by dividing the "sum value of the weighted areas at the transmission conductors, that is, at the data points" by an "average value of the weight values included in the trapezoids." In particular, the volume $V_1$ is given by:

$$\text{Volume } V_1 = (1*S + 2*S_2 + 2*S_3 + 2*S_4 + 1*S_5)/2$$

Here, the average value of the weight values is determined by dividing the "sum total of the weight values at the data points" by the "number of the trapezoids." In the example above, $(1+2+2+2+1)/4=2$.

It is also possible to use square approximation for the calculation. In this instance, weight values applied to the data points are squared to calculate the volume $V_2$ similarly as described above. In particular, the volume $V_2$ is given by:

$$\text{Volume } V_2 = (1*S_1 + 4*S_2 + 4*S_3 + 4*S_4 + 1*S_5)/3.5$$

Here, the average value of the weight values is obtained by dividing the "sum of square values of the weight values at the data points" by the "number of trapezoids." In the present example, $(1+4+4+4+1)/4=3.5$ Since the error (discrepancy) between the hypotenuses of the four trapezoids and the curve 120 is small as seen in FIG. 46, the error between a calculation result obtained using the trapezoid approximation, that is, the area of the portion indicated by slanting lines, and the actual volume of the level curved face 110, becomes small. As a result, the calculation result obtained using the trapezoid approximation indicates an accurate volume in comparison with a calculation result obtained by summing the divisional areas of the planes into which the level curved face is divided. Further, where the approximation calculation is used to determine the volume, the calculation is simpler than that obtained by summing the areas of the divisional planes of the level curved face. Therefore, the load applied to the position calculation circuit 35 can be reduced.

The pressure per unit area may be calculated by dividing the volume of the level curved face by the touched area. In this instance, the volume determined as described above can be divided by a touch area 110A illustrated in FIG. 45 to determine the pressure per unit area.

In the present example, the finger pressure when a pointer (e.g., a finger) touches the detection surface of the sensor section is detected based on the volume determined using the areas of a plurality of planes into which the level curved face is divided, that is, using two-dimensional level values. Use of the determined volume value as the finger pressure allows for accurate finger pressure detection, which is reflective of an actual touching force exerted by a user.

Various modifications to the first embodiment described hereinabove can be applied also to the second to fourth embodiments to be described below unless a specific restriction is involved.

2. Second Embodiment

Configuration of the Pointer Detection Apparatus

Figure 47:
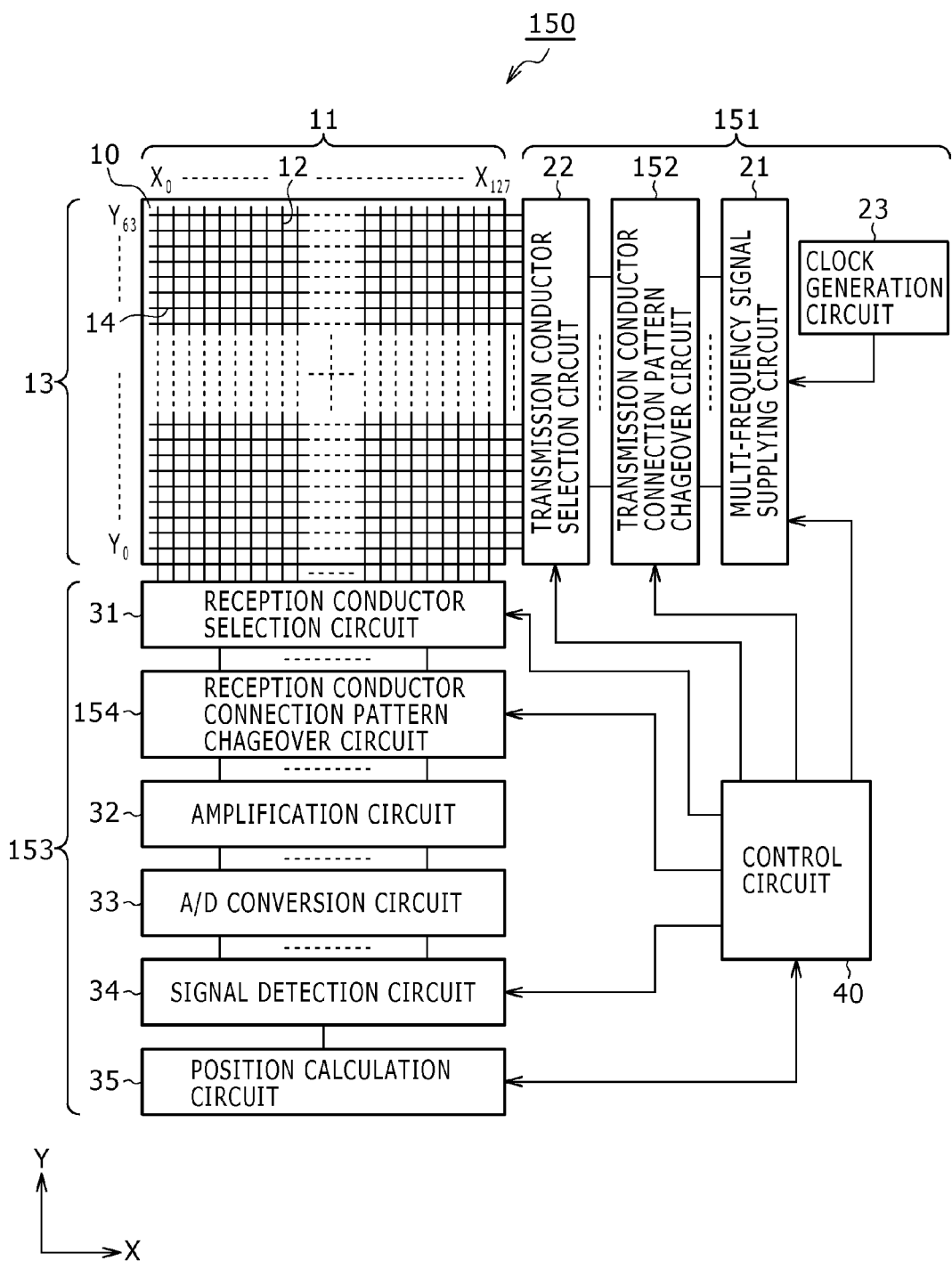
FIG. 47 is a schematic block diagram of a pointer detection apparatus according to a second embodiment of the present invention.

As described hereinabove in connection with the first embodiment and modifications 6 to 12 and 15 to 17 to the first embodiment, in the pointer detection apparatus of the present invention, periodic signals of different frequencies from each other can be supplied to a plurality of transmission conductors 14, and output signals from a plurality of reception conductors 12 can be input collectively to one amplifier. Further, a single pointer detection apparatus may selectively incorporate and switch between one or more configurations described above in connection with modifications 6 to 12 and 15 to 17, depending on each application, a required sensitivity, or the like. In particular, a single pointer detection apparatus may be configured to selectively vary the supplying form of periodic signals to the transmission conductor group 13 and the detection form of output signals from the reception conductor group 11 depending on each application, a required sensitivity, or the like. FIG. 47 shows an example of such a pointer detection apparatus. In FIG. 47, elements like those in the first embodiment described above with reference to FIG. 1 are denoted by like reference characters and overlapping description of them is omitted herein to avoid redundancy.

Referring to FIG. 47, the pointer detection apparatus 150 of the second embodiment includes a sensor section 10, a transmission section 151, a reception section 153, and a control circuit 40 for controlling operation of the transmission section 151 and the reception section 153. The sensor section 10 and the control circuit 40 respectively have a similar configuration to that in the first embodiment.

The transmission section 151 includes a multi-frequency signal supplying circuit 21, a transmission conductor connection pattern changeover circuit 152, a transmission conductor selection circuit 22 and a clock generation circuit 23. The multi-frequency signal supplying circuit 21, transmission conductor selection circuit 22 and clock generation circuit 23 respectively have a configuration similar to that in the first embodiment.

The transmission conductor connection pattern changeover circuit 152 is a circuit which, for example, selectively changes over (or switches) a supplying form of periodic signals to be supplied to the transmission conductors 14. In particular, the transmission conductor connection pattern changeover circuit 152 suitably selects the number and the position of transmission conductors 14 to which periodic signals are to be supplied, the frequencies of periodic signals to be supplied, and so forth, in accordance with each application or the like. For example, the transmission conductor connection pattern changeover circuit 152 selects one of the supplying forms of periodic signals and so forth described above in connection with modifications 6 to 12 and 15 to 17. The selection and changeover operation of a supplying form by the transmission conductor connection pattern changeover circuit 152 is controlled by the control circuit 40. A configuration of the transmission conductor connection pattern changeover circuit 152 is hereinafter described.

The transmission conductor selection circuit 22 includes a plurality of switches. The transmission conductor selection circuit 22 selects an output terminal of the transmission conductor connection pattern changeover circuit 152 and a corresponding one of the transmission conductors 14 in response to the supplying form of periodic signals selected by the transmission conductor connection pattern changeover circuit 152. The transmission conductor selection circuit 22 connects the selected output terminal of the transmission conductor connection pattern changeover circuit 152 and the selected transmission conductor 14 to each other. The selection and changeover operation of the transmission conductors 14 by the transmission conductor selection circuit 22 is controlled by the control circuit 40.

Referring to FIG. 47, the reception section 153 includes a reception conductor selection circuit 31, a reception conductor connection pattern changeover circuit 154, an amplification circuit 32, an A/D conversion circuit 33, a signal detection circuit 34 and a position calculation circuit 35. The reception conductor selection circuit 31, amplification circuit 32, A/D conversion circuit 33, signal detection circuit 34 and position calculation circuit 35 respectively have a configuration similar to that in the first embodiment.

The reception conductor connection pattern changeover circuit 154 is a circuit which, for example, selectively changes over (or switches) a detection form of output signals from the reception conductor group 11 in response to a supplying form of periodic signals to the transmission conductors 14. In particular, the reception conductor connection pattern changeover circuit 154 suitably selects the number and the positional relationship of reception conductors 12 to be connected to one amplifier, a process such as addition or subtraction to be carried out by the amplifier, and so forth, in response to the supplying form of periodic signals, each application, and so forth. For example, the reception conductor connection pattern changeover circuit 154 selects one of the detection forms of an output signal described above in connection with modifications 6 to 12 and 15 to 17. The selection and changeover operation of a supplying form by the reception conductor connection pattern changeover circuit 154 is controlled by the control circuit 40.

The reception conductor selection circuit 31 is a circuit section that includes a plurality of switches and selectively connects input terminals of the reception conductor connection pattern changeover circuit 154 to corresponding ones of the reception conductors 12, in response to the detection form of output signals selected by the reception conductor connection pattern changeover circuit 154. The selection and changeover operation of the reception conductors 12 by the reception conductor selection circuit 31 is controlled by the control circuit 40.

[Changeover (Switching) of the Transmission Conductors]

Where a configuration described above is adopted, one pointer detection apparatus can suitably set a supplying form of periodic signals to the transmission conductor group 13 and a detection form of output signals from the reception conductor group 11 depending on each application, a required sensitivity, and so forth.

While in the first embodiment described above, one transmission conductor 14 is selected for every predetermined period of time from within each transmission block 25 (refer to FIGS. 1 and 5) of the transmission conductor group 13, in the present second embodiment, periodic signals of different frequencies are supplied at the same time to all transmission conductors 14 which form a transmission block, to carry out position detection. Then, after every predetermined period of time, a new transmission block is selected, to which periodic signals having different frequencies are supplied at the same time to carry out position detection.

In the following, an example of switching of transmission conductors by the present embodiment is described with reference to FIGS. 48, 49A and 49B. In the present example, one transmission block 161 includes 16 transmission conductors 14 positioned adjacent to each other. Since one transmission block 161 includes 16 adjacent transmission conductors 14, the number of frequencies $f_k$ of periodic signals to be supplied to each of the transmission blocks 161 is "16." Accordingly, the number of periodic signal production sections in the multi-frequency signal supplying circuit 21 (refer to FIG. 47) which supply the periodic signals is 16. Since the switching operation illustrated in FIG. 49B is different from that illustrated in FIG. 49A only in that the direction of rotation of the switching operation of the transmission blocks 161 is reversed, description is given only of the example of FIG. 49A.

Figure 48:
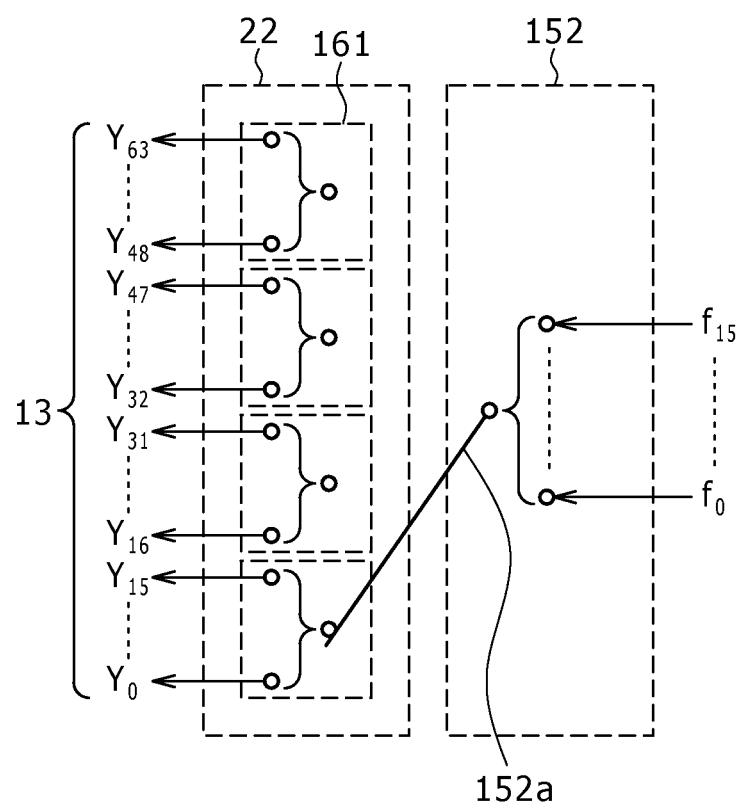
FIG. 48 is a schematic view of a transmission conductor selection circuit and a transmission conductor connection pattern changeover circuit of the pointer detection apparatus of FIG. 47.

As seen in FIG. 48, the transmission conductor connection pattern changeover circuit 152 includes 16 switches 152a. The transmission conductor connection pattern changeover circuit 152 is provided between the multi-frequency signal supplying circuit 21 and the transmission conductor selection circuit 22 and receives periodic signals supplied thereto from the multi-frequency signal supplying circuit 21.

The switches 152a are provided in order to supply periodic signals received from the multi-frequency signal supplying circuit 21 to the transmission conductors 14, which form a transmission block 161. The switches 152a are individually connected to frequency production sections 24 of the multi-frequency signal supplying circuit 21 (refer to FIG. 47). The transmission conductor connection pattern changeover circuit 152 carries out switching operation under the control of the control circuit 40.

Figure 49A:
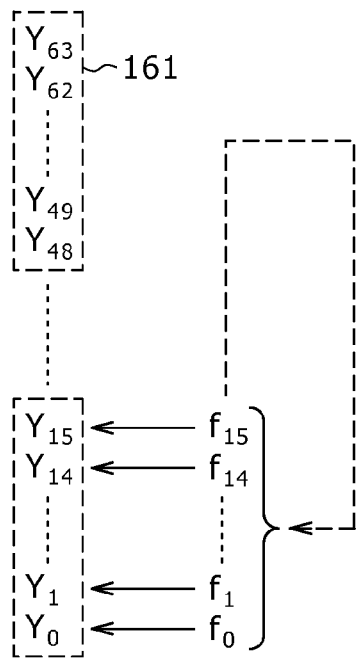
FIGS. 49A and 49B are diagrammatic views illustrating switching operation of transmission conductors of the pointer detection apparatus of FIG. 47.
Figure 49B:
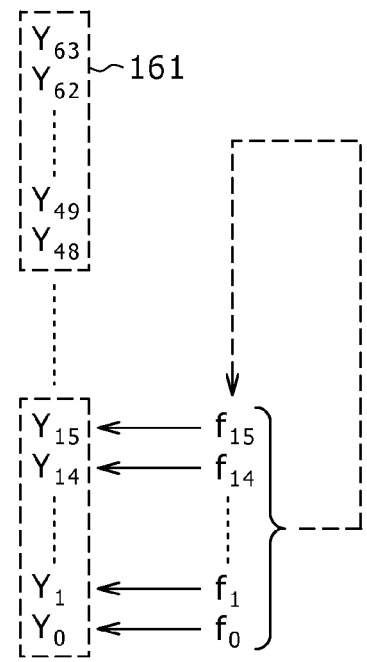

FIGS. 49A and 49B illustrate an example of switching operation of the transmission conductors.

First, a state where periodic signals of frequencies $f_0$ to $f_{15}$ are supplied at the same time to transmission conductors $Y_0$ to $Y_{15}$ of the transmission block ($Y_0$ to $Y_{15}$) is described in reference to FIG. 49A.

The periodic signals of the frequencies $f_0$ to $f_{15}$, output from the frequency production sections 24 (refer to FIGS. 3 and 47) of the multi-frequency signal supplying circuit 21, are supplied to the transmission conductors $Y_0$ to $Y_{15}$ of the transmission block $\{Y_0$ to $Y_{15}\}$ through the switches 152a, which form the transmission conductor connection pattern changeover circuit 152. While the periodic signals of the frequencies $f_0$ to $f_{15}$ are supplied to the reception section 153, the reception section 153 carries out position detection. After the position detection is carried out by the reception section 153, the transmission conductor connection pattern changeover circuit 152 switches to the next transmission block, $\{Y_{16}$ to $Y_{31}\}$ for example, to which the periodic signals are to be supplied, under the control of the control circuit 40. Thus, the periodic signals of the frequencies $f_0$ to $f_{15}$ are supplied to the transmission conductors $Y_{16}$ to $Y_{31}$, respectively, at the same time. Then, after every predetermined interval of time, the transmission conductor connection pattern changeover circuit 152 switches to the subsequent transmission block 161, to which the periodic signals are to be supplied, i.e., to the transmission block $\{Y_{32}$ to $Y_{47}\}$, and so forth, and position detection is repeated for each new transmission block. Then, if the supply of the periodic signals to the last transmission block $\{Y_{48}$ to $Y_{63}\}$ and the position detection therewith are completed, the transmission conductor connection pattern changeover circuit 152 switches to the first transmission block, $\{Y_0$ to $Y_{15}\}$, to which the periodic signals are to be again supplied, under the control of the control circuit 40, and the switching operation described above is repeated. In the present example, the transmission block, to which the periodic signals are to be supplied, returns to the original (first) transmission block in the fourth switching operation.

Where the switching operation of the transmission conductors 14, the transmission conductor selection circuit 22, and the transmission conductor connection pattern changeover circuit 152 are configured as described above, the following effect can be achieved. For example, if one transmission conductor 14 is selected after a predetermined time interval ΔT from each transmission block of the transmission conductor group 13 as in the first embodiment, the difference in detection time between those transmission conductors 14 which are positioned on each boundary between the transmission blocks 161 becomes great (e.g., the detection time differs greatly between $Y_{15}$ and $Y_{16}$). This will be described with a specific example below.

In this example, it is assumed that a pointer is positioned between the transmission conductors $Y_{15}$ and $Y_{16}$ in the first embodiment, and that the periodic signals supplied from the multi-frequency signal supplying circuit 21 are supplied to the transmission conductors $Y_0$ through $Y_{63}$ in their corresponding transmission blocks $\{Y_0$ to $Y_{15}\}$, $\{Y_{16}$ to $Y_{31}\}$, $\{Y_{32}$ to $Y_{47}\}$, $\{Y_{48}$ to $Y_{63}\}$, respectively (refer to FIG. 48). The pointer is detected by the reception section 30, and the transmission conductor selection circuit 22 switches to the transmission conductors 14 successively in a direction in which the index increases after every predetermined time interval ΔT under the control of the control circuit 40 to detect the position of the pointer. In this instance, the time difference after the periodic signals supplied from the multi-frequency signal supplying circuit 21 are supplied to the transmission conductors $Y_{15}$ and $Y_{16}$ until the periodic signals are supplied to the transmission conductors $Y_{15}$ and $Y_{16}$ subsequently, is 16ΔT. In this instance, if the pointer is moving in proximity to the boundary between transmission blocks 161 (e.g., between the transmission conductors $Y_{15}$ and $Y_{16}$), the detection accuracy of the pointer is decreased.

In contrast, in the present second embodiment, since the transmission conductors 14 are switched per a unit of transmission block 161, the difference in detection time between the transmission conductors 14 positioned on the boundary between transmission blocks 161 is short (ΔT). As a result, even if the pointer is moving in proximity to the boundary between transmission blocks 161, the pointer can be detected with a higher degree of accuracy.

[Changeover (Switching) of the Reception Conductors]

In the first embodiment described above, one reception conductor 12 is selected from within each of the detection blocks 36 of the reception conductor group 11 after every predetermined period of time. In the present second embodiment, position detection is carried out at the same time for each detection block, and after a predetermined interval of time, position detection is carried out with regard to another detection block.

An example of the switching of reception conductors in the second embodiment is described with reference to FIGS. 50 and 51. It is assumed that one detection block 163 is formed from 16 reception conductors 12 that are positioned adjacent to each other. Since one detection block 163 is formed from 16 reception conductors 12 positioned adjacent to each other, the number of IN conversion circuits 32a (i.e., amplifiers) in the amplification circuit 32 is equal to the number of the reception conductors 12 which form the detection block 163. In other words, the number of the IN conversion circuits 32a in the amplification circuit 32 is 16.

Figure 50:
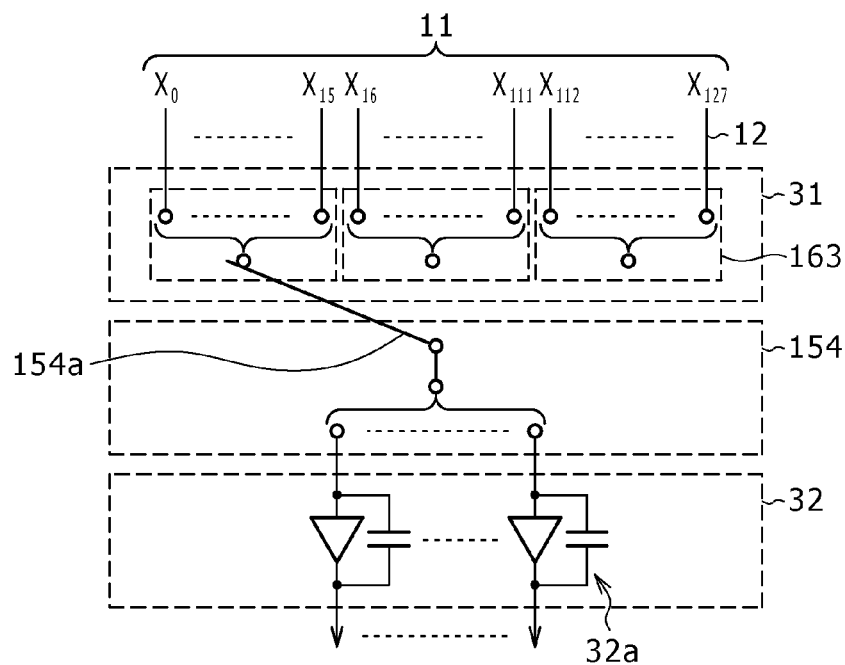
FIG. 50 is a diagrammatic view of a reception conductor selection circuit and a reception conductor connection pattern changeover circuit of the pointer detection apparatus of FIG. 47.

FIG. 50 shows an example of a configuration of a reception conductor connection pattern changeover circuit 154 which carries out the switching operation in the present example. The reception conductor connection pattern changeover circuit 154 includes 16 switches 154a. The reception conductor connection pattern changeover circuit 154 is provided between the reception conductor selection circuit 31 and the amplification circuit 32, and receives reception signals supplied thereto from the reception conductor selection circuit 31.

The switches 154a supply reception signals supplied thereto from the reception conductor selection circuit 31 at the same time to the IN conversion circuits 32a, which form the amplification circuit 32. The switches 154a are respectively connected to the I/V conversion circuits 32a of the amplification circuit 32. The reception conductor connection pattern changeover circuit 154 carries out the switching operation under the control of the control circuit 40 shown in FIG. 47.

Figure 51:
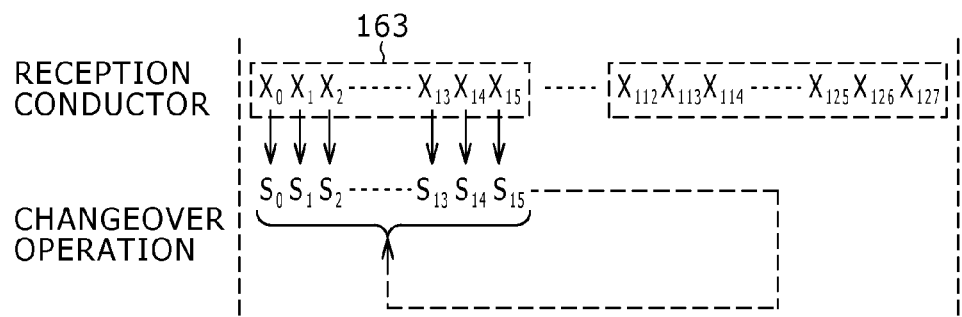
FIG. 51 is a diagrammatic view illustrating switching operation of reception conductors by the pointer detection apparatus of FIG. 47.

An example of the switching operation of the reception conductors is illustrated in FIG. 51. Referring to FIG. 51, the reception conductor connection pattern changeover circuit 154 switches (i.e., changes over) the switches 154a under the control of the control circuit 40 to connect all reception conductors 12 in the detection block $\{X_0$ to $X_{15}\}$ to the I/V conversion circuits 32a forming the amplification circuit 32, as shown in FIG. 9. Then, the reception section 153 carries out position detection of a pointer at the same time with regard to all of the connected reception conductors 12 within the detection block.

After the reception section 153 completes the position detection, the reception conductor connection pattern changeover circuit 154 switches the switches 154a to be connected from the previous detection block $\{X_0$ to $X_{15}\}$ to the next detection block $\{X_{16}$ to $X_{31}\}$, to thereby connect all of the reception conductors 12 in the next detection block 163 to the I/V conversion circuits 32a under the control of the control circuit 40. Then, the reception section 153 carries out position detection of a pointer at the same time with regard to all of the connected reception conductors 12 within the next detection block. Thereafter, the switching operation described is carried out repetitively. When the position detection with regard to the last detection block $\{X_{112}$ to $X_{127}\}$ ends, the reception conductor connection pattern changeover circuit 154 switches the switches 154a, under the control of the control circuit 40, to again connect the first detection block $\{X_0$ to $X_{15}\}$ to the IN conversion circuits 32a, and repeats the switching operation described above. In this example, the reception conductor connection pattern changeover circuit 154 returns to the same (e.g., the first) detection block in the eighth switching operation.

Where the switching operation of the reception conductors 12, the reception conductor selection circuit 31, and the reception conductor connection pattern changeover circuit 154 are configured as described above, the following effect can be achieved. In particular, if one reception conductor 12 is selected after every predetermined time interval Δt from within each detection block of the reception conductor group 11 as in the first embodiment, the difference in detection time between those reception conductors 12, which are positioned on each boundary between the detection blocks, becomes great (e.g., the detection time differs greatly between $X_{15}$ and $X_{16}$). More particularly, if the reception conductors $X_0$, $X_{16}$, . . . , $X_{112}$ are detected in the detection blocks $\{X_0$ to $X_{15}\}$, $\{X_{16}$ to $X_{31}\}$, . . . , $\{X_{112}$ to $X_{127}\}$, respectively, and the reception conductors 12 are switched successively in the direction in which the index increases after every predetermined time interval Δt, the detection time difference between the reception conductors $X_{15}$ (the $16^{th}$ in the first detection block) and $X_{16}$ (the 1$^{st}$ in the second detection block) is as great as 15 Δt. In this instance, if a pointer is moving in proximity to the boundary between detection blocks such as between the reception conductors $X_{15}$ and $X_{16}$, the detection accuracy of the pointer is decreased due to the large detection time difference between the two reception conductors.

In contrast, in the present embodiment, since the reception conductors 12 are switched per a unit of detection block 163, the difference in detection time between reception conductors 12, which are positioned on the boundary between the detection blocks 163, becomes as short as Δt. As a result, even if a pointer is moving in proximity to the boundary between detection blocks, the pointer can be detected with a high degree of accuracy.

[Modification 1]

In modification 1 of the second embodiment, another example of rotation of the switching operation of the transmission conductors 14 is applied. The pointer detection apparatus in modification 1 has the same configuration as that of the second embodiment, and therefore, the description of the same is omitted herein to avoid redundancy.

Figure 53A:
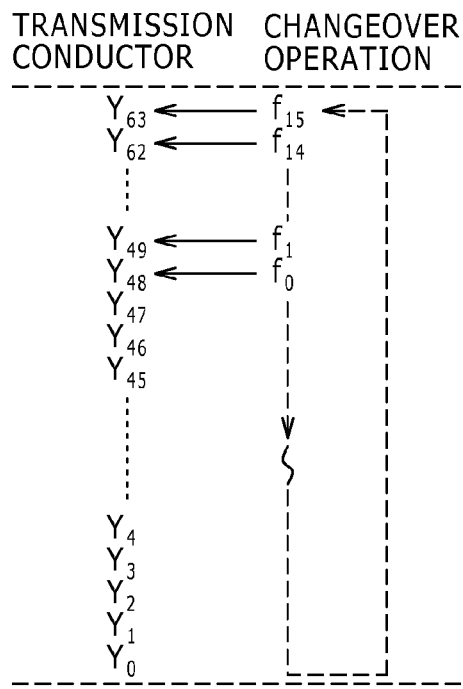
FIGS. 53A and 53B are diagrammatic views illustrating another example of switching operation of transmission conductors by the pointer detection apparatus according to the second embodiment of the present invention.
Figure 53B:
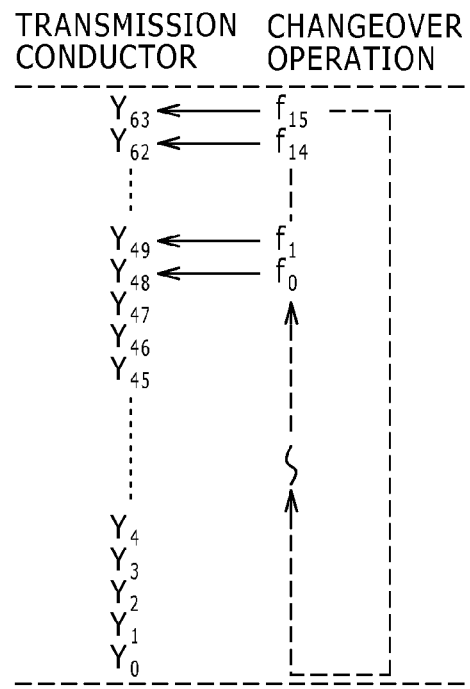

Modification 1 is different from the second embodiment in that, while the rotation in the second embodiment, the changeover (switching) of the 16 switches 152a which form the transmission conductor connection pattern changeover circuit 152 is carried out per a unit of transmission block 161, in the rotation in modification 1, the switching is carried out by successively shifting the 16 switches 152a one by one in a direction in which the index of the transmission conductor 14 decreases (or increases). Examples of the rotation of the switching operation of the transmission conductors in modification 1 are illustrated in FIGS. 53A and 53B. The switching operation in FIG. 53B is different from that in FIG. 53A only in that the direction of rotation of the switching operation is reverse to that in the example of FIG. 53A. Therefore, description is given only of the example of FIG. 53A.

First, the periodic signals of the frequencies $f_0$ to $f_{15}$ supplied from the multi-frequency signal supplying circuit 21 are supplied at the same time to the and $Y_{63}$ which are positioned adjacent to each other, that is, which have consecutive indexes n. While the periodic signals of the frequencies $f_0$ to $f_{15}$ remain supplied, the reception section 30 carries out position detection.

After a predetermined interval of time, the control circuit 40 controls the transmission conductor connection pattern changeover circuit 152 to switch the transmission conductors, to which the frequencies $f_0$ to $f_{15}$ are to be supplied via the switches 152a, by one transmission conductor in a direction in which the index n decreases. (Switches 152a form the transmission conductor connection pattern changeover circuit 152.) In particular, the periodic signals of the frequencies $f_0$ to $f_{15}$ are now supplied at the same time to the transmission conductors $Y_{47}$ to $Y_{62}$, respectively. While the periodic signals of the frequencies $f_0$ to $f_{15}$ remain supplied, the reception section 153 carries out position detection. Such switching operation is repeated until the periodic signals of the frequencies $f_0$ to $f_{15}$ are supplied to the transmission conductors $Y_0$ to $Y_{15}$, respectively, and the reception section 153 carries out position detection. Thereafter, the control circuit 40 controls the transmission conductor connection pattern changeover circuit 152 to switch the transmission conductors connected to the switches 152a, from the transmission conductors $Y_0$ and $Y_1$ to $Y_{15}$ to the transmission conductors $Y_{63}$ and $Y_0$ to $Y_{14}$, respectively. Then, the reception section 153 carries out position detection operation similar to that described above.

With such rotation of the switching operation of the transmission conductors 14 as in the present example, the following effect can be achieved. In particular, periodic signals are supplied to 16 transmission conductors positioned adjacent to each other, and a group formed of 16 transmission conductors positioned adjacent to each other is shifted by one transmission conductor such that position detection is carried out in a concentrated manner at a particular portion. Therefore, the detection accuracy can be improved.

3. Third Embodiment

In a third embodiment, another example of rotation of switching operation of transmission conductors 14 is used. The pointer detection apparatus of the third embodiment has the same configuration as that of the first embodiment, and therefore, overlapping description of the configuration is omitted herein to avoid redundancy.

Figure 52A:
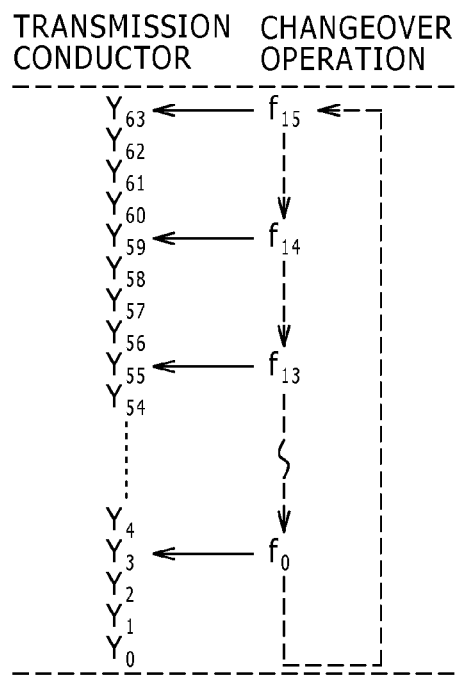
FIGS. 52A and 52B are diagrammatic views illustrating an example of switching operation of transmission conductors by a pointer detection apparatus according to a third embodiment of the present invention.
Figure 52B:
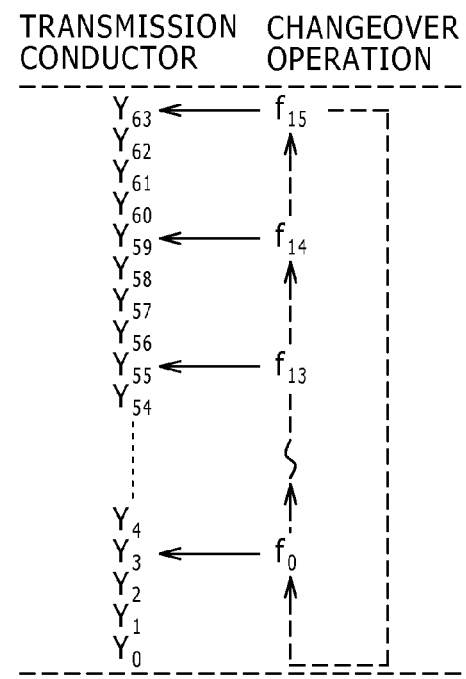

The third embodiment is different from the first embodiment in that, while the rotation in the first embodiment is carried out such that each of the frequencies $f_0$ to $f_{15}$ supplied from the multi-frequency signal supplying circuit 21 is supplied to a fixed one of the transmission blocks 25, as seen in FIG. 5, the rotation in the third embodiment is carried out such that periodic signals to be supplied to transmission blocks may vary (i.e., each of the frequencies may be supplied to different transmission blocks). FIGS. 52A and 52B illustrate examples of the rotation of the switching operation of transmission conductors according to the third embodiment. The switching operation in FIG. 52B is different from that in FIG. 52A only in that the direction of rotation of the switching operation is reverse to that in the example of FIG. 52A. Therefore, description is given only of the example of FIG. 52A.

First, periodic signals of the frequencies $f_0$ to $f_{15}$ supplied from the multi-frequency signal supplying circuit 21, are supplied at the same time to those transmission conductors 14 which respectively have the highest index within their corresponding transmission blocks 25 (each including four transmission conductors 14), that is, to the transmission conductors $Y_3$, $Y_2$, . . . , $Y_{59}$, $Y_{63}$, respectively. Then, while the periodic signals of the frequencies $f_0$ to $f_{15}$ are supplied, the reception section 30 carries out position detection.

After a predetermined interval of time, the transmission conductors to which the frequencies $f_0$ to $f_{15}$ are to be supplied are switched (or shifted) by one transmission conductor in a direction in which the index n decreases. In particular, the transmission conductors to which the frequencies $f_0$ to $f_{15}$ are to be supplied are switched from the transmission conductors $Y_3$, $Y_7$, . . . , $Y_{55}$, $Y_{59}$ and $Y_{63}$ selected in the preceding cycle to the transmission conductors $Y_2$, $Y_6$, . . . , $Y_{54}$, $Y_{58}$ and $Y_{62}$. Then, the periodic signals of the frequencies $f_0$ to $f_{15}$ are supplied at the same time to the transmission conductors $Y_2$, $Y_6$, . . . , $Y_{54}$, $Y_{58}$ and $Y_{62}$. While the periodic signals of the frequencies $f_0$ to $f_{15}$ are supplied, the reception section 30 carries out position detection. Such switching operation is repeated until the periodic signals of the frequencies $f_0$ to $f_{15}$ are supplied to the transmission conductors $Y_0$, $Y_4$, . . . , $Y_{54}$, $Y_{58}$ and $Y_{60}$ and the reception section 30 carries out position detection. Thereafter, the control circuit 40 controls the multi-frequency signal supplying circuit 21 to change the frequencies of the periodic signals to be supplied from the frequency production sections 24 of the multi-frequency signal supplying circuit 21 to the transmission blocks 25. In particular, the periodic signals of the frequencies $f_0$, $f_1$, . . . , $f_{13}$, $f_{14}$ and $f_{15}$ supplied from the transmission blocks 25 are next supplied to the transmission conductors $Y_{63}$, $Y_3$, . . . , $Y_{51}$, $Y_{55}$ and $Y_{59}$, respectively. Then, position detection operation is carried out similarly as described above. Switching of the transmission conductors is carried out in this manner in the third embodiment.

With rotation of the switching operation of the transmission conductors 14 as in the present example, the following effect is achieved. In particular, in the examples illustrated in FIGS. 48, 49A and 49B in the second embodiment, since periodic signals of sixteen different frequencies are respectively supplied at the same time to 16 transmission conductors positioned adjacent to each other, position detection is carried out in a concentrated manner for a particular portion of the sensor section 10 at a certain point of time. However, for any portion other than the particular portion, position detection cannot be carried out. In contrast, in the third embodiment, periodic signals having different frequencies are respectively supplied to those transmission conductors, which are spaced apart from each other by a predetermined number of transmission conductors (in the present example, by three transmission conductors), across the entire set of transmission conductors (in the present example, 64 transmission conductors) (as in the first embodiment). Further, the transmission conductors to which the periodic signals having different frequencies are to be supplied are successively shifted or displaced with respect to the entire set of transmission conductors (i.e., each frequency signal is successively supplied to each of the entire set of transmission conductors). As a result, since the periodic signals of the different frequencies are supplied to every third transmission conductor, the position of a pointer can be detected in a well-balanced manner over the entire sensor section 10.

A rotation of the switching operation similar to that described above with respect to the transmission conductors 14 may be applied with respect to the reception conductors 12. Specifically, in the reception section, outputs from those of the reception conductors, which are spaced apart by a predetermined number of reception conductors (such as seven reception conductors) among the complete set of reception conductors (such as 128 reception conductors) may be detected. Then, these reception conductors for output detection are successively shifted or displaced among the complete set of transmission conductors similarly as in the rotation of the switching operation of the transmission conductors 14. With this configuration, an effect similar to that of the transmission section, as described above, can be achieved.

In all of the embodiments described above, including the examples of FIG. 6 (the first embodiment), FIGS. 49A, 49B (the second embodiment), FIGS. 53A, 53B (Modification 1 to the second embodiment), and FIGS. 52A, 52B (the third embodiment), signals of different frequencies produced by the multi-frequency signal production circuit are supplied to predetermined ones of a plurality of transmission conductors 14, between which a predetermined number P (P is an integer which satisfies P≥0) of transmission conductors are interposed, and such predetermined conductors are successively switched.

Further, predetermined ones of a plurality of reception conductors 12 between which a predetermined number R (R is an integer which satisfies R≥0) are interposed are selected, and the predetermined conductors are successively switched.

4. Fourth Embodiment

A fourth embodiment of the present invention is configured to suppress a composite amplitude or beat phenomenon, where a plurality of periodic signals of different frequencies are supplied in a superposed relationship to a signal detection circuit according to the first to third embodiments.

It is assumed in the first to third embodiments that the initial phases of a plurality of periodic signals of different frequencies to be supplied at the same time to the transmission conductors are adjusted (or set) to 0 degree. Since the reception section 30 receives a plurality of periodic signals of different frequencies as a composite signal of the periodic signals, significant beats may be produced from the periodic signals. As a result, there is a possibility that the periodic signals may exceed the dynamic range of the reception section 30, causing saturation in the reception section 30. Further, if the level of the detected output signal is adjusted so as not to cause saturation in the reception section 30, there is the possibility that a desired detection sensitivity may not be obtained.

Therefore, in the fourth embodiment, the pointer detection apparatus includes phase controlling means for controlling the phase of periodic signals to be output from the multi-frequency signal production section, so that transmission starting phases of a plurality of periodic signals are dispersed to thereby suppress beats.

Figure 54:
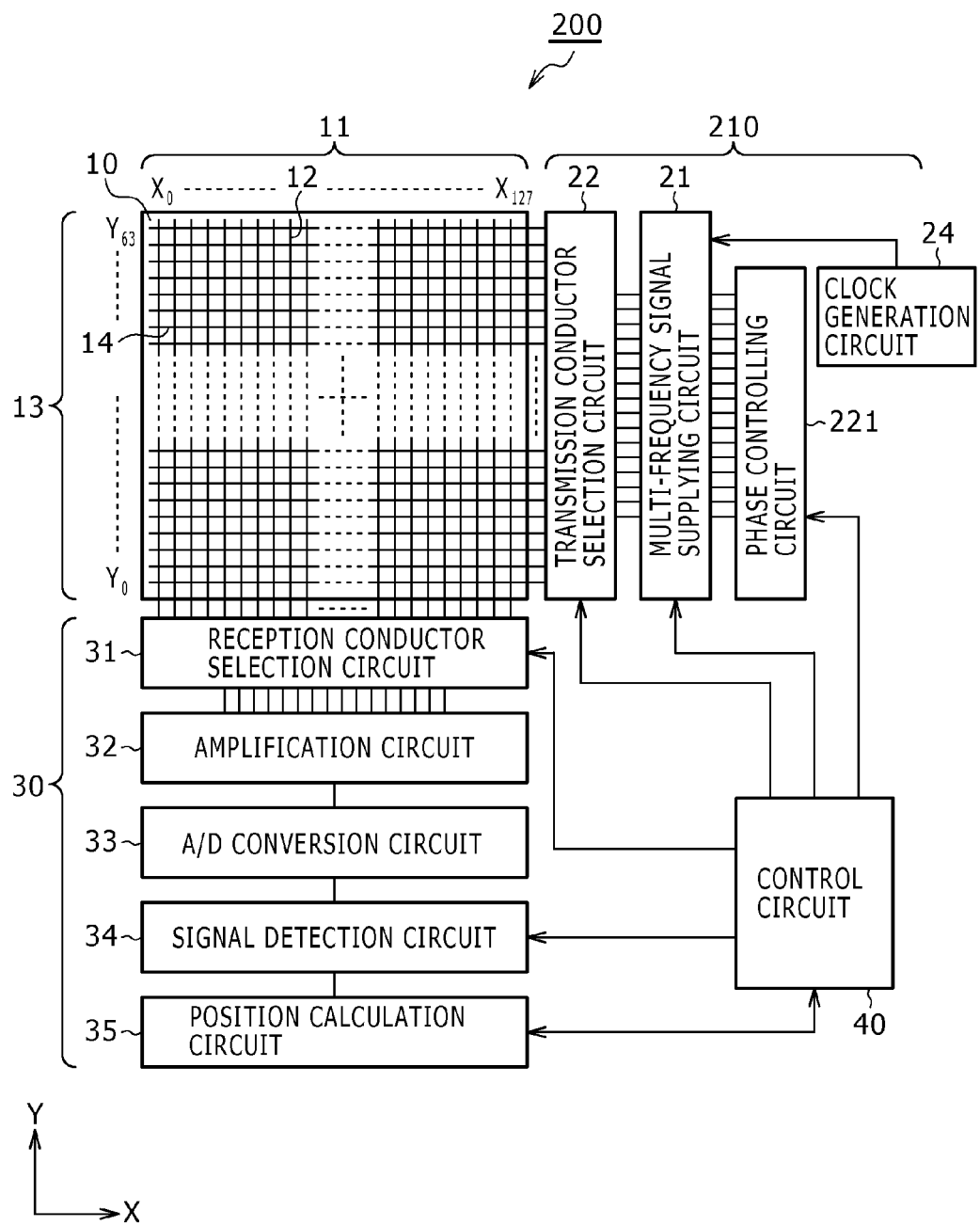
FIG. 54 is a schematic block diagram of a pointer detection apparatus according to a fourth embodiment of the present invention.

FIG. 54 shows a general configuration of the pointer detection apparatus according to the fourth embodiment. Referring to FIG. 54, the pointer detection apparatus 200 includes, as principal components thereof, a sensor section 10, a transmission section 210, a reception section 30, a position calculation circuit 35, and a control circuit 40 for controlling operation of the transmission section 210 and the reception section 30. In FIG. 54, elements like those of the pointer detection apparatus 100 described above with reference to FIG. 1 are denoted by like reference characters and overlapping description of them is omitted herein to avoid redundancy.

The transmission section 210 includes a phase controlling circuit 211, a multi-frequency signal supplying circuit 21, a transmission conductor selection circuit 22 and a clock generation circuit 23. The multi-frequency signal supplying circuit 21, transmission conductor selection circuit 22 and clock generation circuit 23 have a configuration similar to that in the first embodiment.

The phase controlling circuit 211 changes the phases of periodic signals produced by the multi-frequency signal supplying circuit 21 and supplies the periodic signals of the changed phases to the transmission conductors 14. For example, the phase controlling circuit 211 can set initial phases used in the periodic signal production sections 24 in the multi-frequency signal supplying circuit 21 of FIG. 4. In particular, the multi-frequency signal supplying circuit 21 of the pointer detection apparatus 100 of FIG. 1 controls the values of the initial phases to be provided to the periodic signal production sections 24 to carry out a phase adjustment process The control circuit 40 controls a degree by which the phase controlling circuit 211 shifts the phase of any periodic signal.

In the following, phase control over the transmission starting phases is described in connection with an example which involves two frequencies.

Figure 55:
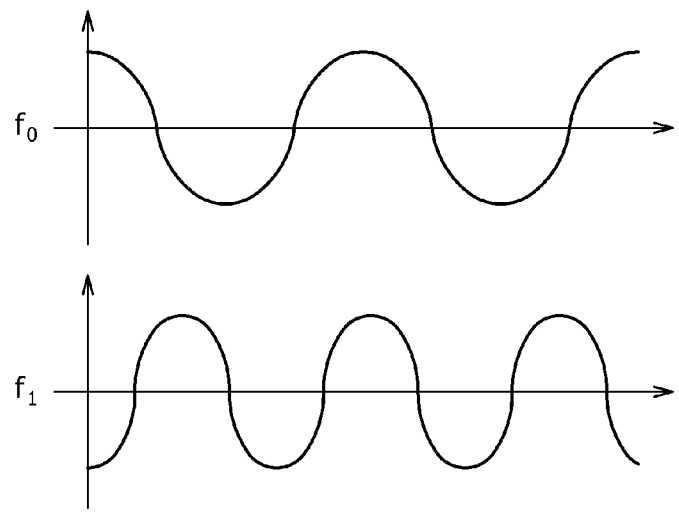
FIG. 55 is a waveform diagram illustrating an example of dispersion of initial phases of periodic signals.

FIG. 55 illustrates waveforms of a periodic signal of a frequency $f_0$ and another periodic signal of another frequency $f_1$ where the transmission starting phase of the periodic signal of the frequency $f_1$ is displaced from that of the frequency signal of the frequency $f_0$ so that the transmission starting phases are dispersed. In the present example, adjacent periodic signals have opposite phases. In this manner, multiple periodic signals having different frequencies should be combined such that their transmission starting phases are displaced from each other and, further, adjacent periodic signals have opposite phases. As a result, the periodic signals cancel each other at a rising edge or a falling edge of waveforms upon starting of transmission or upon ending of transmission, to thereby prevent an excessively high output signal (due to beat, for example) from flowing into the reception section 30.

While the present example described involves two frequencies for the convenience of description, the number of frequencies is not limited to two, but may be greater than two. A dispersion of transmission starting phases in the case of a plurality of frequencies is hereinafter described. Where the number of frequencies is an odd number, the transmission starting phase of the frequency, which is left out after the rest of the frequencies are combined into one or more pairs, should be set to 0 degree or 180 degrees.

The method of the phase control is not limited to the example described above. For example, the phase controlling circuit 211 may be configured from 16 phase shifters (not shown) in a corresponding relationship to the periodic signal production sections 24, respectively, in the multi-frequency signal supplying circuit 21 of FIG. 3. Alternatively, the phase controlling circuit 211 may include 45-degree phase shifting circuits, signal inversion circuits, or switches (not shown), so as to selectively control the number of phase shifts by the phase shifting circuits or the phase inversion by the signal inversion circuits to thereby carry out a phase control by 45 degrees or by 90 degrees.

In the following, modes of a plurality of transmission starting phases of different periodic signals are described.

FIGS. 56 to 61 illustrate composite waveforms of a plurality of periodic signals after a phase control is carried out where the initial phases of the periodic signals are varied in different patterns. In these examples, 16 periodic signals of different frequencies from 100 kHz to 250 kHz are generated by the multi-frequency signal supplying circuit 21 in a corresponding relationship to the number of transmission blocks, that is, 16, and the reception period by the reception section 30 is 200 ns.

Figure 56:
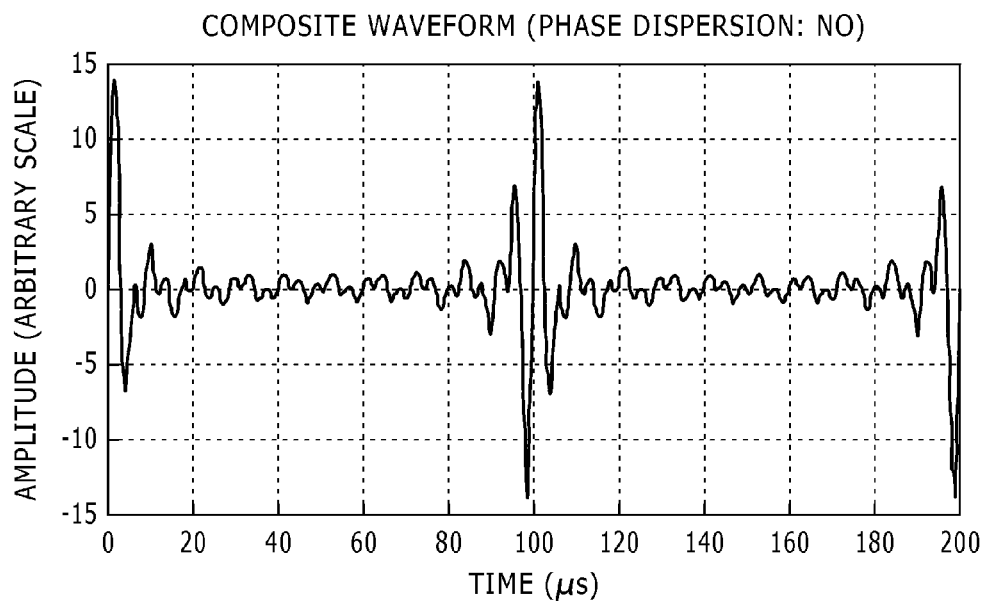
FIG. 56 is a graph illustrating a composite waveform of transmission signals by the pointer detection apparatus of FIG. 54 where no phase dispersion is applied.

FIG. 56 illustrates an example of a composite waveform of 16 periodic signals of different frequencies where no phase dispersion is applied (refer to Table 1 below). In other words, FIG. 56 illustrates the composite waveform where 16 periodic signals of wavelengths from 100 kHz to 250 kHz are supplied without carrying out any phase control.

TABLE 1

| Phase dispersion: No | | |
|---|---|---|
| Transmission Block No. | Frequency [kHz] | Phase [degrees] |
| 1 | 100 | 0 |
| 2 | 110 | 0 |
| 3 | 120 | 0 |
| 4 | 130 | 0 |
| 5 | 140 | 0 |
| 6 | 150 | 0 |
| 7 | 160 | 0 |
| 8 | 170 | 0 |
| 9 | 180 | 0 |
| 10 | 190 | 0 |
| 11 | 200 | 0 |
| 12 | 210 | 0 |
| 13 | 220 | 0 |
| 14 | 230 | 0 |
| 15 | 240 | 0 |
| 16 | 250 | 0 |

Reception period: 200 μs

Figure 57:
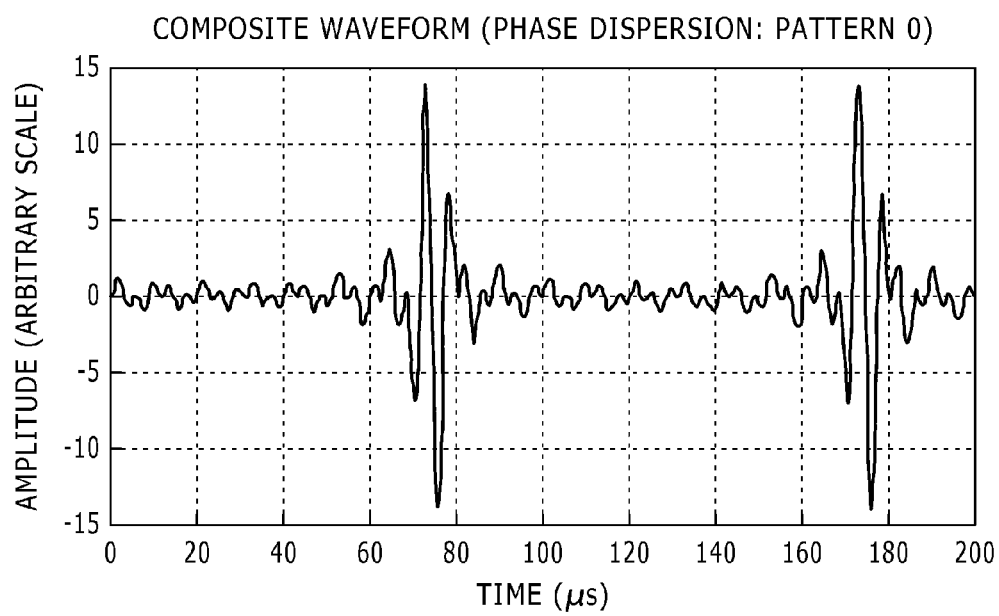
FIGS. 57 to 61 are graphs illustrating composite waveforms of transmission signals by the pointer detection apparatus of FIG. 54 where different patterns of phase dispersion are applied.

FIG. 57 illustrates an example of a composite waveform where phase dispersion is applied for every 90 degrees to 16 periodic signals of different frequencies (pattern 0: refer to Table 2 below). Referring to FIG. 57, in the example illustrated, 90-degree phase shifting is applied to achieve phase dispersion.

TABLE 2

| Phase dispersion: pattern 0 (for every 90 degrees) | | |
|---|---|---|
| Transmission Block No. | Frequency [kHz] | Phase [degrees] |
| 1 | 100 | 0 |
| 2 | 110 | 90 |
| 3 | 120 | 180 |
| 4 | 130 | 270 |
| 5 | 140 | 0 |
| 6 | 150 | 90 |
| 7 | 160 | 180 |
| 8 | 170 | 270 |
| 9 | 180 | 0 |
| 10 | 190 | 90 |
| 11 | 200 | 180 |
| 12 | 210 | 270 |
| 13 | 220 | 0 |
| 14 | 230 | 90 |
| 15 | 240 | 180 |
| 16 | 250 | 270 |

Reception period: 200 μs

Figure 58:
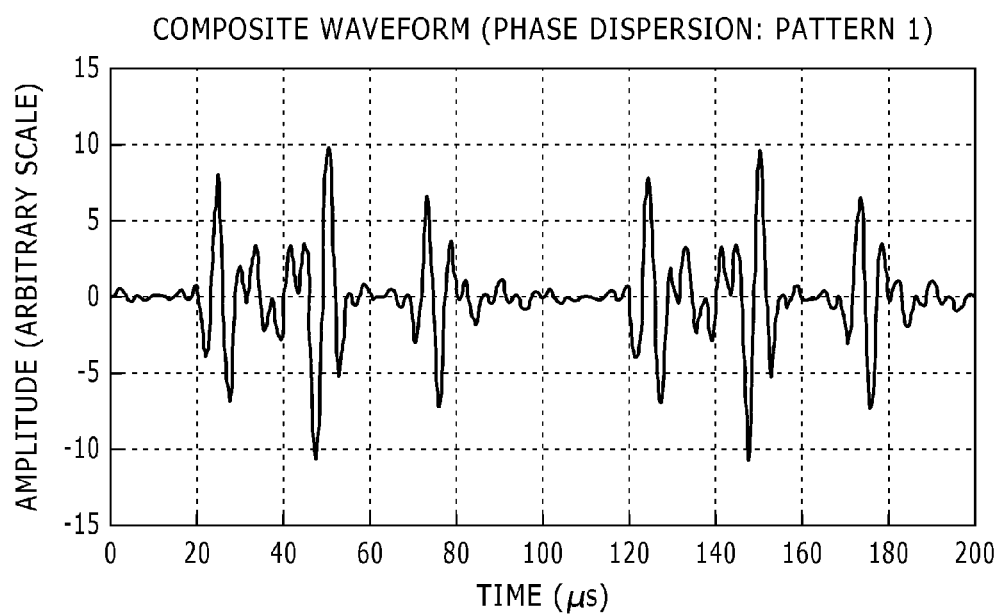

FIG. 58 illustrates an example of a composite waveform where phase dispersion is applied for every ±90 degrees to 16 periodic signals of different frequencies (pattern 1: refer to Table 3 below). Referring to FIG. 58, in the example illustrated, 90-degree phase shifting and phase reversal are selectively applied to achieve phase dispersion.

TABLE 3

| Phase dispersion: pattern 1 (for every ±90 degrees) | | |
|---|---|---|
| Transmission Block No. | Frequency [kHz] | Phase [degrees] |
| 1 | 100 | 0 |
| 2 | 110 | 180 |
| 3 | 120 | 90 |
| 4 | 130 | 270 |
| 5 | 140 | 0 |
| 6 | 150 | 180 |
| 7 | 160 | 90 |
| 8 | 170 | 270 |
| 9 | 180 | 0 |
| 10 | 190 | 180 |
| 11 | 200 | 90 |
| 12 | 210 | 270 |
| 13 | 220 | 0 |
| 14 | 230 | 180 |
| 15 | 240 | 90 |
| 16 | 250 | 270 |

Reception period: 200 μs

Figure 59:
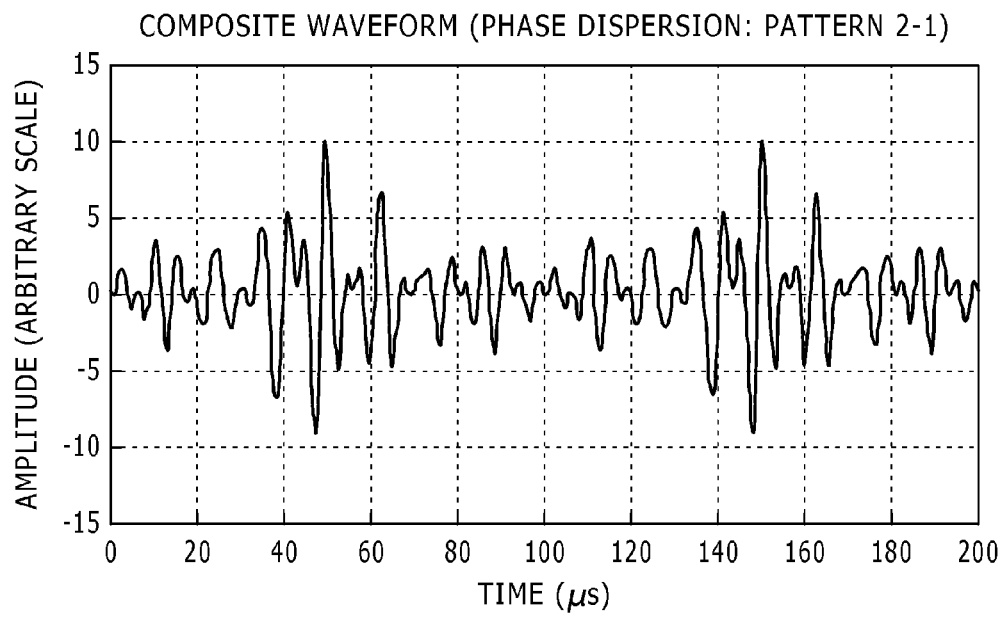

FIG. 59 illustrates an example of a composite waveform where phase dispersion is applied for every +45 degrees to 16 periodic signals of different frequencies (pattern 2-1: refer to Table 4 below). Referring to FIG. 59, in the example illustrated, 45-degree phase shifting and phase reversal are selectively applied to achieve phase dispersion.

TABLE 4

Phase dispersion: pattern 2-1 (for every ±45 degrees)

| Transmission Block No. | Frequency [kHz] | Phase [degrees] |
|---|---|---|
| 1 | 100 | 0 |
| 2 | 110 | 180 |
| 3 | 120 | 45 |
| 4 | 130 | 315 |
| 5 | 140 | 90 |
| 6 | 150 | 270 |
| 7 | 160 | 135 |
| 8 | 170 | 225 |
| 9 | 180 | 0 |
| 10 | 190 | 180 |
| 11 | 200 | 45 |
| 12 | 210 | 315 |
| 13 | 220 | 90 |
| 14 | 230 | 270 |
| 15 | 240 | 135 |
| 16 | 250 | 225 |

Reception period: 200 μs

Figure 60:
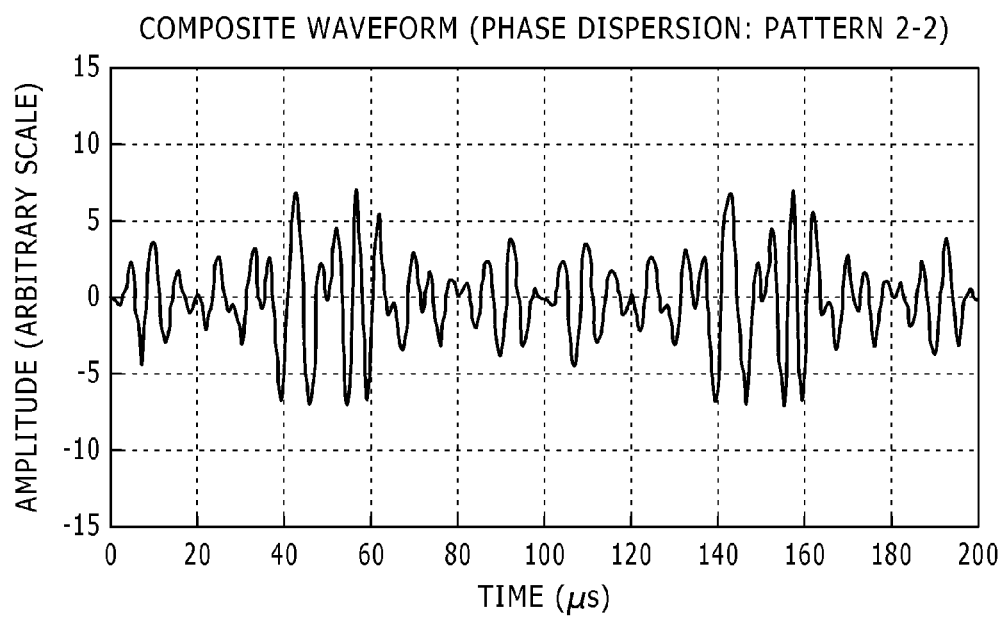

FIG. 60 illustrates an example of a composite waveform where phase dispersion is applied for every ±45 degrees to 16 periodic signals of different frequencies (pattern 2-2: refer to Table 5 below). Referring to FIG. 60, in the example illustrated, 45-degree phase shifting and phase reversal are selectively applied to the periodic signals to be supplied to the first ($1^{st}$) to eighth ($8^{th}$) transmission blocks. Further, 45-degree phase shifting and phase reversal are selectively applied to the periodic signals to be supplied to the ninth ($9^{th}$) to sixteenth ($16^{th}$) transmission blocks, such that the resulting phase dispersion pattern forms mirror images on both sides of the boundary between the eighth ($8^{th}$) and ninth ($9^{th}$) transmission blocks.

TABLE 5

Phase dispersion: pattern 2-2
(for every ±45 degrees, upwardly and downwardly symmetrical; mirror images)

| Transmission Block No. | Frequency [kHz] | Phase [degrees] |
|---|---|---|
| 1 | 100 | 0 |
| 2 | 110 | 180 |
| 3 | 120 | 45 |
| 4 | 130 | 315 |
| 5 | 140 | 90 |
| 6 | 150 | 270 |
| 7 | 160 | 135 |
| 8 | 170 | 225 |
| 9 | 180 | 225 |
| 10 | 190 | 135 |
| 11 | 200 | 270 |
| 12 | 210 | 90 |
| 13 | 220 | 315 |
| 14 | 230 | 45 |
| 15 | 240 | 180 |
| 16 | 250 | 0 |

Reception period: 200 μs

Figure 61:
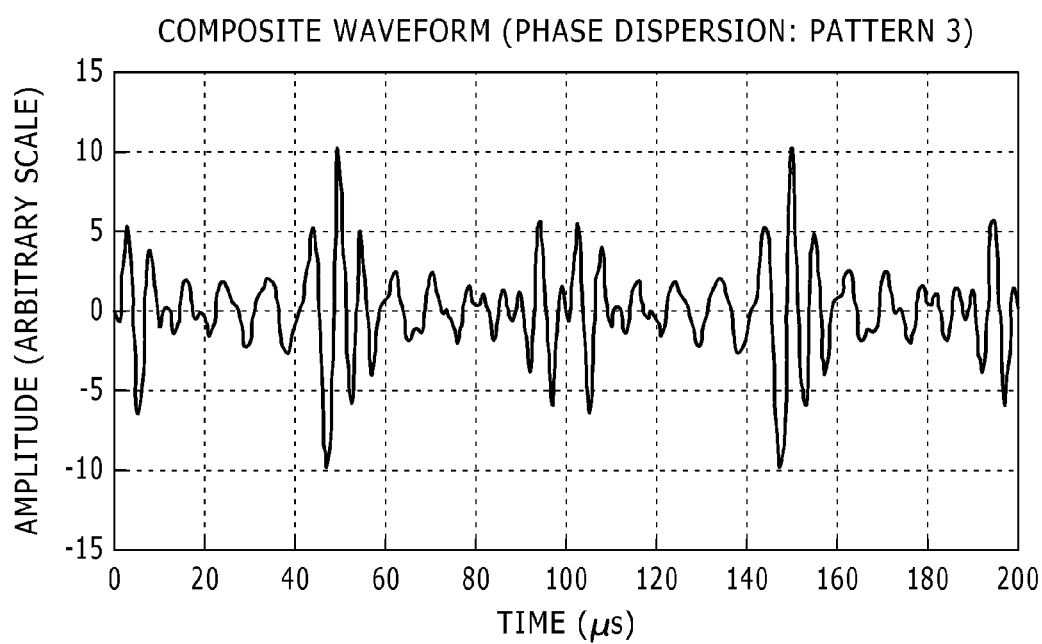
Figure 62A:
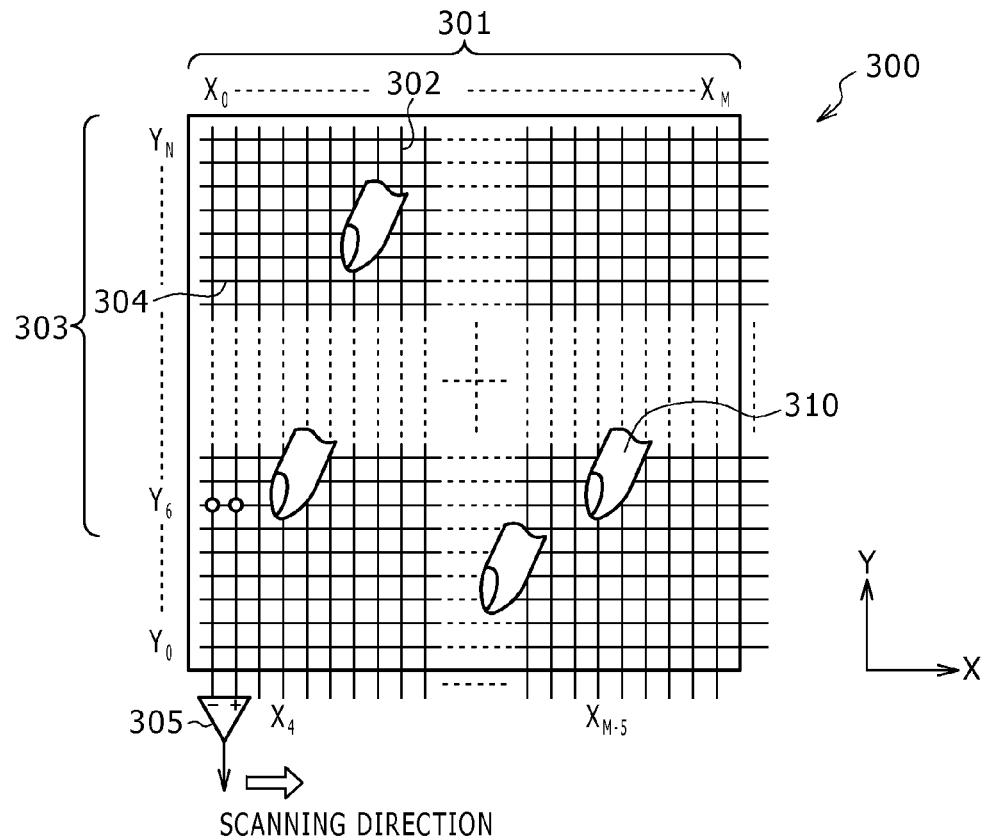
FIG. 62A is a schematic view of a sensor section of a conventional pointer detection apparatus of the cross point type electrostatic coupling system.
Figure 62B:
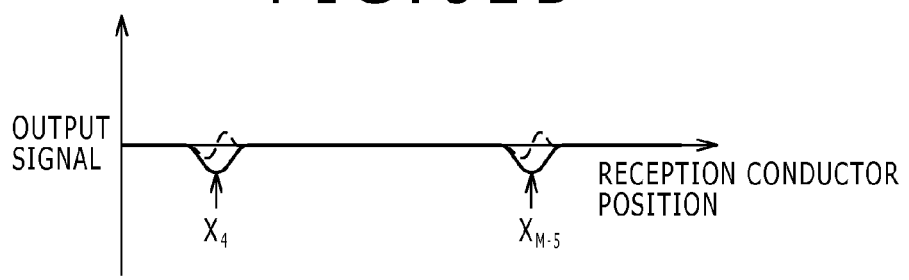
FIG. 62B is a view illustrating a principle of position detection by the conventional cross point type pointer detection apparatus of FIG. 62A.

FIG. 61 illustrates an example of a composite waveform where phase dispersion is applied for every ±22.5 degrees to 16 periodic signals of different frequencies (pattern 3: refer to Table 6 below). Referring to FIG. 61, 22.5-degree phase shifting and phase reversal are selectively applied to achieve phase dispersion.

TABLE 6

Phase dispersion: pattern 3 (for every ±22.5 degrees)

| Transmission Block No. | Frequency [kHz] | Phase [degrees] |
|---|---|---|
| 1 | 100 | 0 |
| 2 | 110 | 180.0 |
| 3 | 120 | 22.5 |
| 4 | 130 | 337.5 |
| 5 | 140 | 45.0 |
| 6 | 150 | 315.0 |
| 7 | 160 | 67.5 |
| 8 | 170 | 292.5 |
| 9 | 180 | 90.0 |
| 10 | 190 | 270.0 |
| 11 | 200 | 112.5 |
| 12 | 210 | 247.5 |
| 13 | 220 | 135.0 |
| 14 | 230 | 225.0 |
| 15 | 240 | 157.5 |
| 16 | 250 | 202.5 |

Reception period: 200 μs

Resulting characteristics of the composite waveforms having the phase dispersion patterns illustrated in FIGS. 56 to 61 are summarized below:

| Pattern | Phase dispersion method | Resulting characteristics |
|---|---|---|
| Phase dispersion (No) | Phase dispersion: No | High beat |
| Phase dispersion (0) | Phase dispersion: for every 90 degrees | No effect |
| Phase dispersion (1) | Phase dispersion: for every ±90 degrees | Medium beat |
| Phase dispersion (2-1) | Phase dispersion: for every ±45 degrees | Medium beat |
| Phase dispersion (2-2) | Phase dispersion: ±45 degrees (upwardly and downwardly symmetrical; mirror images) | Low beat |
| Phase dispersion (3) | Phase dispersion: ±22.5 degrees | Medium beat |

Based on the composite waveforms having the phase dispersion patterns, it can be recognized that, even if phase dispersion is applied for every 90 degrees as in the case of pattern (0), the beat of the composite waveform does not decrease. On the other hand, where the phase dispersion is applied for every ±90 degrees, as in the case of the composite waveforms having patterns (1) to (3), the beat of the composite waveform decreases. In other words, both phase shifting and phase reversal should be selectively applied to achieve phase dispersion. Among the composite waveforms measured, the beat suppression effect of pattern (2-2) is the highest. In pattern (2-2), the phase dispersion patterns of the first half (Block Nos. 1 to 8) and the latter half (Block No. 9 to 16) of the entire set of transmission blocks (16 transmission blocks, each block including 1 transmission conductor in the present example) are inverted relative to each other, such that no phase dispersion pattern is repeated between the first half and the latter half of the transmission blocks (i.e., of the transmission conductors). In contrast, patterns (1) and (2-1) respectively include four and two repeating patterns within the first ($1^{st}$) to the sixteenth ($16^{th}$) transmission blocks. Pattern (3) includes no repeating pattern. However, pattern (3) includes a relatively greater number of small phase differences between successive transmission blocks (i.e., between successive transmission conductors in this example). Accordingly, it is proposed that the deviation in phase differences between transmission conductors, whose outputs are combined, should be as great as possible, in addition to that the entire set of transmission conductors (in the present example, 16 transmission conductors) should have a pattern including little or no repeating initial phases.

In the present example, since the pointer detection apparatus is configured such that transmission starting phases of a plurality of periodic signals of different frequencies are dispersed, upon starting or ending of transmission, transient current on the reception side does not become excessive and beats can be diminished. Consequently, an output signal detected by the reception section 30 does not exceed the dynamic range of the reception section 30, and saturation of the reception section 30 is prevented. Therefore, the degree of freedom in setting the reception gain of an amplification circuit increases, and a high detection sensitivity can be obtained.

In the first to fourth embodiments described above, at least a reception conductor group is divided into a plurality of detection blocks. However, the pointer detection apparatus may also be configured such that a reception conductor group is not divided, but detection circuits connected to all reception conductors are processed in parallel such that output signals of all reception conductors are detected at the same time.

Since the embodiments described above are particular examples of a preferred mode for carrying out the present invention, various technically preferable restrictions are included. However, the present invention is not limited to these embodiments unless otherwise specified so as to restrict the present invention to the description of the embodiments. Further, the used materials, the processing time, processing order, numerical value conditions of the parameters and so forth specified in the foregoing description are merely preferred examples, and also the dimensions, shapes, disposition relationships and so forth in the accompanying drawings referred to in the foregoing description represent merely practical examples of the embodiments. Accordingly, the present invention shall not be restricted to the examples of the embodiments described above and allows various modifications and alterations without departing from the spirit and scope of the present invention.

For example, while the series of processes carried out by the pointer detection apparatus described above is executed by hardware, it may otherwise be executed by software. Naturally, the processes can be implemented also by a combination of hardware and software. Where the processes are executed by software, a program which forms the software is installed from a computer-readable (or program recording) tangible medium into a special-purpose computer (processor) including hardware for receiving the software, or into a general-purpose computer (processor) which can execute various functions when various programs are installed therein.

Further, in the present specification, the processing steps which describe the program stored in a computer-readable medium may be, but need not necessarily be, processed in a time sequence in the order as described. Still further, these processing steps may be executed in parallel or individually (discretely), without being processed in a time sequence (e.g., parallel processing or processing by objects).

The embodiments of the invention in which an exclusive property or privilege is claimed are defined as follows:

1. A pointer detection apparatus, comprising:
   a conductor pattern including a plurality of first conductors disposed in a first direction and a plurality of second conductors disposed in a second direction which crosses the first direction;
   a multi-frequency signal production circuit configured to produce a plurality of signals of different frequencies and of a defined time length during which the plurality of signals are continuously supplied to drive the first conductors, and to produce, for at least one of the plurality of signals of different frequencies and of the defined time length, at least one inverted signal having the same frequency as, but having a phase inverted from that of, said at least one of the plurality of signals of different frequencies for the defined time length;
   a first conductor selection circuit configured to divide the plurality of first conductors into a plurality of groups, each group including Q number of the first conductors, Q being an even integer equal to or greater than 4, and the first conductor selection circuit being further configured to select one group among the plurality of groups, to divide the even number of the first conductors in the selected group into a first half and a second half each containing an equal number of the first conductors to each other, and to supply said at least one of the plurality of signals of different frequencies of the defined time length to the first half of the first conductors in the selected group and to supply said inverted signal of the defined time length to the second half of the first conductors in the selected group;
   a second conductor selection circuit configured to selectively receive detection signals from the plurality of second conductors; and
   a signal detection circuit configured to detect signals of individual frequencies, corresponding to the signals of different frequencies produced by said multi-frequency signal production circuit, which are representative of coupling states at cross points between the first conductors and the second conductors and are received from said second conductor selection circuit,
   wherein each of the plurality of first conductors disposed in the first direction is formed in a pattern of a plurality of land conductor portions electrically connected to each other, the land conductor portion having a substantially H-shape, while each of the plurality of second conductors disposed in the second direction is formed in a pattern of a line shape, such that a signal is supplied to the pattern of the land conductor portions while a detection signal is received from the pattern of the line shape.

2. The pointer detection apparatus according to claim 1, wherein said first conductor selection circuit is further configured to successively switch the selected group among the plurality of groups, to which the signals of different frequencies are supplied.

3. The pointer detection apparatus according to claim 2, wherein said first conductor selection circuit controls the distance of movement from the firstly selected group to the secondly selected group, to which the signals of different frequencies are to be supplied.

4. The pointer detection apparatus according to claim 2, wherein said plurality of groups of first conductors do not overlap with each other.

5. The pointer detection apparatus according to claim 2, wherein said plurality of groups of first conductors overlap with each other.

6. The pointer detection apparatus according to claim 1, wherein said first conductor selection circuit sets a predetermined first conductor, which is disposed in proximity to each of those first conductors selected to receive the signals of the different frequencies, to a predetermined potential.

7. The pointer detection apparatus according to claim 1, wherein said first conductor selection circuit is configured to supply a signal of one of the different frequencies produced by the multi-frequency production circuit to at least two first conductors disposed in proximity to each other.

8. The pointer detection apparatus according to claim 1, wherein said first half of the first conductors is interposed between said second half of the first conductors which are positioned at two opposite ends of said first half of the first conductors.

9. The pointer detection apparatus according to claim 1, wherein said second conductor selection circuit is further configured to:
divide the plurality of second conductors into a plurality of groups each including a predetermined number of second conductors greater than two, and
select one group among the plurality of groups, from which to receive detection signals.

10. The pointer detection apparatus according to claim 9, wherein said second conductor selection circuit is further configured to successively switch the selected group among the plurality of groups, from which to receive detection signals.

11. The pointer detection apparatus according to claim 10, wherein said second conductor selection circuit controls the distance of movement from the firstly selected group to the secondly selected group, from which to receive detection signals.

12. The pointer detection apparatus according to claim 10, wherein said plurality of groups of second conductors do not overlap with each other.

13. The pointer detection apparatus according to claim 10, wherein said plurality of groups of first conductors overlap with each other.

14. The pointer detection apparatus according to claim 1, wherein said second conductor selection circuit sets predetermined ones of the second conductors which are in a non-selected state to a predetermined potential.

15. The pointer detection apparatus according to claim 1, wherein said second conductor selection circuit is further configured to select at least three second conductors and set at least one selected conductor, which is positioned between those of the selected conductors that are disposed at the opposite end positions, to a predetermined potential.

16. The pointer detection apparatus according to claim 1, wherein said second conductor selection circuit selects at least three second conductors carrying detection signals having different phases from each other, and
said signal detection circuit adjusts the phases of the at least three detection signals having different phases.

17. The pointer detection apparatus according to claim 1, wherein said signal detection circuit includes a differential amplifier.

18. The pointer detection apparatus according to claim 1, wherein said conductor pattern including the plurality of first conductors disposed in the first direction and the plurality of second conductors disposed in the second direction is disposed on one surface of a substrate,
wherein an insulating member is disposed in a region in which the plurality of first conductors and the plurality of second conductors cross each other in order to electrically isolate the plurality of first conductors from the plurality of second conductors.

19. The pointer detection apparatus according to claim 1, wherein the plurality of first conductors disposed in the first direction are disposed on one surface of a substrate while the plurality of second conductors disposed in the second direction are disposed on the other surface of said substrate.

20. The pointer detection apparatus according to claim 1, wherein said first conductor selection circuit is further configured to:
supply signals of relatively high frequencies among the signals of the different frequencies produced by said multi-frequency signal production circuit to those first conductors that are disposed adjacent to a signal extraction side of the plurality of second conductors, and
supply signals of relatively low frequencies among the signals of the different frequencies produced by said multi-frequency signal production circuit to those first conductors that are disposed remotely from the signal extraction side of the plurality of second conductors.

21. The pointer detection apparatus according to claim 1, wherein the first direction is a circumferential direction such that the plurality of first conductors are disposed concentrically with respect to a predetermined central point, and the second direction is a radial direction along which each of the second conductors having a line shape extends from the central point.

22. The pointer detection apparatus according to claim 1, wherein said first conductor selection circuit is further configured to selectively supply a signal of a predetermined frequency produced by said multi-frequency signal production circuit to both of the opposite end portions of those first conductors included in the selected group.

23. The pointer detection apparatus according to claim 1, wherein a number of first conductors to receive a signal of the same predetermined frequency produced by said multi-frequency signal production circuit is controlled by said first conductor selection circuit in response to the signals detected by said signal detection circuits.

24. The pointer detection apparatus according to claim 1, wherein a state in which a pointer spaced from said conductor pattern is identified based on both a maximum value and a shape characteristic of the signals detected by said signal detection circuit.

25. The pointer detection apparatus according to claim 1, further comprising:
a synchronous detection circuit configured to detect the levels of said signals of individual frequencies received from said second conductor selection circuit; and
a gain control circuit configured to control the gain of said signals of individual frequencies to be received from said second conductor selection circuit based on the levels of said signals of individual frequencies detected by said synchronous detection circuit.

26. The pointer detection apparatus according to claim 1, wherein the pressure of a pointer to said conductor pattern is detected based on a spatial distribution of the levels of the signals of individual frequencies detected by said signal detection circuit.

27. The pointer detection apparatus according to claim 26, wherein the pressure of the pointer to said conductor pattern is detected based on both a volume of the spatial distribution of the levels of the signals of individual frequencies detected by said signal detection circuit and a touched area between the pointer and said conductor pattern.

28. The pointer detection apparatus according to claim 1, further comprising:
a position calculation circuit configured to calculate a position of a pointer on said conductor pattern based on the signals of individual frequencies detected by said signal detection circuit.

29. The pointer detection apparatus according to claim 28, wherein the position calculation circuit is further configured to calculate a plurality of positions of a plurality of pointers on said conductor pattern based on the signals of individual frequencies detected by said signal detection circuit.

30. A pointer detection method, for detecting a position of a pointer relative to a conductor pattern including a plurality of first conductors disposed in a first direction and a plurality of second conductors disposed in a second direction crossing the first direction, the pointer detection method comprising:
a first step of producing a plurality of signals of different frequencies and of a defined time length during which the plurality of signals are continuously supplied to drive the first conductors, and producing, for at least one of the plurality of signals of different frequencies and of the defined time length, at least one inverted signal having the same frequency as, but having its phase inverted from that of, said at least one of the plurality of signals of different frequencies for the defined time length;
a second step of dividing the plurality of first conductors into a plurality of groups, each group including Q number of the first conductors, Q being an even integer equal to or greater than 4, selecting one group among the plurality of groups, dividing the even number of the first conductors in the selected group into a first half and a second half each containing an equal number of the first conductors to each other, and supplying said at least one of the plurality of signals of different frequencies and of the defined time length to the first half of the first conductors in the selected group and to supply said inverted signal of the defined time length to the second half of the first conductors in the selected group;
a third step of selectively switching those second conductors from which detection signals are received; and
a fourth step of detecting signals of individual frequencies corresponding to the signals of the different frequencies produced at the first step, based on the detection signals supplied from the second conductors selected at the third step, wherein the signals of individual frequencies are representative of coupling states at cross points between the conductors and the second conductors,
wherein each of the plurality of first conductors disposed in the first direction is formed in a pattern of a plurality of land conductor portions electrically connected to each other, the land conductor portion having a substantially H-shape, while each of the plurality of second conductors disposed in the second direction is formed in a pattern of a line shape, such that a signal is supplied to the pattern of the land conductor portions while a detection signal is received from the pattern of the line shape.

31. The pointer detection method according to claim 30, further comprising successively switching the selected group among the plurality of groups, to which the signals of different frequencies are supplied.

32. The pointer detection method according to claim 30, further comprising:
a fifth step of calculating a position of a pointer on the conductor pattern based on the signals of individual frequencies detected at the fourth step.

33. The pointer detection method according to claim 32, wherein the fifth step further comprises calculating a plurality of positions of a plurality of pointers on said conductor pattern based on the signals of individual frequencies detected at the fourth step.

34. A pointer detection apparatus, comprising:
a conductor pattern including a plurality of first conductors disposed in a first direction and a plurality of second conductors disposed in a second direction which crosses the first direction;
a multi-frequency signal production circuit configured to produce a plurality of signals of different frequencies and of a defined time length during which the plurality of signals are continuously supplied to drive the first conductors, and to produce, for at least one of the plurality of signals of different frequencies and of the defined time length, at least one inverted signal having the same frequency as, but having a phase inverted from that of, said at least one of the plurality of signals of different frequencies for the defined time length;
a first conductor selection circuit configured to divide the plurality of first conductors into a plurality of groups, each group including Q number of the first conductors, Q being an even integer equal to or greater than 4, and the first conductor selection circuit being further configured to select one group among the plurality of groups, to divide the even number of the first conductors in the selected group into a first half and a second half each containing an equal number of the first conductors to each other, and to supply said at least one of the plurality of signals of different frequencies of the defined time length to the first half of the first conductors in the selected group and to supply said inverted signal of the defined time length to the second half of the first conductors in the selected group;
a second conductor selection circuit configured to selectively receive detection signals from the plurality of second conductors;
a signal detection circuit configured to detect signals of individual frequencies, corresponding to the signals of different frequencies produced by said multi-frequency signal production circuit, which are representative of coupling states at cross points between the first conductors and the second conductors and are received from said second conductor selection circuit; and
a phase controlling circuit configured to control the phases of the plurality of signals having different frequencies to be output from said multi-frequency signal production circuit,
wherein signals corresponding to the signals having the different frequencies produced by said multi-frequency signal production circuit, as supplied to the signal detection circuit, are superposed so as to suppress their composite amplitude.

* * * * *